(12) United States Patent  
McCormick

(10) Patent No.: US 8,195,712 B1
(45) Date of Patent: Jun. 5, 2012

(54) LATTICE DATA SET-BASED METHODS AND APPARATUS FOR INFORMATION STORAGE AND RETRIEVAL

(75) Inventor: Kent McCormick, Boston, MA (US)

(73) Assignee: Lattice Engines, Inc., San Mateo, CA (US)

( * ) Notice: Subject to any disclaimer, the term of this patent is extended or adjusted under 35 U.S.C. 154(b) by 503 days.

(21) Appl. No.: 12/425,926

(22) Filed: Apr. 17, 2009

Related U.S. Application Data

(60) Provisional application No. 61/045,749, filed on Apr. 17, 2008.

(51) Int. Cl.
 G06F 7/00 (2006.01)
 G06F 17/30 (2006.01)
 G06F 15/16 (2006.01)

(52) U.S. Cl. .................. 707/803; 707/809; 707/769

(58) Field of Classification Search .......... 707/803, 707/809, 769
See application file for complete search history.

(56) References Cited

U.S. PATENT DOCUMENTS

| | | | |
|---|---|---|---|
| 5,319,777 A | 6/1994 | Perez | |
| 5,592,666 A | 1/1997 | Perez | |
| 6,236,986 B1 | 5/2001 | Gestrelius et al. | |
| 6,334,125 B1 * | 12/2001 | Johnson et al. | 707/809 |
| 6,385,604 B1 | 5/2002 | Bakalash et al. | |
| 6,408,292 B1 | 6/2002 | Bakalash et al. | |
| 6,434,544 B1 | 8/2002 | Bakalash et al. | |
| 6,879,984 B2 | 4/2005 | Duddleson et al. | |
| 6,917,943 B2 | 7/2005 | Butler | |
| 6,973,452 B2 | 12/2005 | Metzger et al. | |
| 7,089,266 B2 * | 8/2006 | Stolte et al. | 707/803 |
| 7,302,423 B2 * | 11/2007 | De Bellis | 707/803 |
| 7,590,605 B2 * | 9/2009 | Josifovski | 707/3 |
| 2003/0217033 A1 | 11/2003 | Sandler et al. | |
| 2005/0022051 A1 | 1/2005 | Zane et al. | |
| 2005/0102548 A1 | 5/2005 | Lindenstruth et al. | |

(Continued)

FOREIGN PATENT DOCUMENTS

GB 2343763 A 5/2000

OTHER PUBLICATIONS

Clavel, Manuel et al., "Maude Manual (Version 2.4)," SRI International (Oct. 2008, Revised Feb. 2009).

(Continued)

*Primary Examiner* — Greta Robinson
*Assistant Examiner* — Brian E. Weinrich
(74) *Attorney, Agent, or Firm* — Nutter McClennen & Fish LLP; David J. Powsner; Michael P. Visconti, III

(57) ABSTRACT

In one aspect, an apparatus according to the invention comprises a lattice data set with a partial order of concepts (LD-SWPOC) including a plurality of data elements, each of which belongs to exactly one associated concept. The set of concepts carries the structure of a partial order. Each data elements associated with a concept may be linked to one or more other data elements associated with one or more other concepts. The links define (i) a path between data elements directly linked thereby and/or (ii) a portion of a path between data elements linked by intermediate subsets of data elements. The paths define a relationship between the data elements in accord with the partial order of the concepts with which they are associated, such that selected conditions and/or or constraints (collectively, "conditions") are satisfied.

41 Claims, 70 Drawing Sheets

Query Engine Flow

U.S. PATENT DOCUMENTS

2005/0187977 A1    8/2005  Frost
2007/0208719 A1*   9/2007  Tran .................................. 707/3

OTHER PUBLICATIONS

McCombs, Theodore, "Maude 2.0 Primer (Version 1.0)," (Aug. 2003).

Marti-Oliet, Narciso et al., "Rewriting Logic: Roadmap and Bibliography," SRI International (Jun. 2001).

Canfield, Rodney E., "Meet and Join within the Lattice of Set Partitions" Department of Computer Science, The University of Georgia, Jan. 21, 2001 (8 pages).

Spyratos, Nicolas, "The Partition Model: A Deductive Database Model" ACM Transactions on Database Systems, vol. 12, No. 1, Mar. 1987 (37 pages).

Spight, Marshall et al., "First Steps in Relational Lattice" Mar. 10, 2006 (11 pages).

Tropashko, Vadim, "Relational Algebra as non-Distributive Lattice" 2005 (9 pages).

Savinov, Alexandr—"Hierarchical Multidimensional Modelling in the Concept-Oriented Data Model", Proceedings of the CLA 2005 International Workshop on Concept Lattices and their Applications Sep. 7-9, 2005.

* cited by examiner

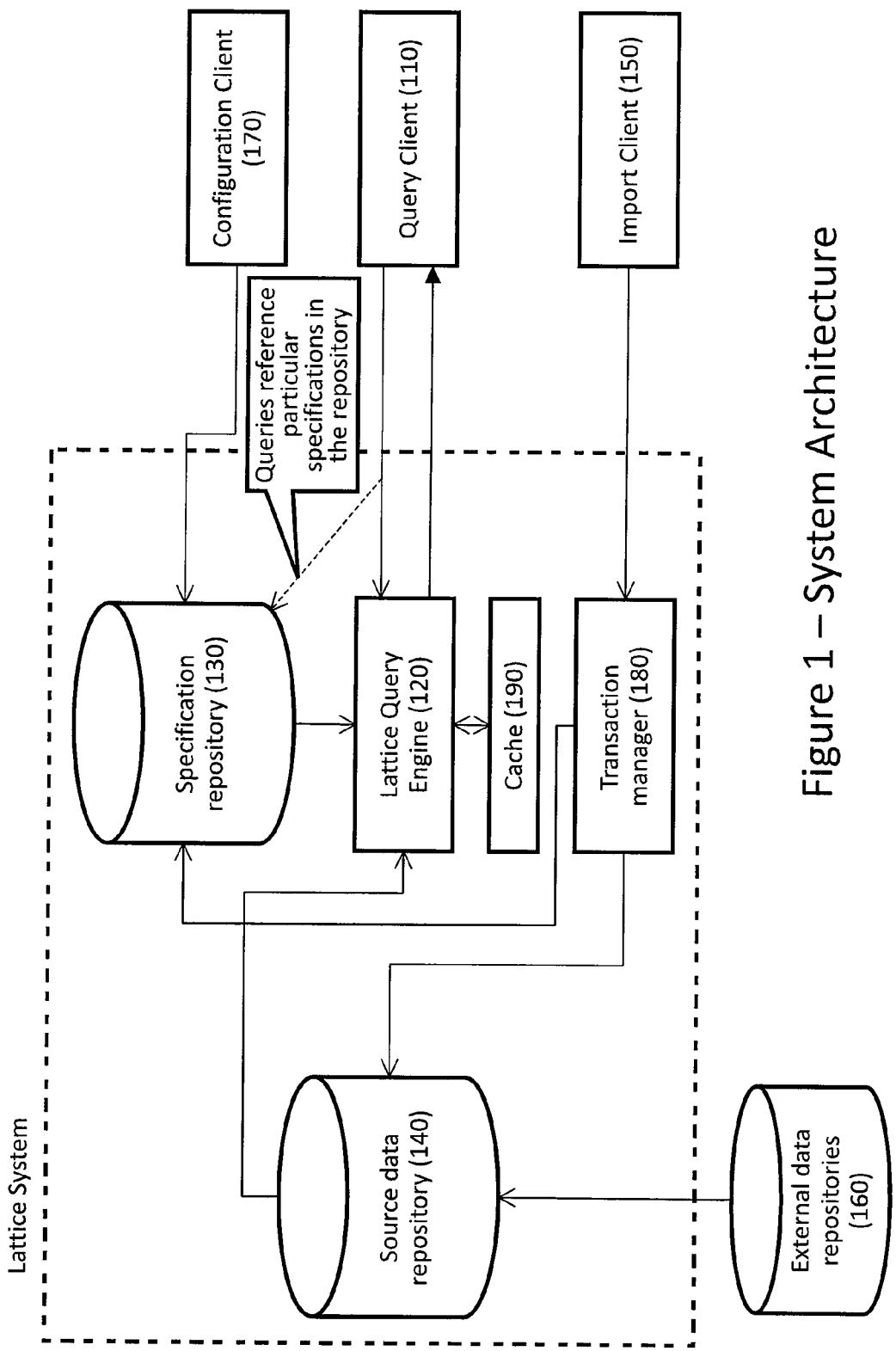
Figure 1 – System Architecture

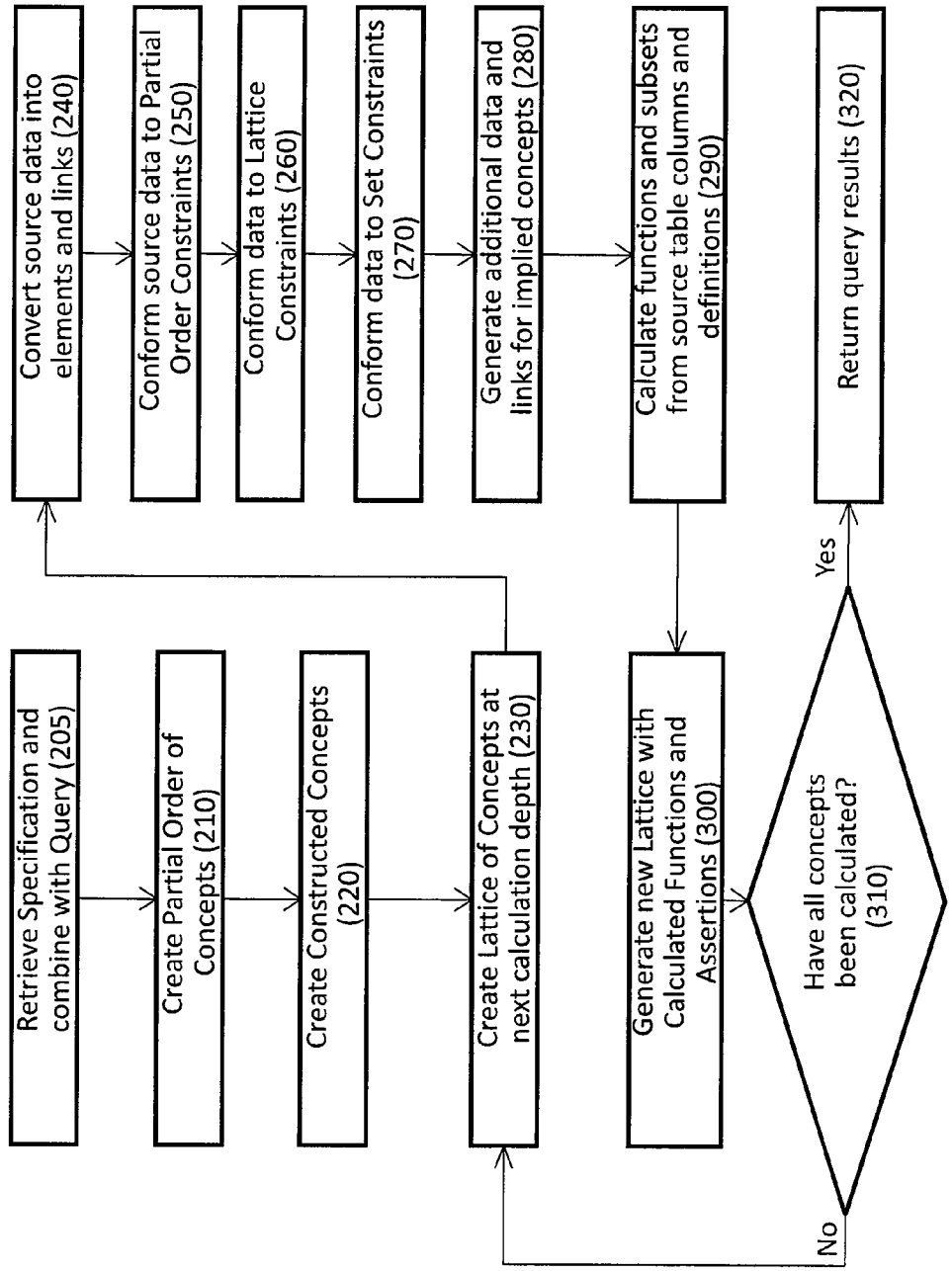
Figure 2 – Query Engine Flow

| Type | Operator and Type Constructor Signature(s) | Signatures of Constructors for Supporting Types |
|---|---|---|
| ConceptAtomic | ConceptAtomic( String) | |
| | ConceptAtomic_Table( TableName) | TableName( String ) |
| Concept | Concept(Set(ConceptAtomic)) | |
| | Concept_Meet( Concept , Concept ) | |
| | Concept_Join( Concept , Concept ) | |
| ConceptSubset | ConceptSubset_All( Concept ) | Set_Expression := SetName( String ) |
| | ConceptSubset_Empty( Concept ) | Set_Expression := <Set_Operator> (<Argument list>) |
| | ConceptSubset_Table( TableName ) | |
| | ConceptSubset_Function( Function_Expression ) | Function_Expression := FunctionName(String) |
| | | Function_Expression := <Function_Operator> ( <Argument list>) |
| | ConceptSubset_TableColumn( TableName , Concept) | |
| | ConceptSubset(Set_Expression) | |
| | ConceptSubset_Value( List(ConceptAtomic} , List(String} ) | |
| | ConceptSubset_Intersection(ConceptSubset, ConceptSubset) | |
| | ConceptSubset_Union( ConceptSubset , ConceptSubset) | |
| | ConceptSubset_Meet( ConceptSubset , ConceptSubset) | |
| | ConceptSubset_Join( ConceptSubset, ConceptSubset) | |

Figure 3 – Basic Types

Figure 4 – Specification Types

| Type | Type Constructor Signature(s) | Signatures of Constructors for Supporting Type |
|---|---|---|
| SourceTable | SourceTable( TableName(String) , Set{Column} , Keys ) | Column := Column( ColumnName::String , ConceptAtomic ) |
| | | Column := Column( ColumnName::String , Metric ) |
| | | Keys := Set{Concept} |
| Function | Function( FunctionName(String) , Function_Expression ) | Aggregation := Max \| Min \| Average \| Sum |
| | Function_Transform( FunctionName(String) , Function_Expression , ConceptSubset , Aggregation ) | |
| | Function_Set( ConceptSubset ) | |
| Identification | Identification( Concept , Concept ) | |
| Implication | Implication( Concept , Concept ) | |
| Set identification | SpecIdentification( SetRelation , ConceptSubset , ConceptSubset ) | SetRelation := Include \| SameSet \| Intersection |
| Constraint | Constraint( ConceptSubset , ConceptSubset , MapConstraint ) | MapConstraint := Entire_Source_Depleting \| Entire_Target_Increasing \| Surjective_Target_Depleting \| Surjective_Source_Increasing |
| | Constraint_MaximalExtent( ConceptSubset , Concept ) | |
| Query | Query( Set{Function} , ConceptSubset ) | |

Figure 5 – Create Partial Order of Concepts
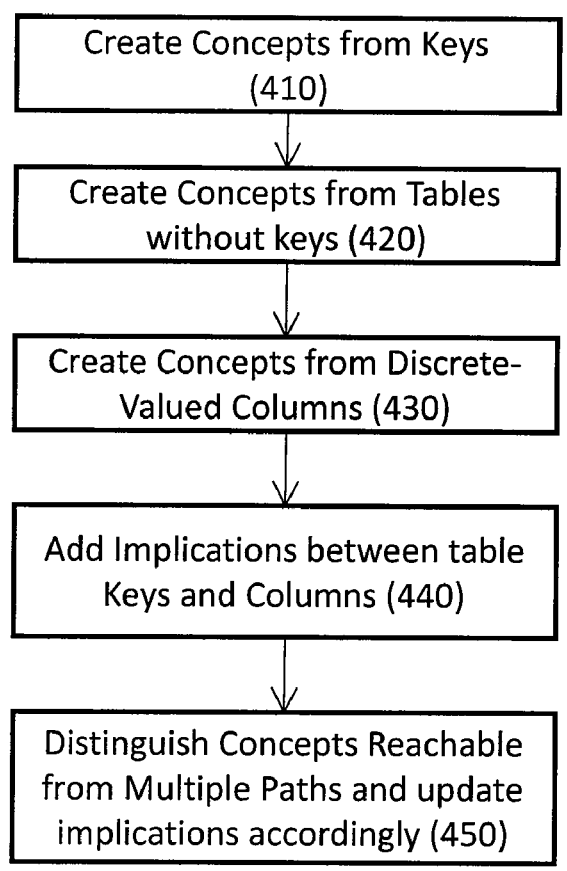

Figure 6 – Example Source Data

Customers (520)

| Customer ID (KEY) (521) | Name (522) | Annual Revenue $M (525) | Segment (523) |
|---|---|---|---|
| C100 | ABC Inc | 100 | Commercial |
| C101 | New Co | 400 | <Null> |
| C102 | Big Bank | 2000 | Enterprise |
| C103 | John Doe | 1.1 | Consumer |

524 → (points to <Null> in Segment)
512 → (points to Enterprise)

Segment (540)

| Segment (KEY) (541) | Target (542) |
|---|---|
| Commercial | $1000 |
| Enterprise | $3000 |
| Consumer | $500 |

Sales Territory (530)

| Sales Territory ID (KEY) (531) | Name (532) | Segment (533) |
|---|---|---|
| T100 | Northeast | Commercial |
| T101 | Southwest | Commercial |
| T102 | Northeast Enterprise | Commercial |
| T103 | U.S. Consumer | <Null> |
| T104 | West | SMB |

513, 533 (labels pointing to Sales Territory table)

Products (550)

| Product ID (KEY) (551) | Name (552) | Product Class (553) | Product Family (554) |
|---|---|---|---|
| P100 | X1000 | Platform | Base |
| P101 | X1000 | Platform | Base |
| P102 | X2000 | Department | Base |
| P103 | X3000 | Data Center | High End |

Sales Transactions (510)

| Customer ID | Sales Territory ID | Product ID | Price |
|---|---|---|---|
| C100 | T100 | P100 | $100 |
| C101 | T101 | P100 | $50 |
| C102 | T102 | P101 | $300 |
| C103 | T103 | P102 | $10 |

511

Figure 7 – Specification of Example Data

| Source Table Specification (531) | Implication (532) |
|---|---|
| SourceTable( "SalesTransactions", ( Column( "CustomerID", ConceptAtomic("CustomerID")), Column( "SalesTerritoryID", ConceptAtomic("SalesTerritoryID")), Column( "ProductID", ConceptAtomic("ProductID")), Column( "Price", Metric)), Keys()) | Implication( Concept(ConceptAtomic("CustomerID")), Concept(ConceptAtomic("Name")))|
| SourceTable( "Customers", ( Column( "CustomerID", ConceptAtomic("CustomerID")), Column( "Name", ConceptAtomic("Name")), Column( "Annual Revenue $M", Metric), Column( "Segment", ConceptAtomic("Segment_Customers"))), Keys( Concept(ConceptAtomic("CustomerID")))) | Implication( Concept(ConceptAtomic("CustomerID")), Concept(ConceptAtomic("Segment_Customers"))) |
| | Implication( Concept(ConceptAtomic("SalesTerritoryID")), Concept(ConceptAtomic("Segment_SalesTerritory"))) |
| SourceTable( "SalesTerritory", ( Column( "SalesTerritoryID", ConceptAtomic("SalesTerritoryID")), Column( "Name", ConceptAtomic("Name")), Column( "Segment", ConceptAtomic("Segment_SalesTerritory"))), Keys( Concept(ConceptAtomic("SalesTerritoryID")))) | Implication( Concept(ConceptAtomic("SalesTerritoryID")), Concept(ConceptAtomic("Name"))) |
| | Implication( Concept(ConceptAtomic("ProductID")), Concept(ConceptAtomic("Name"))) |
| SourceTable( "Products", ( Column( "ProductID", ConceptAtomic("ProductID")), Column( "Name", ConceptAtomic("Name")), Column( "ProductClass", ConceptAtomic("ProductClass")), Column( "ProductFamily", ConceptAtomic("ProductFamily"))), Keys( Concept(ConceptAtomic("ProductID")))) | Implication( Concept(ConceptAtomic("ProductID")), Concept(ConceptAtomic("ProductClass"))) |
| | Implication( Concept(ConceptAtomic("ProductID")), Concept(ConceptAtomic("ProductFamily"))) |
| | Implication( Concept(ConceptAtomic("SalesTransactions")), Concept(ConceptAtomic("CustomerID"))) |
| | Implication( Concept(ConceptAtomic("SalesTransactions")), Concept(ConceptAtomic("SalesTerritoryID"))) |
| SourceTable("Segment", ( Column( "Segment", ConceptAtomic("Segment")), Column( "Target", Metric)), Keys( Concept(ConceptAtomic("Segment")))) | Implication( Concept(ConceptAtomic("SalesTransactions")), Concept(ConceptAtomic("ProductID"))) |

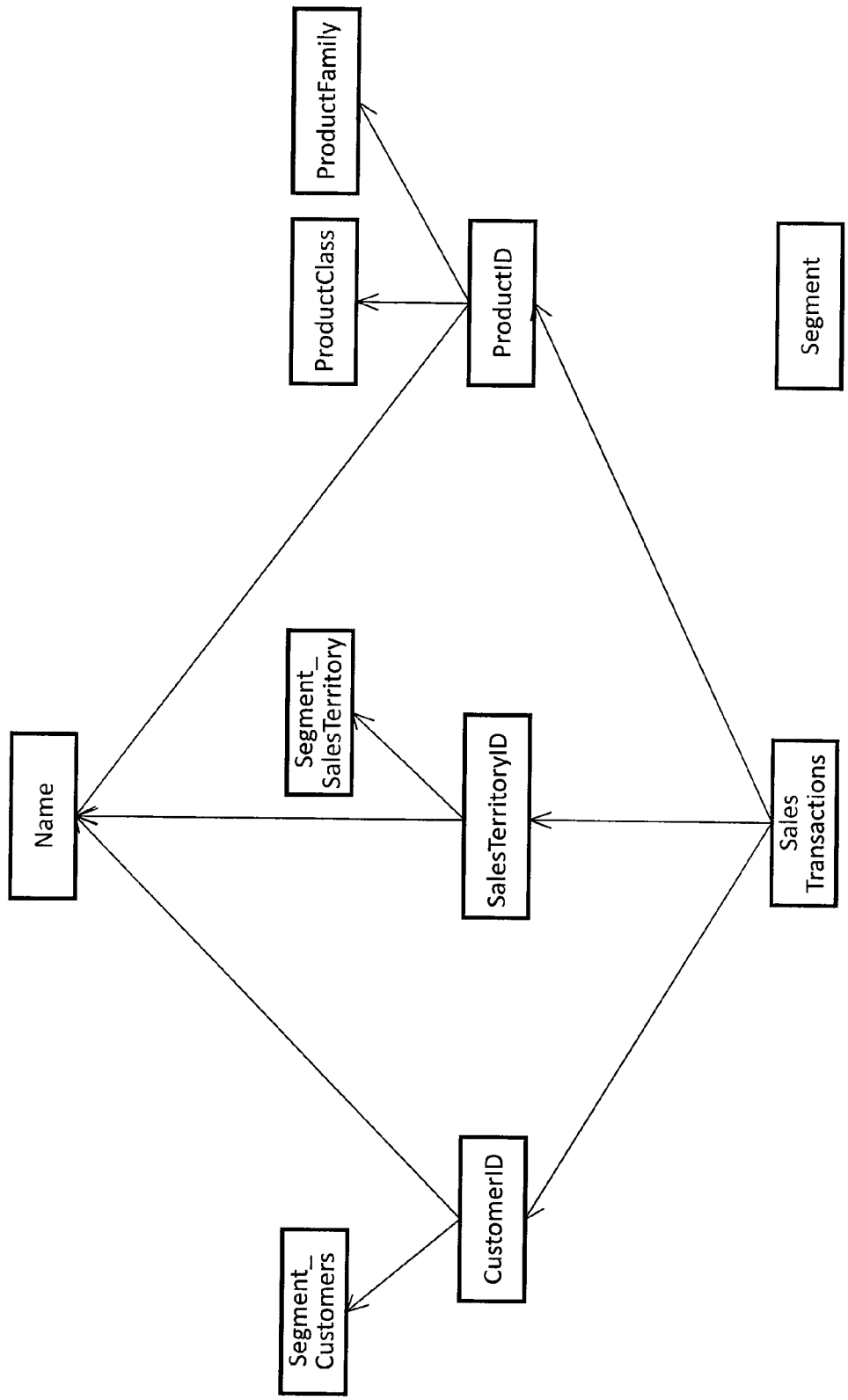
Figure 8 – Concept Partial Order

Figure 9 – Specification of Example Data with Distinguished Names

Source Table Specifications (551)

SourceTable("SalesTransactions", ( Column( "CustomerID", ConceptAtomic("CustomerID")),
    Column( "SalesTerritoryID", ConceptAtomic("SalesTerritoryID")),
    Column( "ProductID", ConceptAtomic("ProductID")),
    Column( "Price", Metric) ), Keys() )

SourceTable("Customers", ( Column( "CustomerID", ConceptAtomic("CustomerID")), — 554
    Column( "Name", ConceptAtomic("CustomerName")),
    Column( "Annual Revenue $M", Metric),
    Column( "Segment", ConceptAtomic("Segment_Customers"))),
    Keys( Concept(ConceptAtomic("CustomerID")))) )

555

SourceTable("SalesTerritory", ( Column( "SalesTerritoryID", ConceptAtomic("SalesTerritoryID")),
    Column( "Name", ConceptAtomic("SalesTerritoryName")),
    Column( "Segment", ConceptAtomic("Segment_SalesTerritory")),
    Keys( Concept(ConceptAtomic("SalesTerritoryID")))) )

SourceTable("Products", ( Column( "ProductID", ConceptAtomic("ProductID")), — 556
    Column( "Name", ConceptAtomic("ProductName")),
    Column( "ProductClass", ConceptAtomic("ProductClass")),
    Column( "ProductFamily", ConceptAtomic("ProductFamily")),
    Keys( Concept(ConceptAtomic("ProductID")))) )

SourceTable("Segment", ( Column( "Segment", ConceptAtomic("Segment")),
    Column( "Target", Metric) ),
    Keys( Concept(ConceptAtomic("Segment"))) )

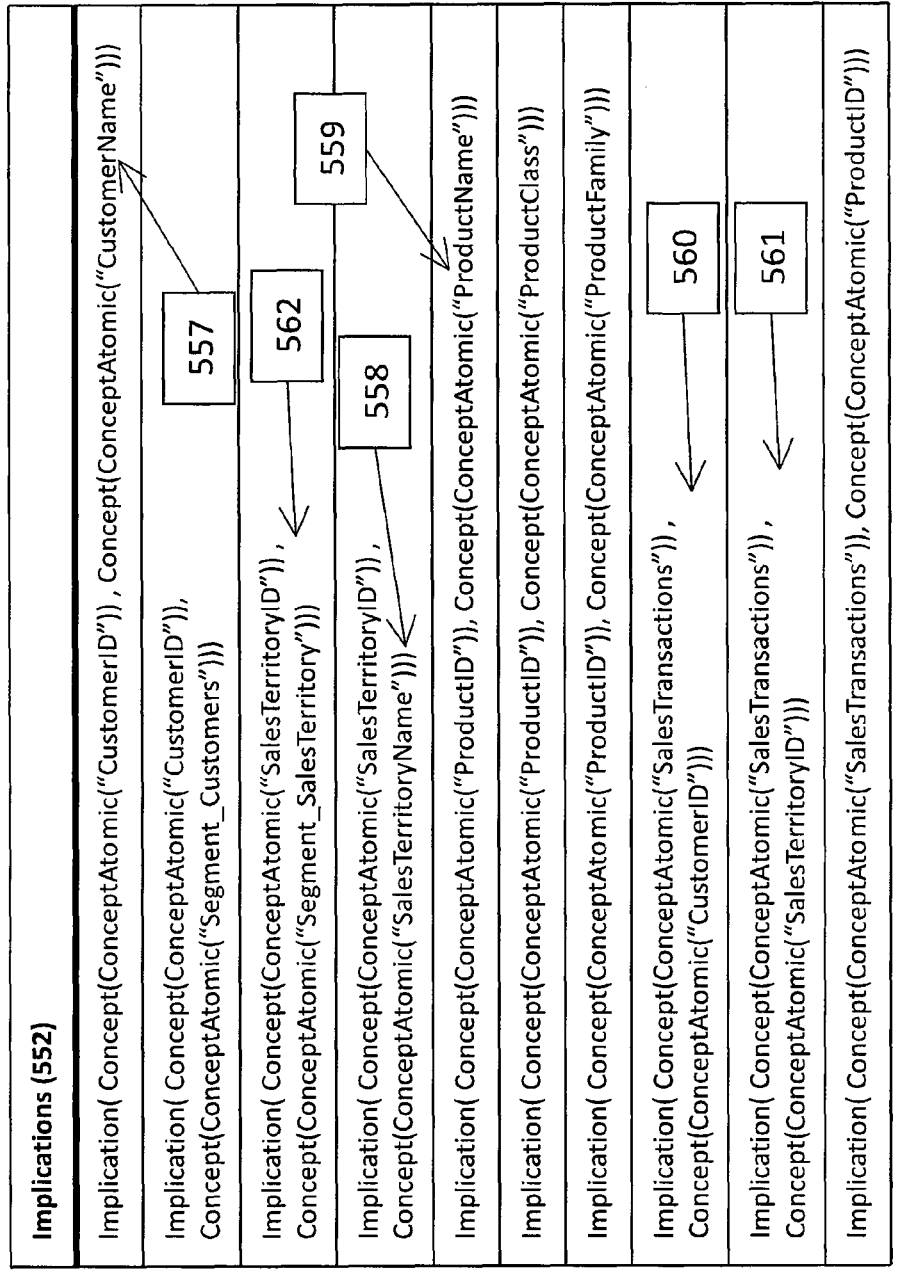
Figure 9 – (Continued)

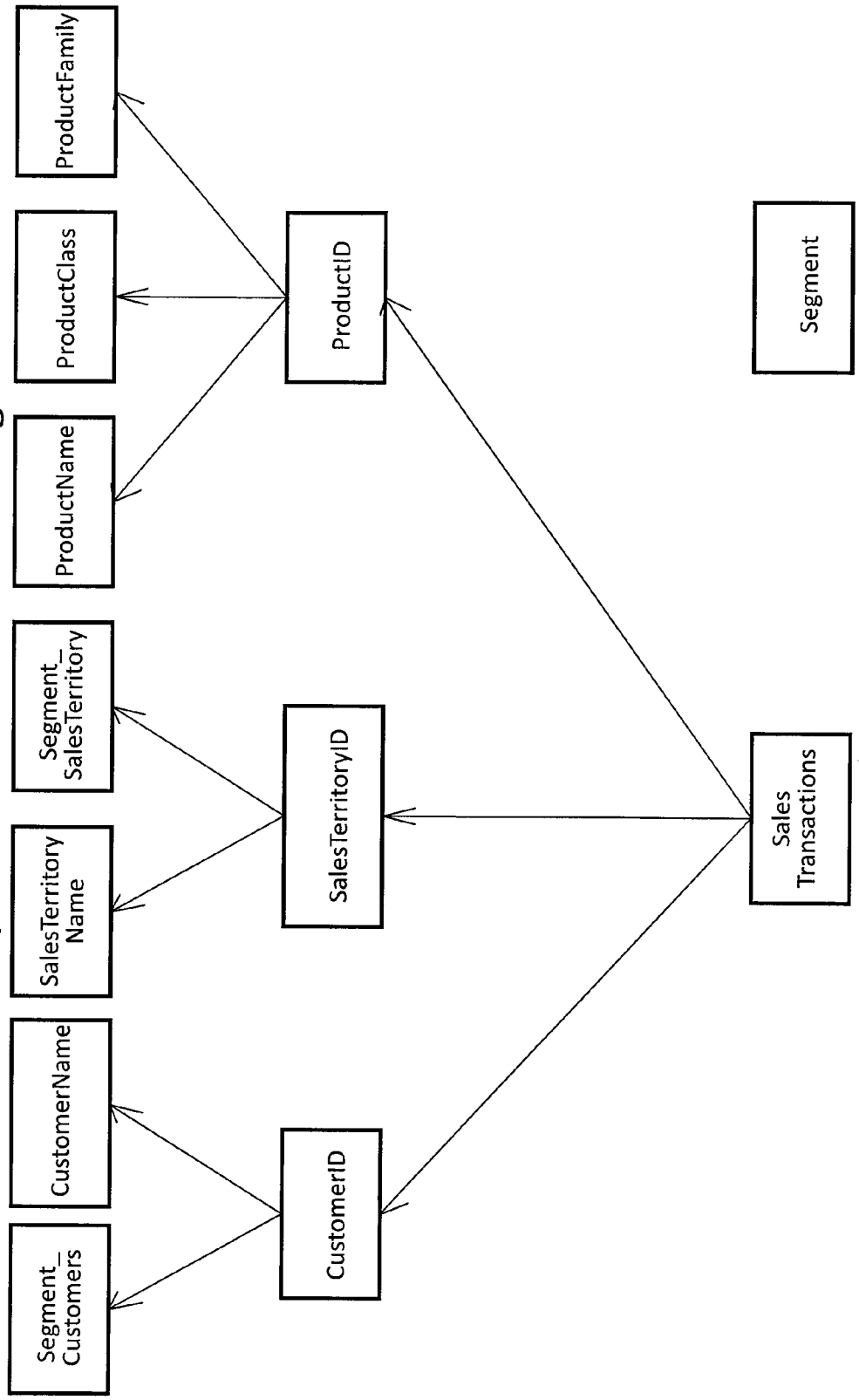
Figure 10 – Concept Partial Order with Distinguished Names

Figure 11 – Concepts Arising from Specification

| Concept | Sources |
|---|---|
| CustomerID | Discrete value column in SalesTransactions table |
| | Key column of Customers table |
| CustomerName | Discrete value column in Customer table |
| ProductClass | Discrete value column in Products table |
| ProductFamily | Discrete value column in Products table |
| ProductID | Key column in Products table |
| | Discrete value column in SalesTransactions table |
| ProductName | Discrete value column in Products table |
| SalesTerritoryID | Key column in SalesTerritory table |
| SalesTerritoryName | Discrete value column in SalesTerritory table |
| SalesTransactions | SalesTransactions is a table without a key |
| Segment | Key column in Segment table |
| Segment_Customers | Discrete value column in Customers table. Unique concept generate to disambiguate from Segment_SalesTerritory because multiple paths from SalesTransactions converge on Segment |
| Segment_SalesTerritory | Discrete value column in SalesTerritory table. Unique concept generate to disambiguate from Segment_Customers because multiple paths from SalesTransactions converge on Segment |

Figure 12 – Additional Specification of Implications and Identifications

| Implications |
| --- |
| Implication( Concept(ConceptAtomic("ProductName")), Concept(ConceptAtomic("ProductClass"))) |
| Implication( Concept(ConceptAtomic("ProductClass")), Concept(ConceptAtomic("ProductFamily"))) |

| Identifications |
| --- |
| Identification(Concept(ConceptAtomic("Segment_SalesTerritory")), Concept(ConceptAtomic("Segment"))) |
| Identification(Concept(ConceptAtomic("Segment_Customers")),Concept(ConceptAtomic("Segment"))) |
| Identification(Concept(ConceptAtomic("SalesTerritoryID")), Concept(ConceptAtomic("SalesTerritoryName"))) |
| Identification(Concept(ConceptAtomic("CustomerName")) , Concept(ConceptAtomic("CustomerID"))) |

570

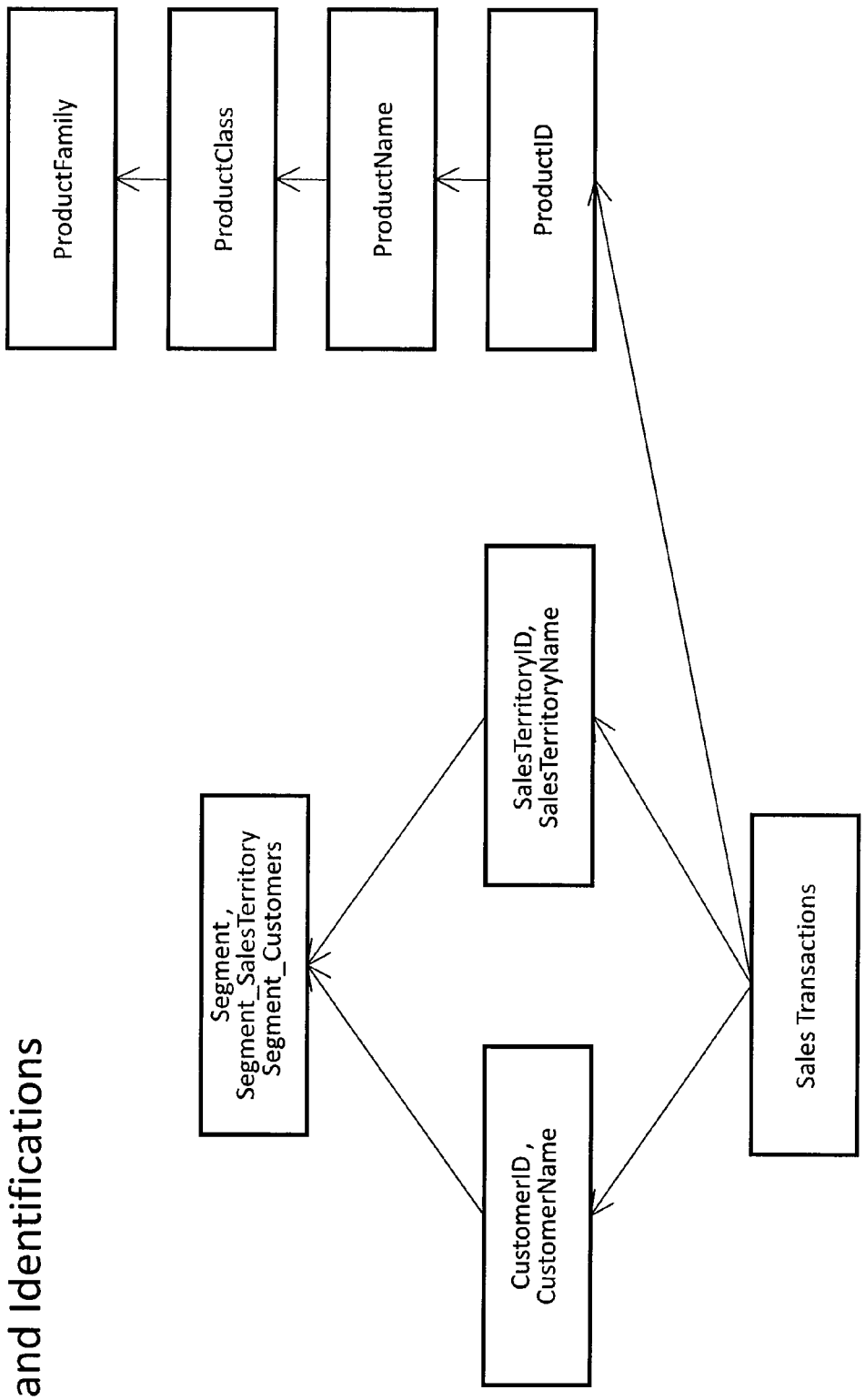
Figure 13 – Concept Partial Order after Additional Implications and Identifications

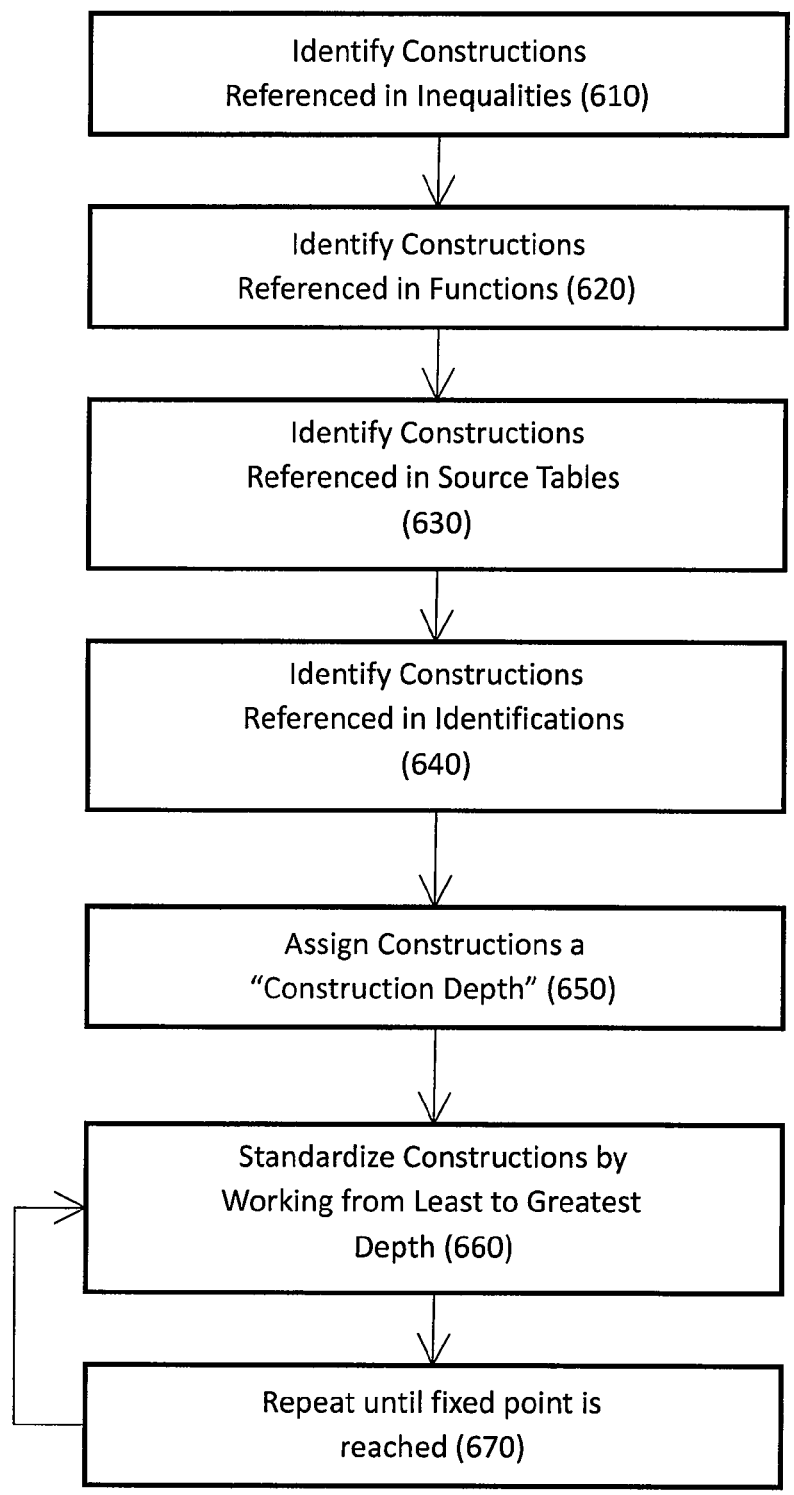
Figure 14 – Create Constructed Concepts

Figure 15 – AdditionalConceptAtomicConstructors

| Constructor | ConceptAtomic Type Constructor Signatures | Description |
|---|---|---|
| Relation | Relation( ConceptAtomic, RelationIdentifier) | Identifies the concept associated with a logical copy of the lattice concepts connected to the original lattice concepts with a relation |
| Copy | Copy(ConceptAtomic, CopyIdentifier) | Identifies the concept associated with a logical copy of the lattice concepts that is disconnected from original set of latticeconcepts |
| FunctionToConcept | FunctionToConcept(FunctionName , Concept ) | Creates a new concept from the distinct values of a function evaluated on a concept |
| Assert | Assert( Concept , Concept ) | Creates a new concept that provides a direct linkage from the first concept to second concept using many-to-one links from the first to the second |

100 → Relation
101 → Copy
102 → FunctionToConcept
105 → Assert

| Type | Constructor Signature |
|---|---|
| RelationIdentifier | RelationIdentifier( String ) |
| CopyIdentifier | CopyIdentifier( String ) |

103 → RelationIdentifier
104 → CopyIdentifier

Figure 16 – Concept Constructor Implications
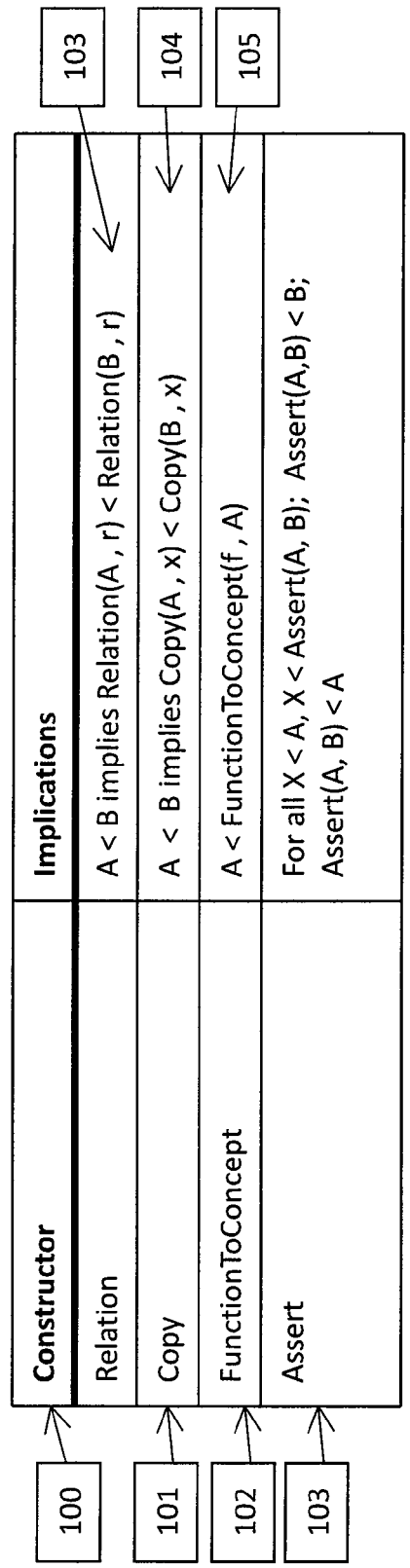
| Constructor | Implications |
|---|---|
| Relation | A < B implies Relation(A , r) < Relation(B , r) |
| Copy | A < B implies Copy(A , x) < Copy(B, x) |
| FunctionToConcept | A < FunctionToConcept(f , A) |
| Assert | For all X < A, X < Assert(A, B); Assert(A,B) < B; Assert(A, B) < A |

Figure 17 – Additional Specification of Functions

Function Specification

Function_Transform( FunctionName("SegmentAnnualRevenue") ,
  Expression ("case when [Annual Revenue $M] >= 1000 then 'Enterpise'
     when [Annual Revenue $M] >=100 then 'Commercial'
     when [Annual Revenue $M] >= 1 then 'SMB' else 'Consumer' end "),
  Concept (ConceptAtomic("CustomerID")) ,
  Max )

Constructed Concept

FunctionToConcept( Function("SegmentAnnualRevenue") , Concept(ConceptAtomic("CustomerID") ))

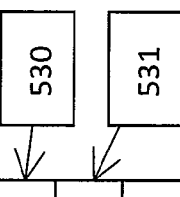
Figure 18 – SegmentAnnualRevenue Calculation

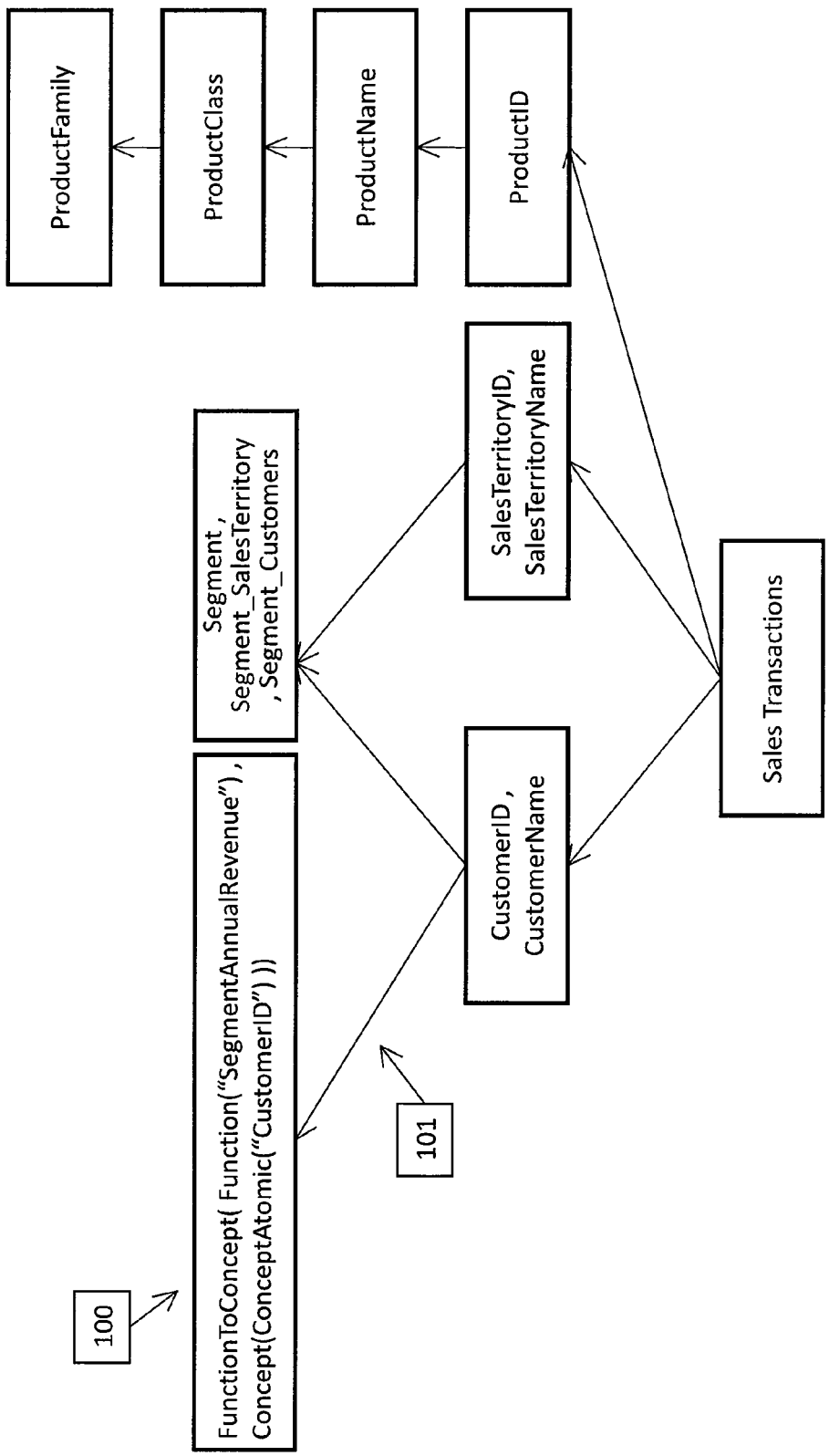
Figure 19 – Concept Partial Order after Constructed Concept

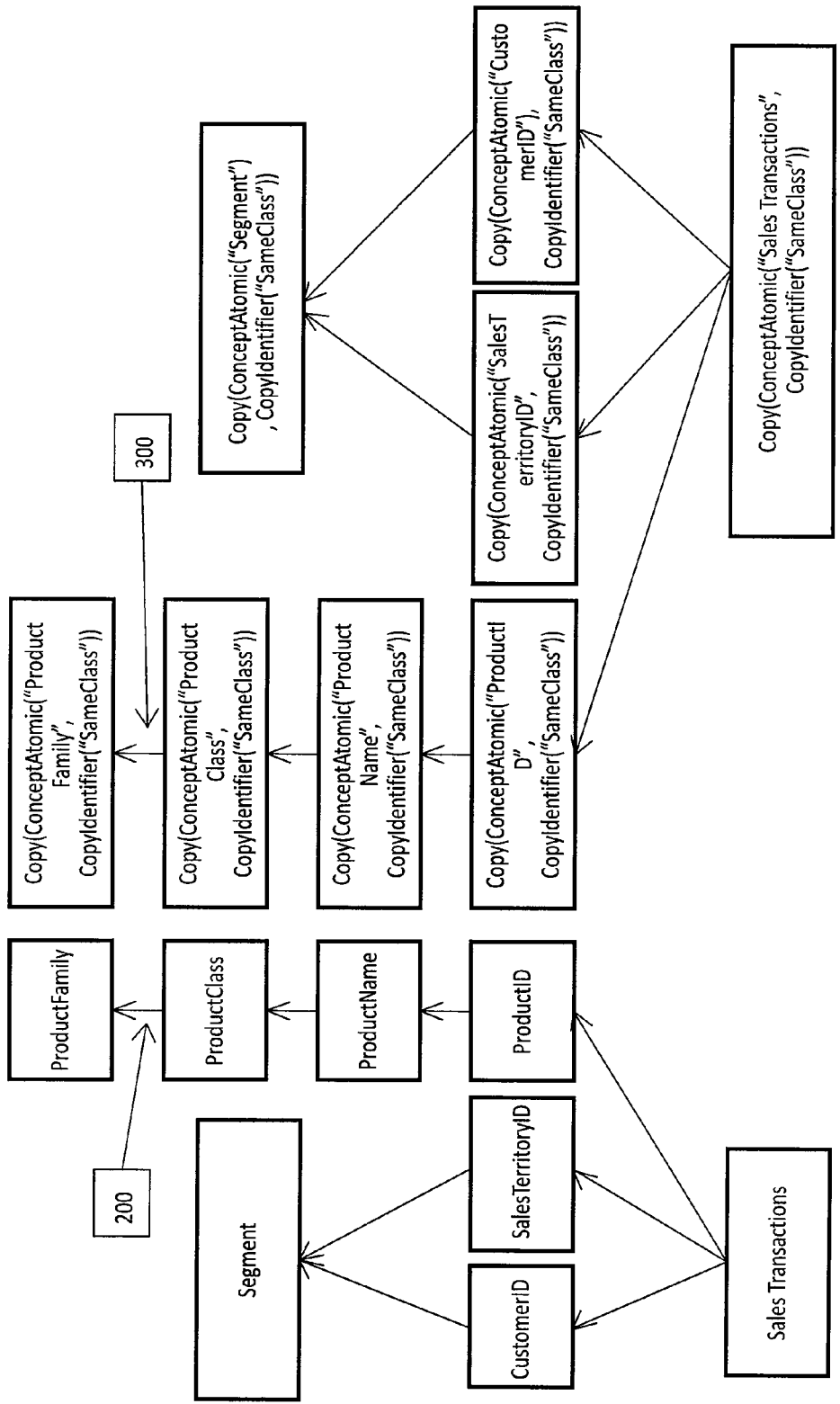
Figure 20 – Concept Partial Order after Copy Constructor

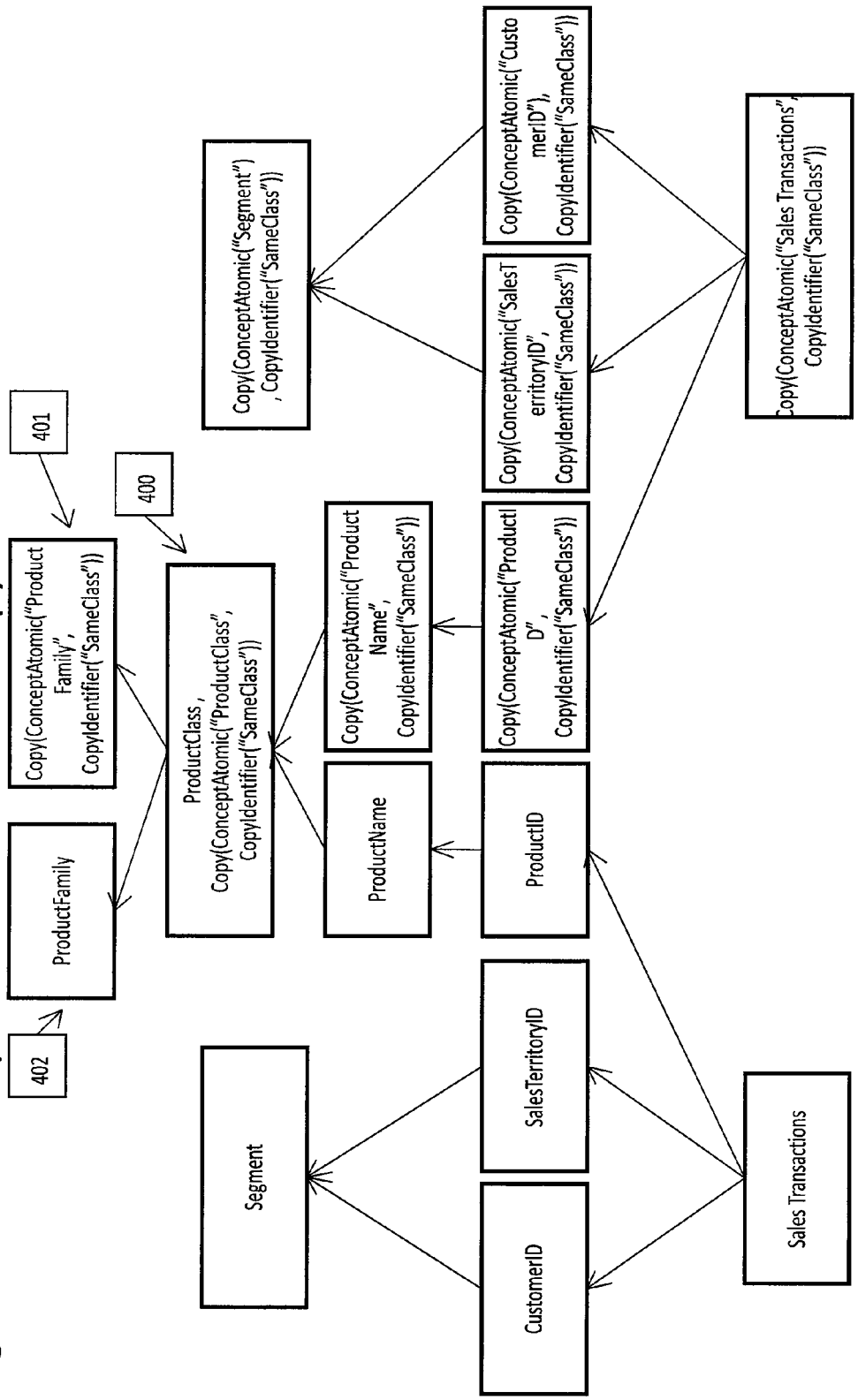
Figure 21 – Concept Partial Order after Copy Constructor and Identification Figure 22 – Example of Relation Concept Constructor

| Prior Year Quarters | |
|---|---|
| Qtr | PriorQtrsRelation( ConceptAtomic("Quarter"), RelationIdentifier("PriorYearQuarters")) |
| Q1 2009 | Q4 2008 |
| Q1 2009 | Q3 2008 |
| Q1 2009 | Q2 2008 |
| Q1 2009 | Q1 2008 |
| Q4 2008 | Q3 2008 |
| Q4 2008 | Q2 2008 |
| Q4 2008 | Q1 2008 |
| Q4 2008 | Q4 2007 |

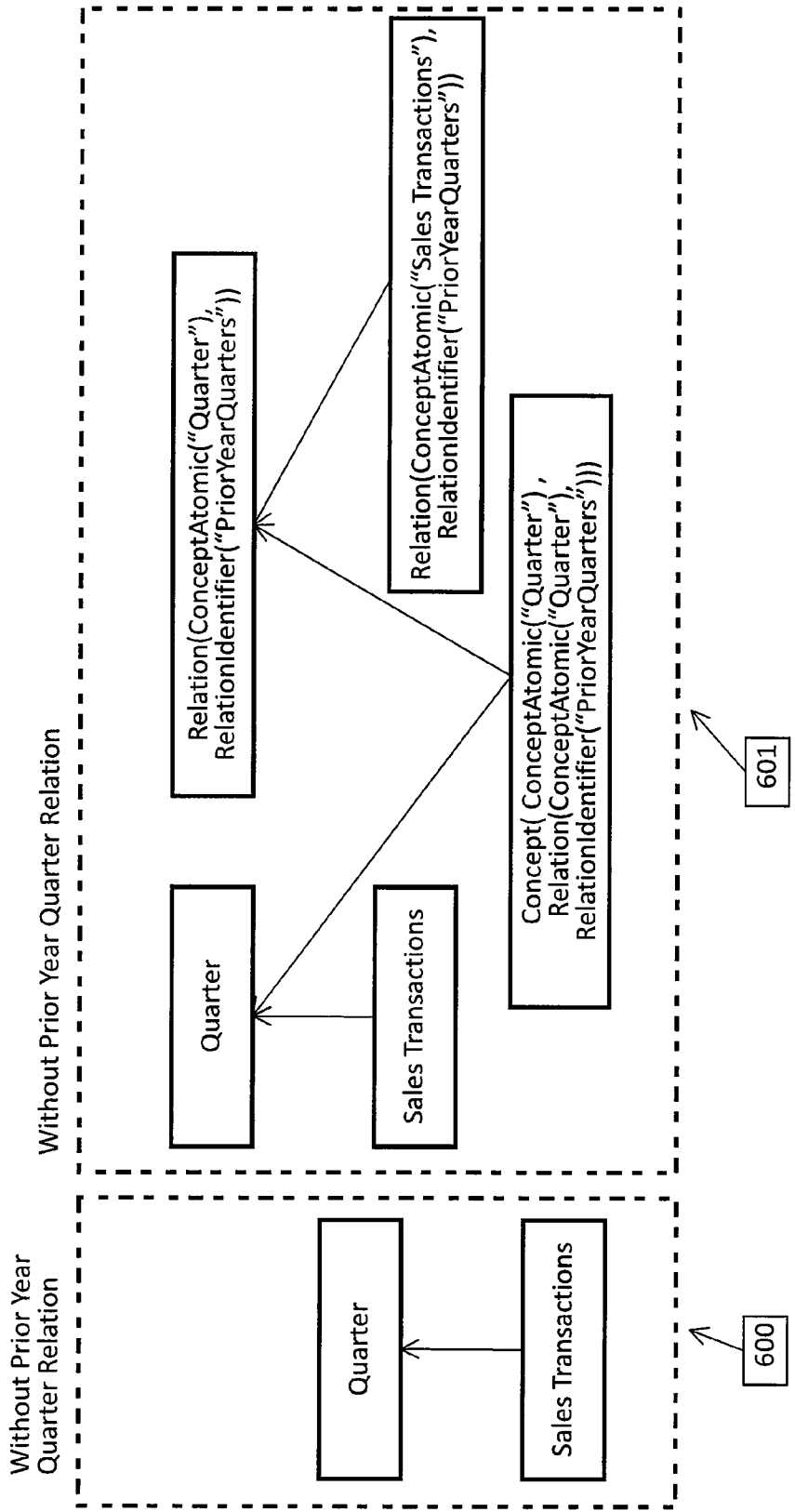
Figure 23 – Addition of Relation Constructor

Figure 24 – Calculation of Construction Depth

| Type | ConstructionDepthCalculation |
|---|---|
| Concept | ConstructionDepth(Concept(Set{ConceptAtomic}))=Max(ConstructionDepth(<each member of the set of ConceptAtomic>)) |
| ConceptAtomic | ConstructionDepth(ConceptAtomic(String)) = 1 |
| | ConstructionDepth(ConceptAtomic_Table(TableName)) = 1 |
| | ConstructionDepth(FunctionToConcept(FunctionName,Concept)) = 1 +Max(ConstructionDepth(FunctionName),ConstructionDepth(Concept)) |
| | ConstructionDepth(Relation(ConceptAtomic,RelationIdentifier)) = Max(ConstructionDepth(ConceptAtomic),1+ConstructionDepth(RelationIdentifier))) |
| | ConstructionDepth(Copy(ConceptAtomic,CopyIdentifer)) = ConstructionDepth(ConceptAtomic) |
| | ConstructionDepth(Assert(Concept1,Concept2)) = 1 + Max(ConstructionDepth(Concept1),ConstructionDepth(Concept2)) |
| RelationIdentifier | ConstructionDepth(RelationIdentifier(String)) = 0 |
| | ConstructionDepth(<Relationsconstructedwithfunctions>) = Max(ConstructionDepth(<dependentfunctions>)) |
| Function | ConstructionDepth(FunctionName(String),Function_Expression) = Max(ConstructionDepth(<dependentfunctions>)) |
| | ConstructionDepth(Function_Transform(FunctionName(string),Function_Expression, ConceptSubset,Aggregation)) = Max(ConstuctionDepth(<dependent functions in function expression>),ConstructionDepth(ConceptSubset)) |
| | ConstructionDepth(Function_Set(ConceptSubset)) = ConstructionDepth(ConceptSubset) |
| ConceptSubset | ConstructionDepth(ConceptSubset_Function(Function_Expression)) = Max(ConstructionDepth(<depedentfunctionsinfunctionexpression>)) |
| | ConstructionDepth(<ExpressioninConceptSubset>) = Max(ConstructionDepth(<DependentConceptSubset>)) |
| | ConstructionDepth = 0f or all other constructors |

Figure 25 – Create Lattice of Concepts
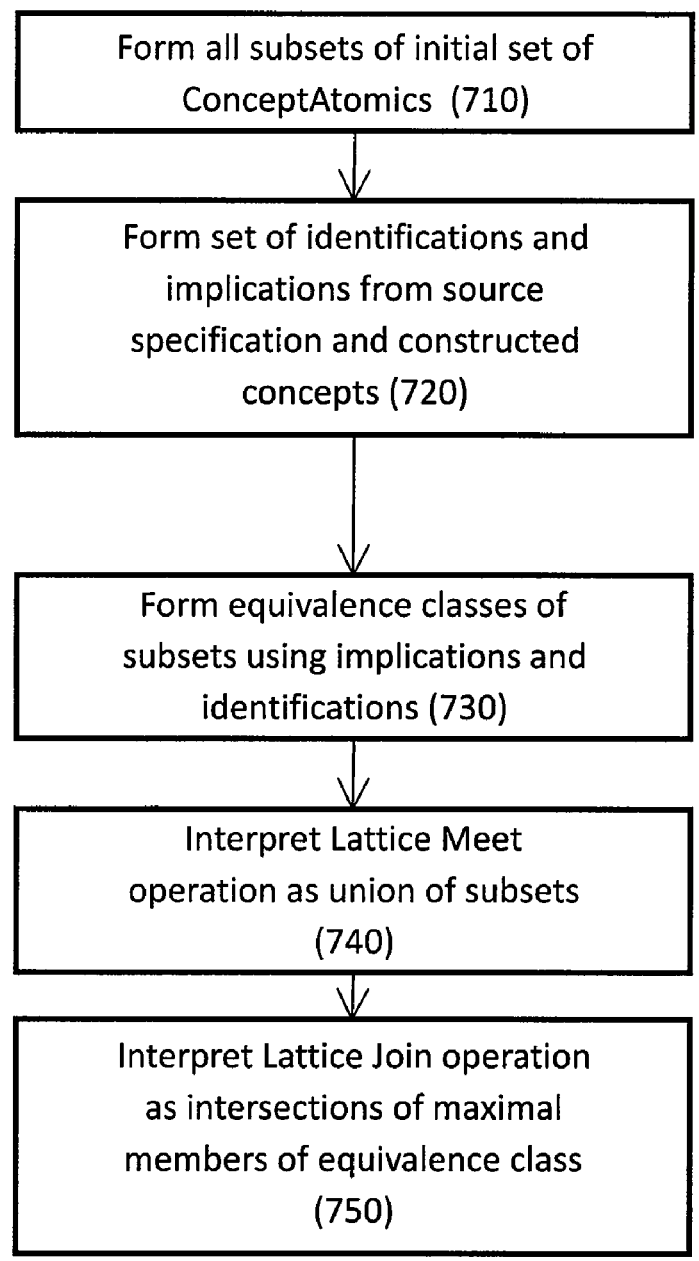

Figure 26 – Equivalence Classes of Subsets of Atomic Concepts

| Subset of ConceptAtomics | Equivalence Class ID |
|---|---|
| Segment | 1 |
| SalesTerritoryID | 2 |
| SalesTerritoryID , Segment | 2 |
| CustomerID | 4 |
| CustomerID , Segment | 4 |
| CustomerID , SalesTerritoryID | 5 |
| CustomerID , SalesTerritoryID , Segment | 5 |
| SalesTransactions | 3 |
| SalesTransactions , Segment | 3 |
| SalesTransactions , SalesTerritoryID | 3 |
| SalesTransactions , Segment , SalesTerritoryID | 3 |
| SalesTransactions , CustomerID | 3 |
| SalesTransactions , CustomerID , Segment | 3 |
| SalesTransactions , CustomerID , SalesTerritoryID | 3 |
| SalesTransactions , CustomerID , Segment , SalesTerritoryID | 3 |
| <Empty> | 6 |

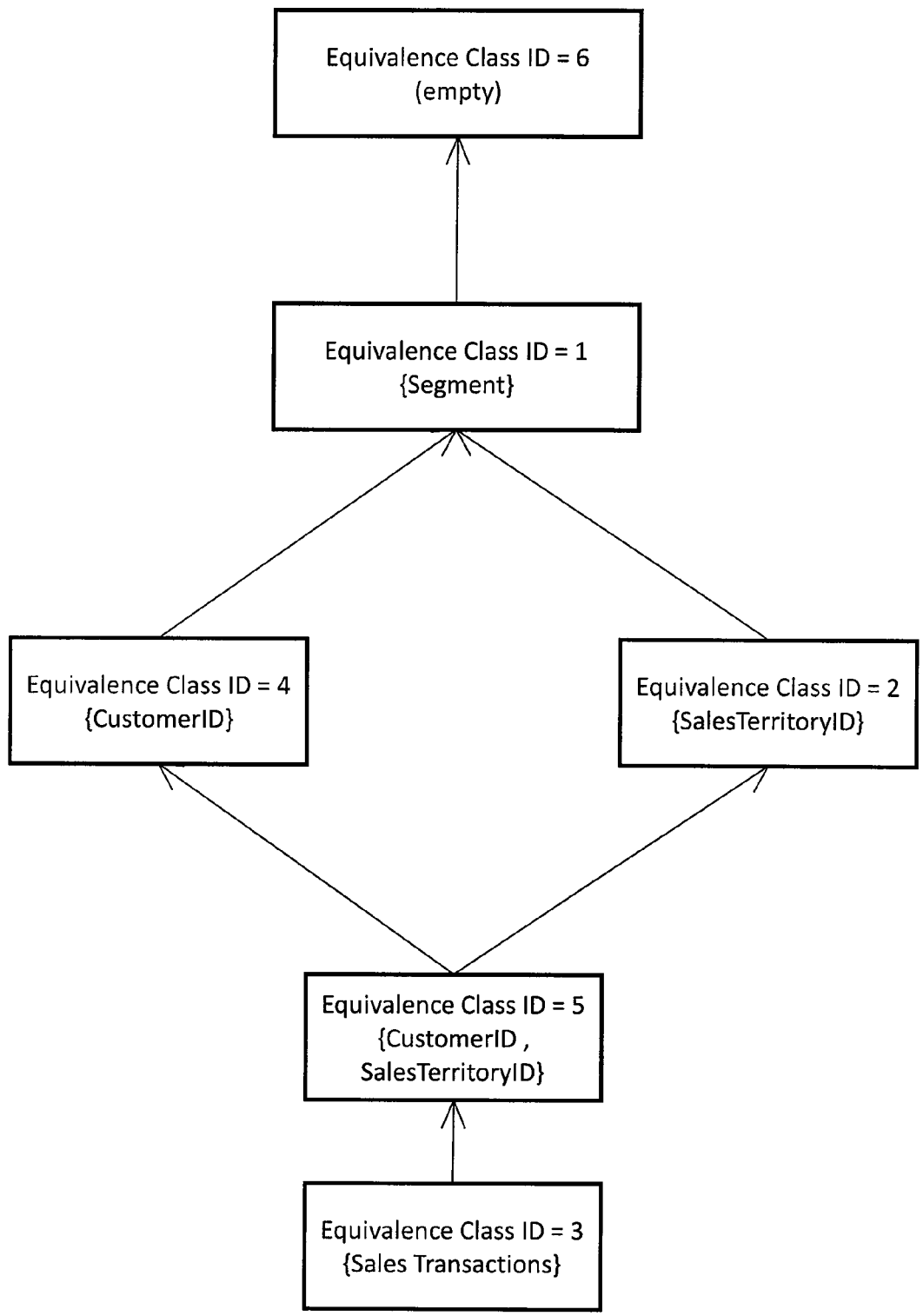
Figure 27 – Lattice of Equivalence Classes

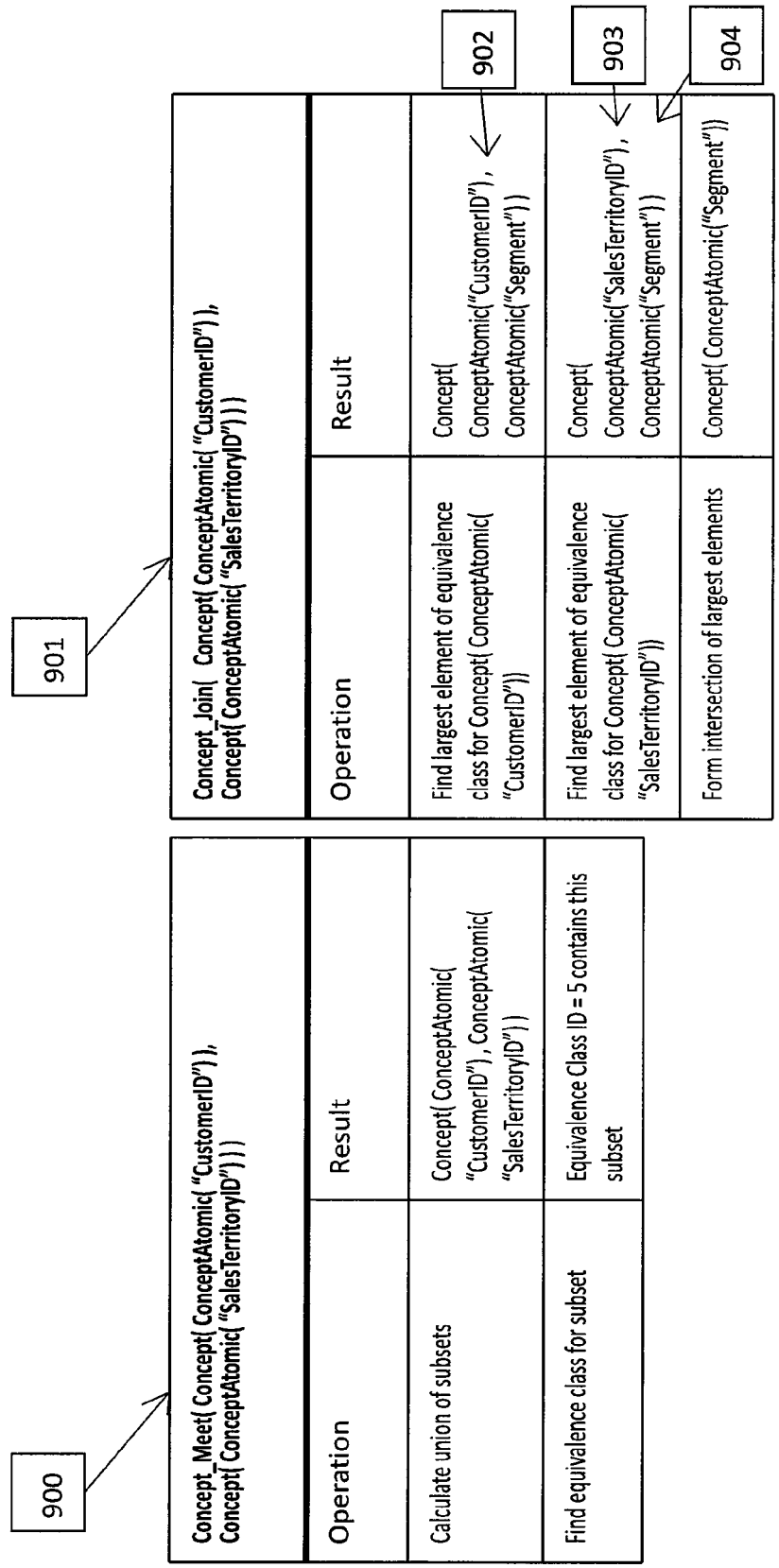
Figure 28 – Meet and Join Calculations

Figure 29 – Convert Source Data Into Elements And Links
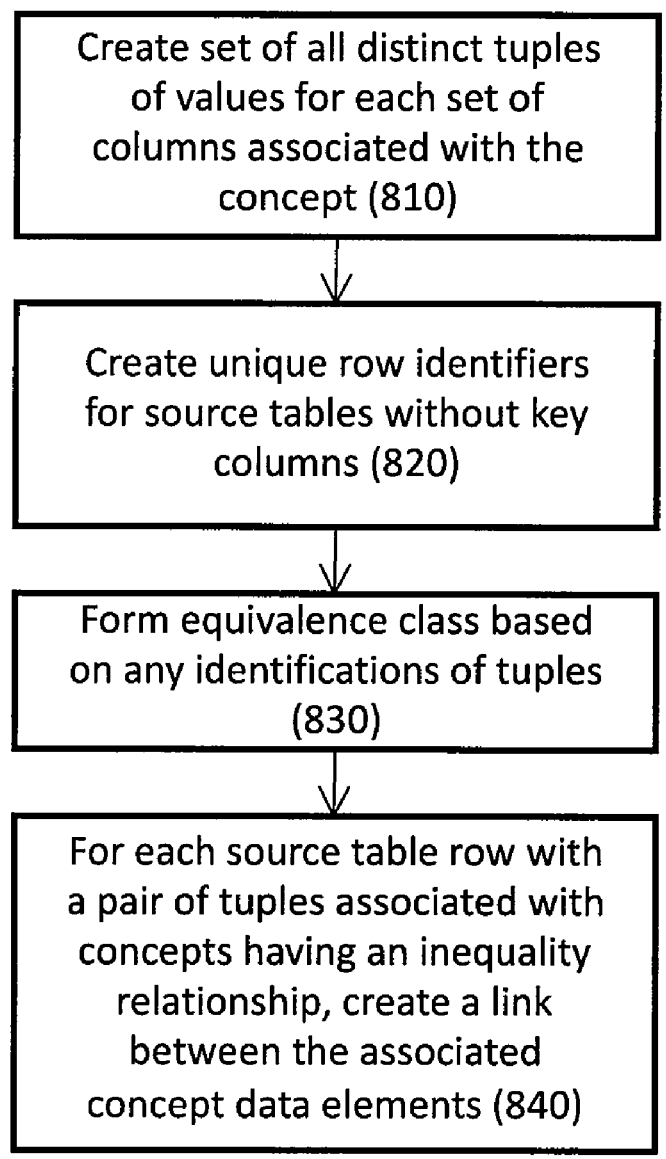

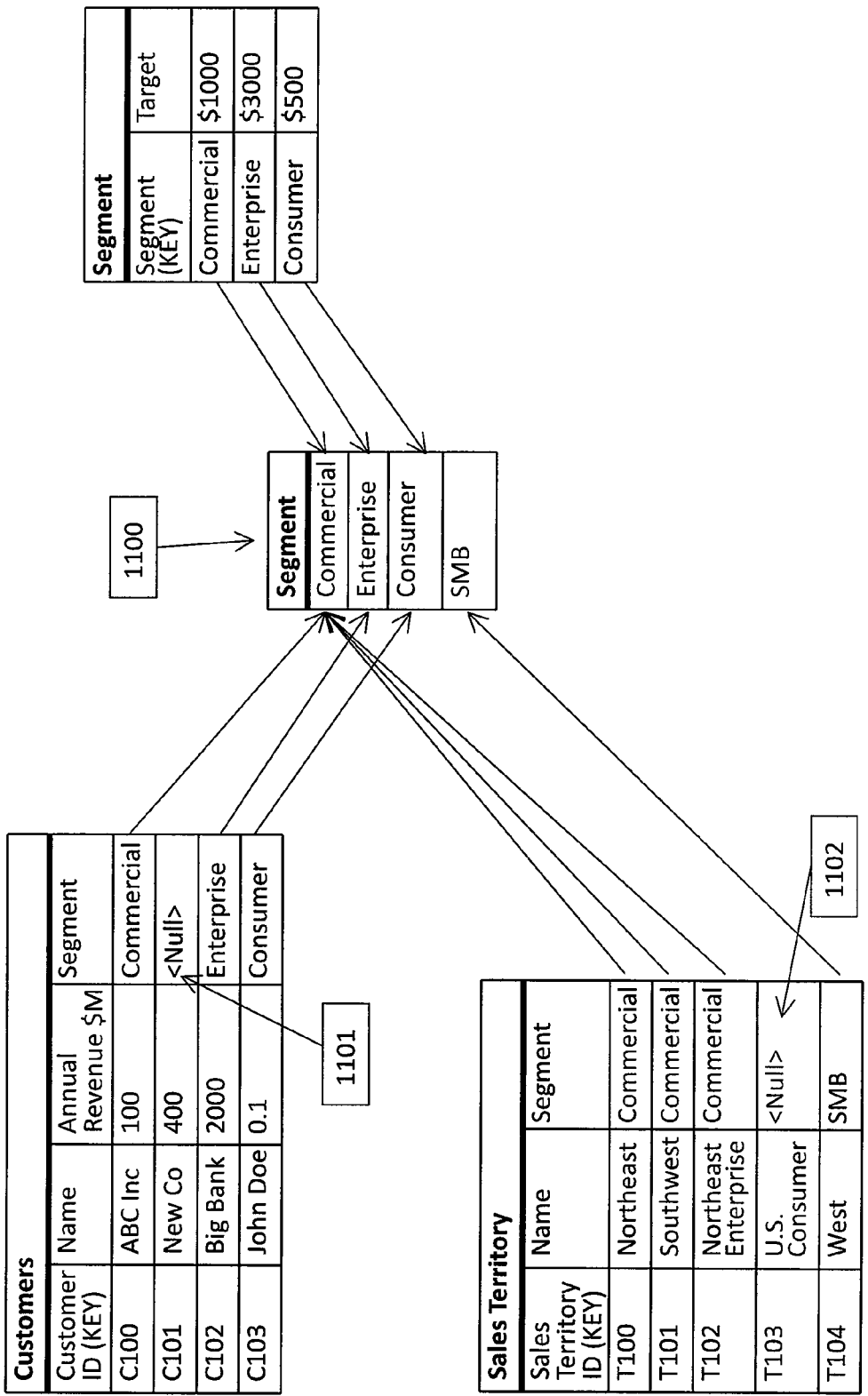
Figure 30 – Identifying Distinct Tuples

Figure 31 – Complete Set of Concepts

| Product ID |
|---|
| P100 |
| P101 |
| P102 |
| P103 |

| Product Name |
|---|
| X1000 |
| X2000 |
| X3000 |

| Product Class |
|---|
| Platform |
| Department |
| Data Center |

| Product Family |
|---|
| Base |
| High End |

1200

| Sales Transactions |
|---|
| 1 |
| 2 |
| 3 |
| 4 |

| Sales Territory | |
|---|---|
| Sales Territory ID | Sales Territory Name |
| T100 | Northeast |
| T101 | Southwest |
| T102 | Northeast Enterprise |
| T103 | U.S. Consumer |
| T104 | West |

| Segment |
|---|
| Commercial |
| Enterprise |
| Consumer |
| SMB |

| Customer ID | |
|---|---|
| Customer ID | Customer Name |
| C100 | ABC Inc |
| C101 | New Co |
| C102 | Big Bank |
| C103 | John Doe |

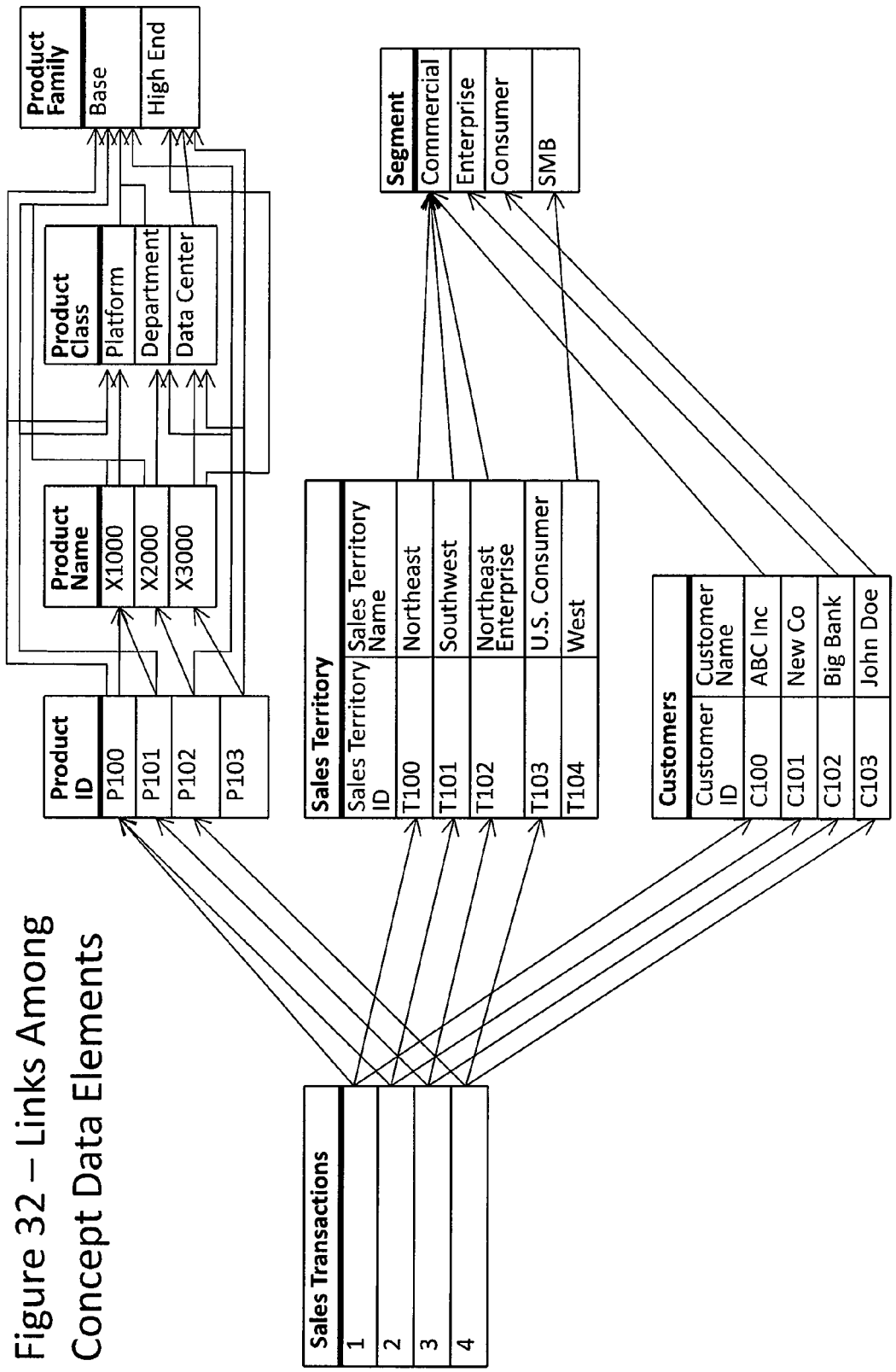
Figure 32 – Links Among Concept Data Elements

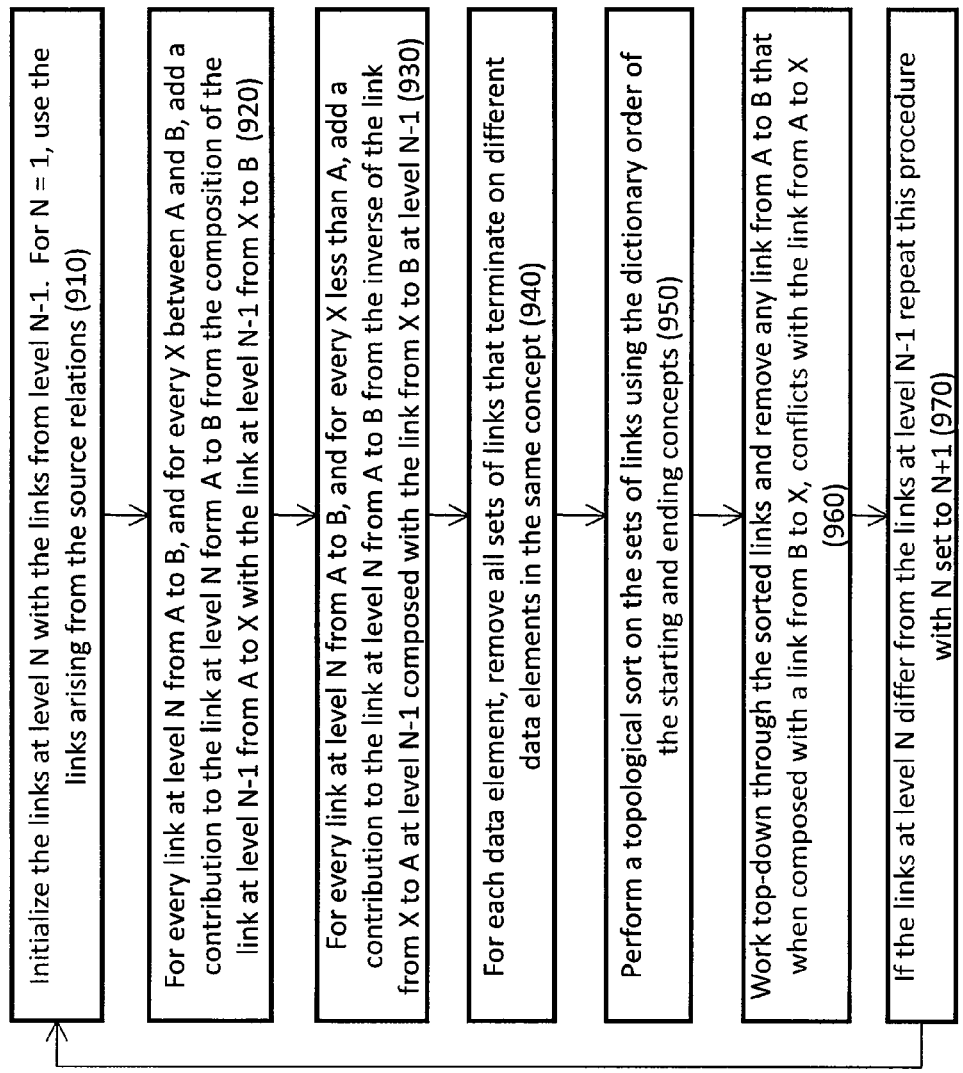
Figure 33 – Conform Source Data to Partial Order Constraints

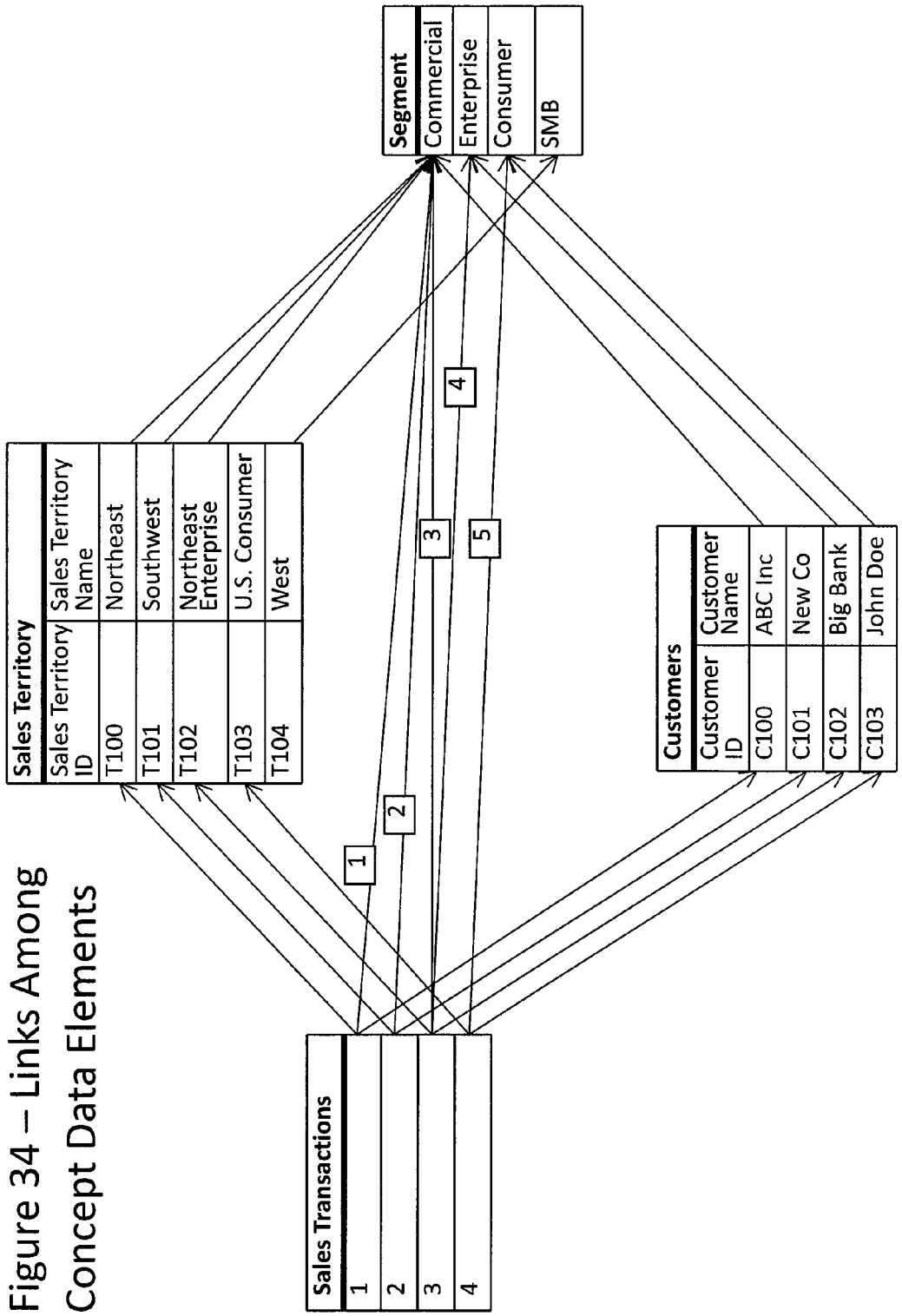
Figure 34 – Links Among Concept Data Elements

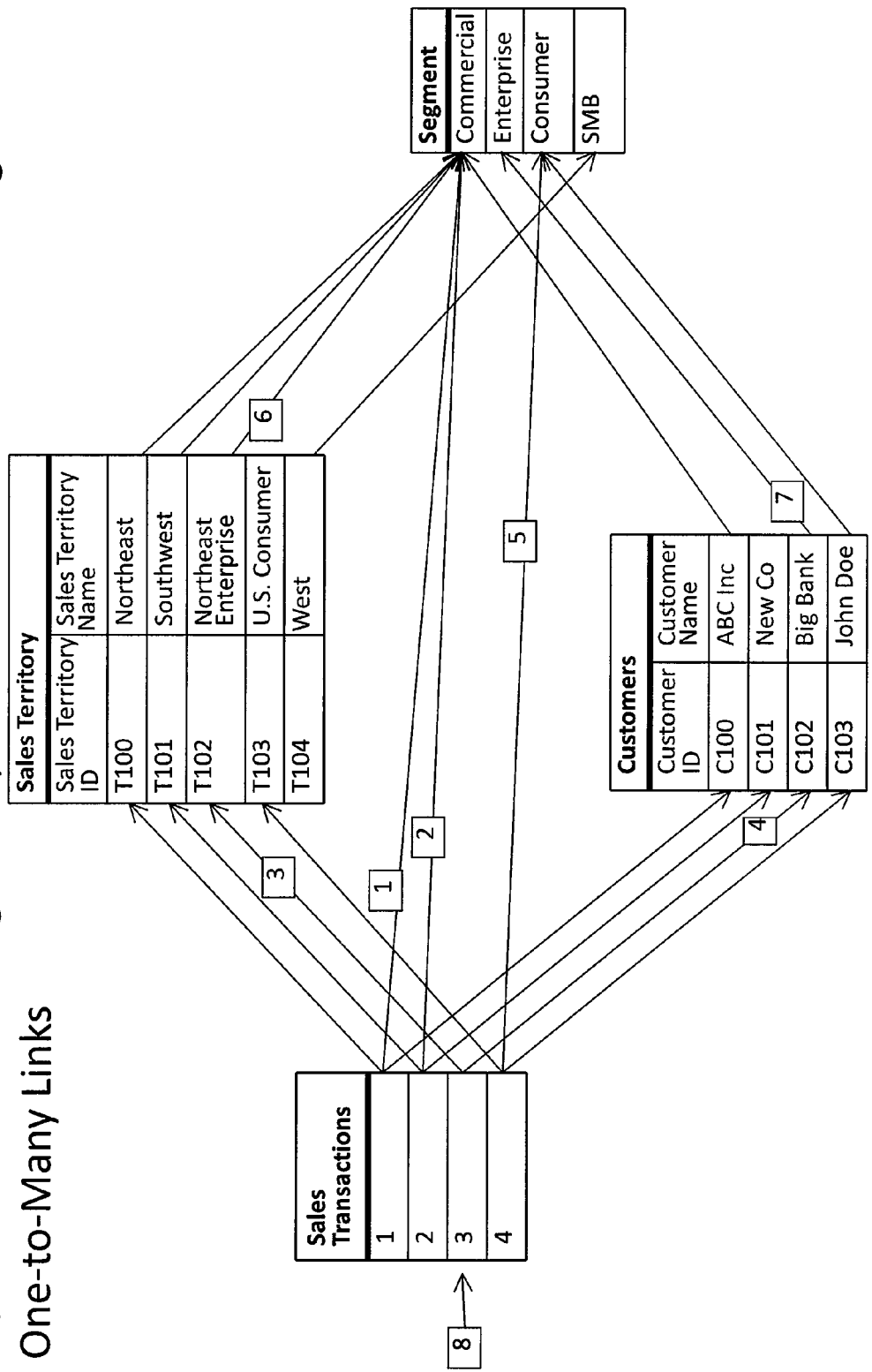
Figure 35 – Links Among Concept Data Elements after Removing One-to-Many Links

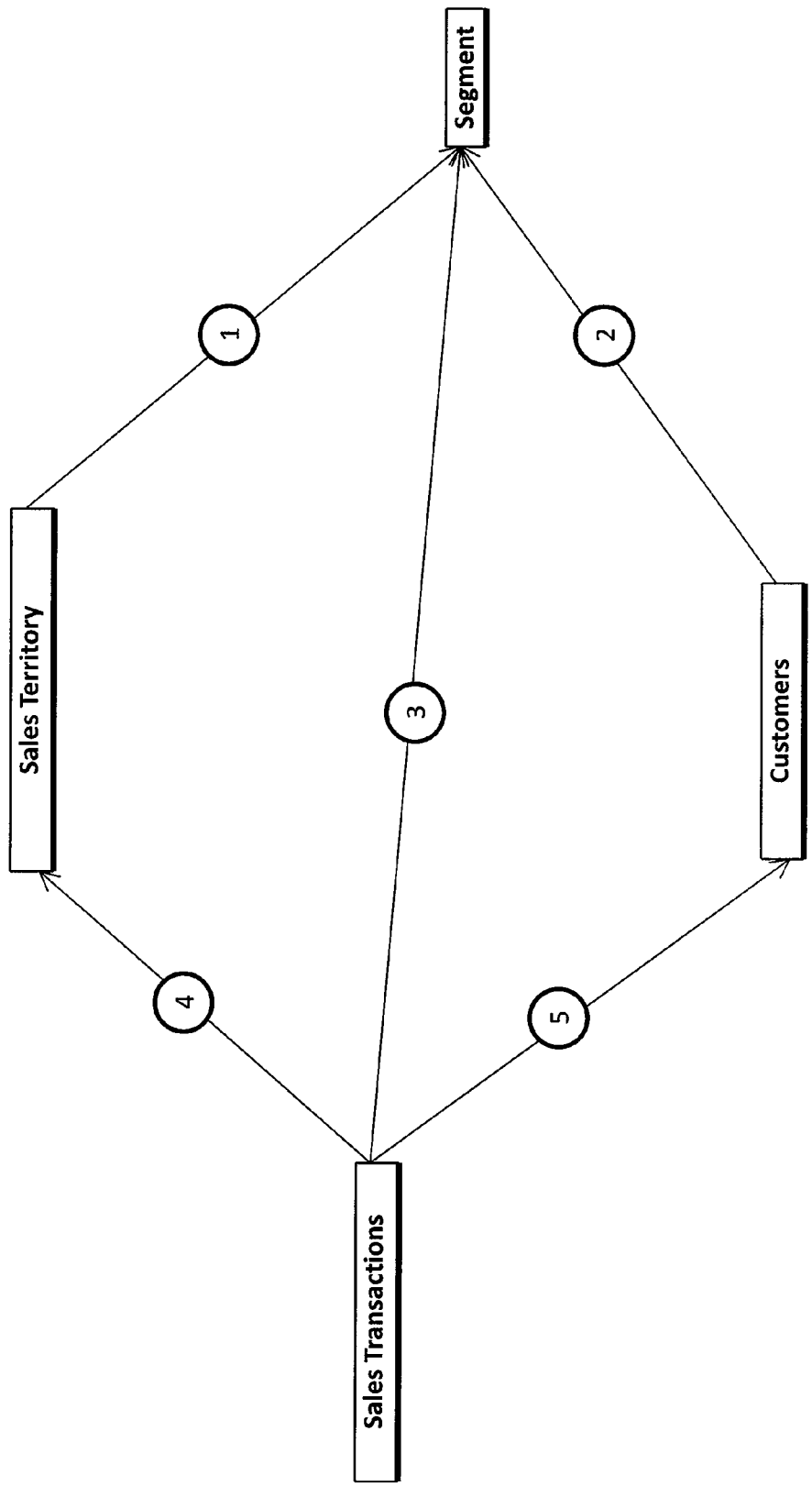
Figure 36 – Topological Sort of the Sets of Links

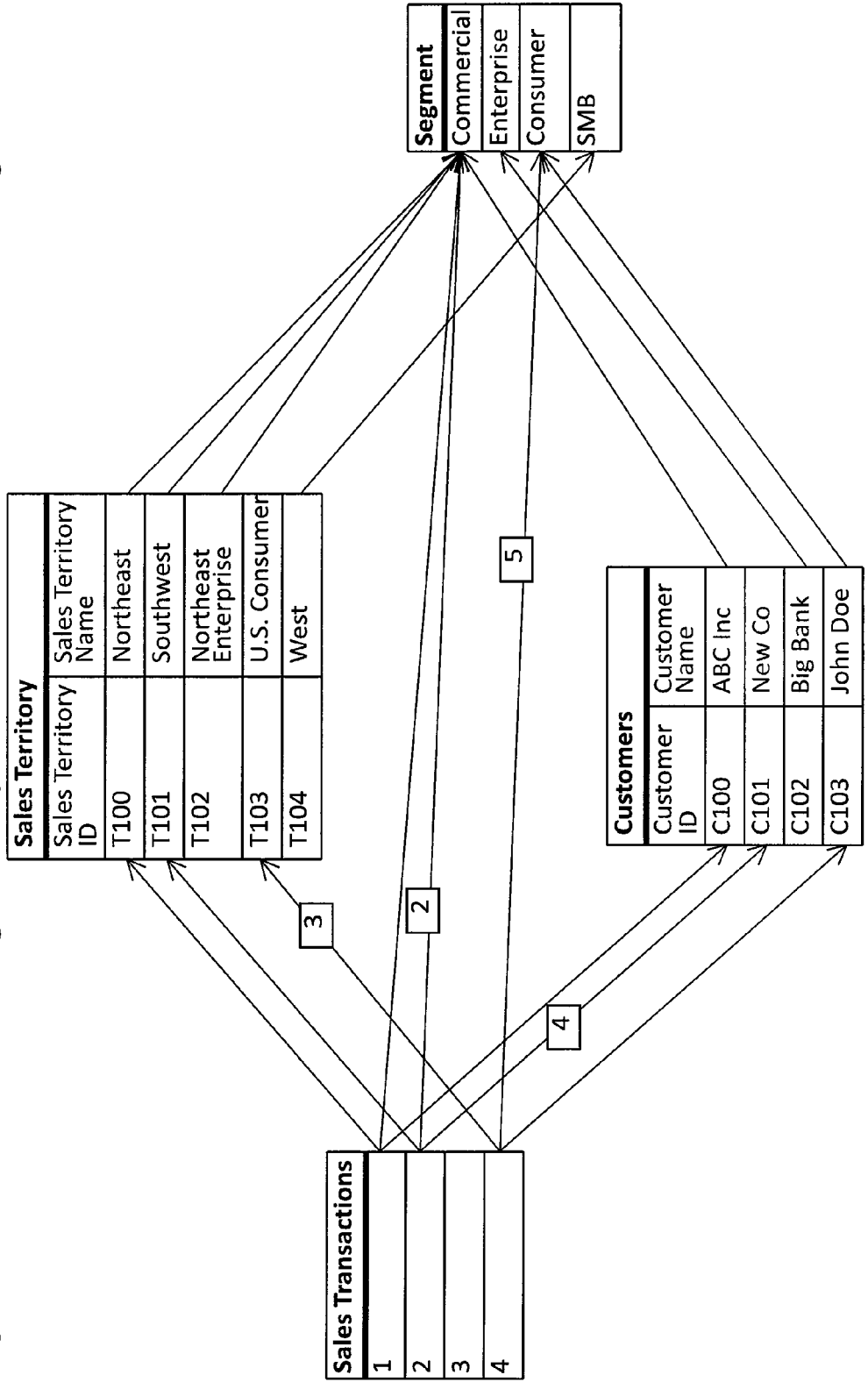
Figure 37 – Links Among Concept Data Elements after Removing Conflicts

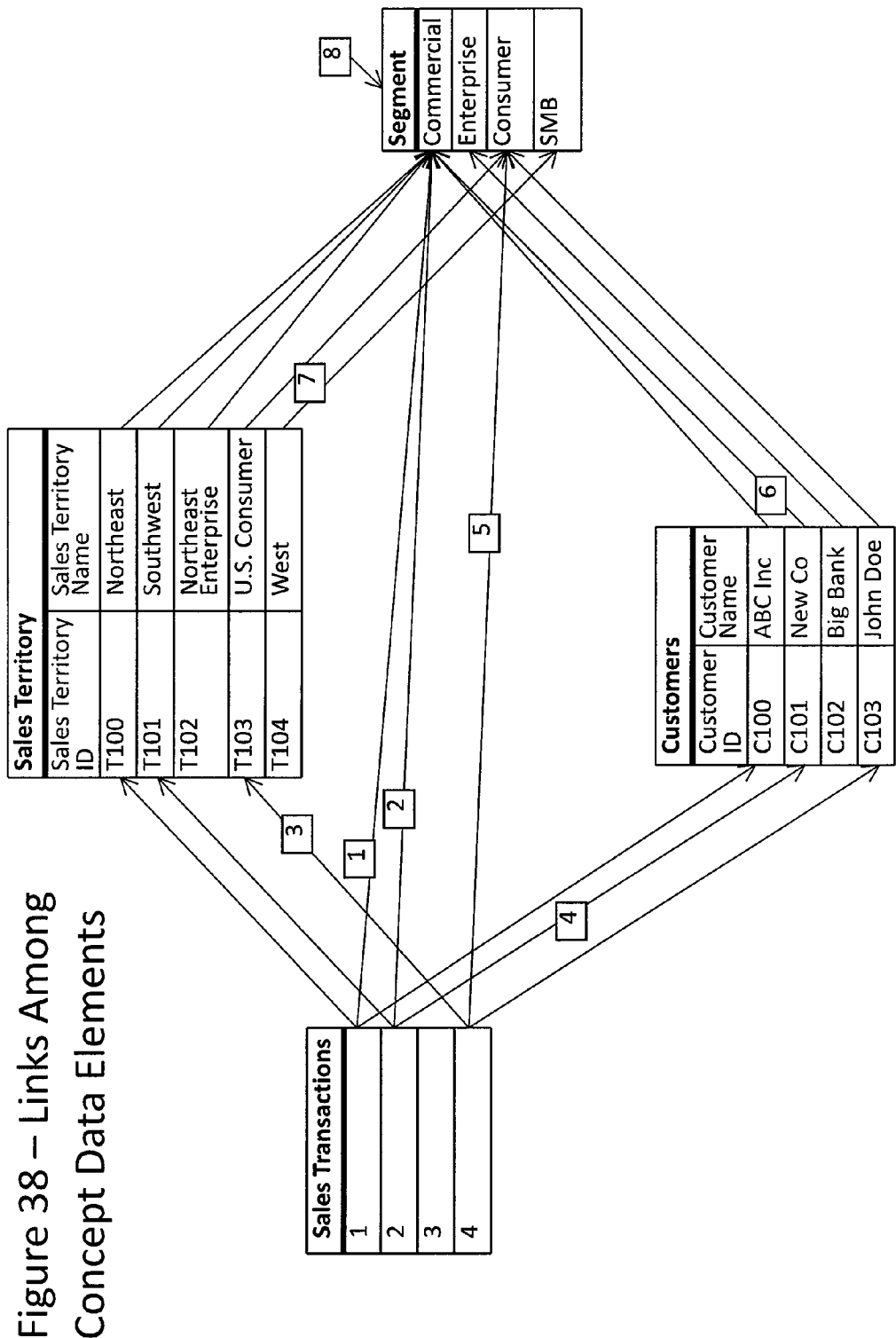
Figure 38 – Links Among Concept Data Elements

Figure 39 – Example Lattice for Link Contributions
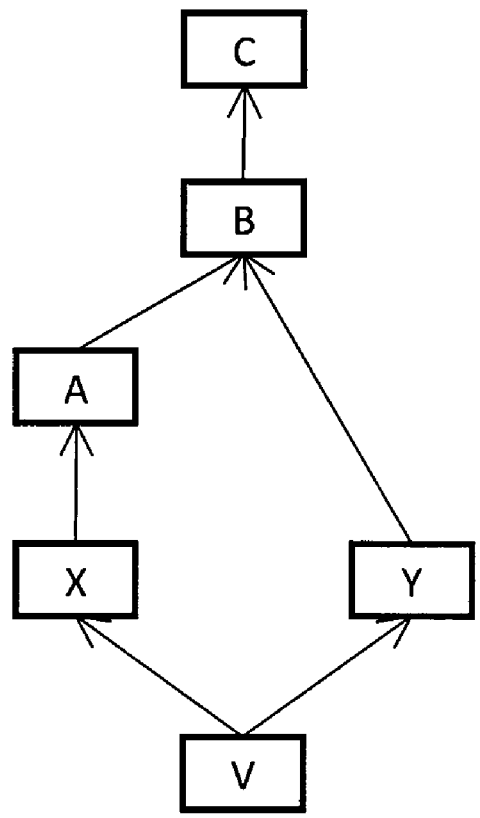

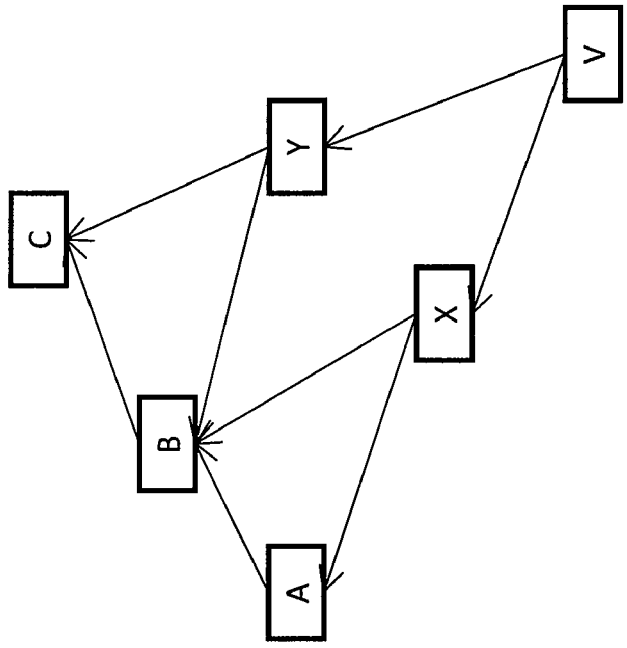
Figure 40 – Links Contributions from Source Relations
| Relations | Contributions to links |
|---|---|
| VXY | VX, VY |
| XAB | XA, XB, AB |
| YBC | YB, YC, BC |

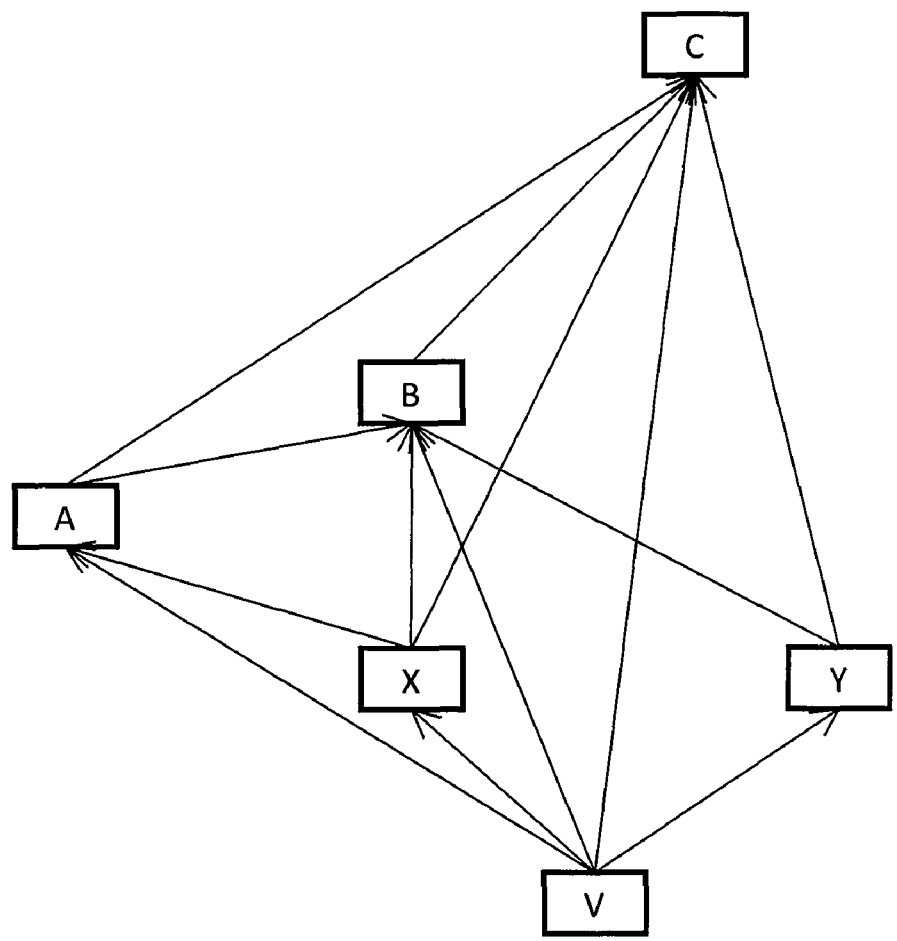
Figure 41 – All Links to be Calculated

Figure 42 – Links Contributions by Level

| Link | Initial Links | Links at Level 1 | Links at Level 2 |
|---|---|---|---|
| AB | AB | AB | Union(Combine(Compose(VX,XA), Compose(VY,YB)), AB) |
| AC | | Compose(AB,BC) | Union(Combine(Compose(VX,XA), Compose(VY,YC)), Compose(AB,BC)) |
| BC | BC | BC | Union(Combine(Compose(VX,XB), Compose(VY,YC)), BC) |
| VA | | Compose(VX,XA) | Compose(VX,XA) |
| VB | | Union(Compose(VX,XB), Compose(VY,YB)) | Union(Compose(VX,XB), Compose(VY,YB)) |
| VC | | Compose(VY,YC) | Union(Compose(VY,YC), Compose(VX, Compose(XB,BC))) |

Figure 42 – Continued

| | | | |
|---|---|---|---|
| VX | VX | VX | VX |
| VY | VY | VY | VY |
| XA | XA | XA | XA |
| XB | XB | XB | Union(Combine(VX, Compose(VY,YB)), XB) |
| XC | | Compose(XB,BC) | Union(Compose(XB,BC), Combine(VX, Compose(VY:YC))) |
| YB | YB | YB | Union(Combine(VY, Compose(VX,XB)), YB) |
| YC | YC | YC | YC |

Figure 43 –
Comparison of Source Relations to Resulting Data Elements and Links

| Sales Territory | | |
|---|---|---|
| Sales Territory ID | Name | Segment |
| T100 | Northeast | Commercial |
| T101 | Southwest | Commercial |
| T102 | Northeast Enterprise | Commercial |
| T103 | U.S. Consumer | <Null> |
| T104 | West | SMB |

| Customers | | |
|---|---|---|
| Customer ID | Name | Segment |
| C100 | ABC Inc | Commercial |
| C101 | New Co | <Null> |
| C102 | Big Bank | Enterprise |
| C103 | John Doe | Consumer |

| Sales Transactions | |
|---|---|
| Customer ID | Sales Territory ID |
| C100 | T100 |
| C101 | T101 |
| C102 | T102 |
| C103 | T103 |

| Segment |
|---|
| Commercial |
| Enterprise |
| Consumer |

Figure 43 – Continued
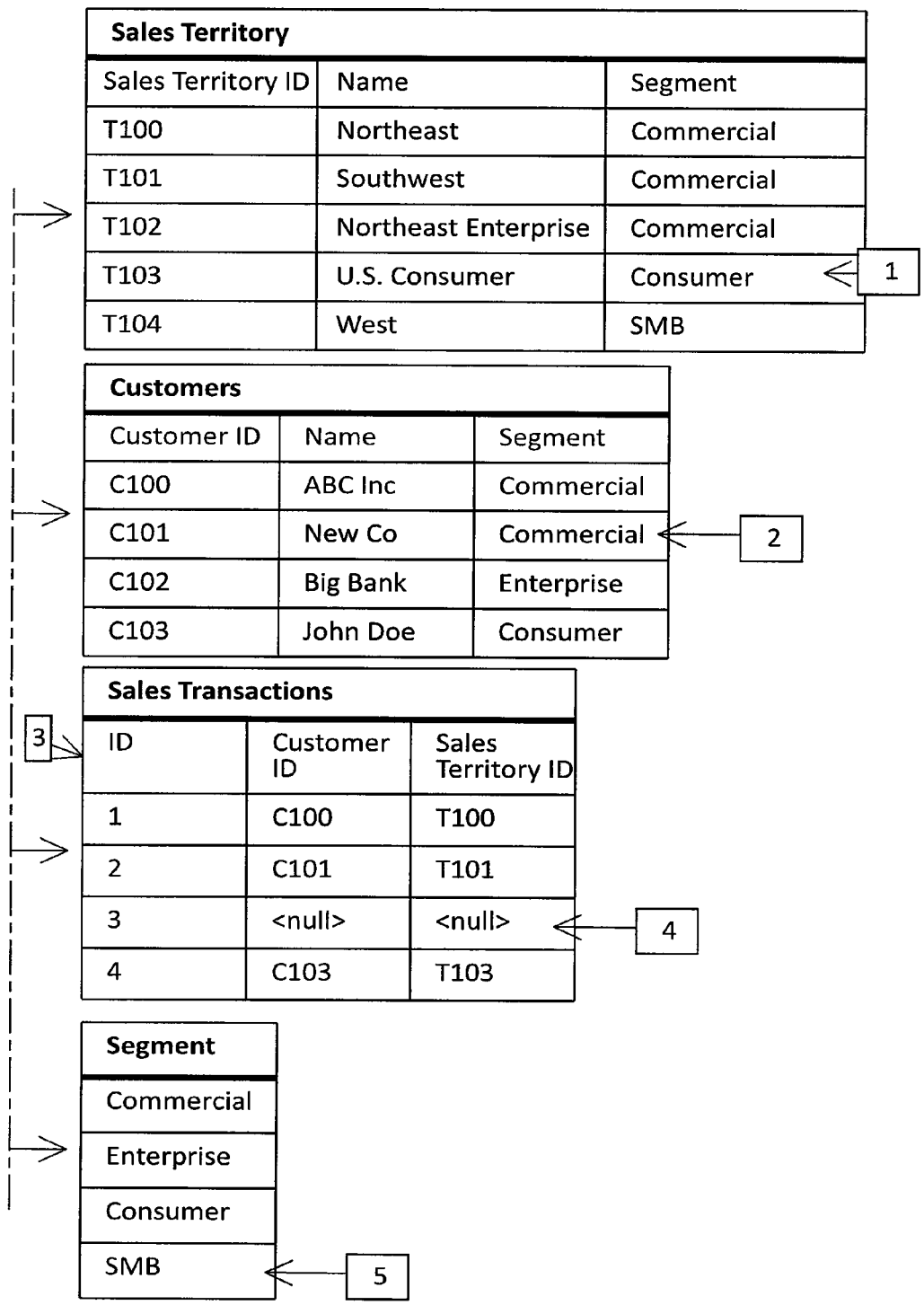

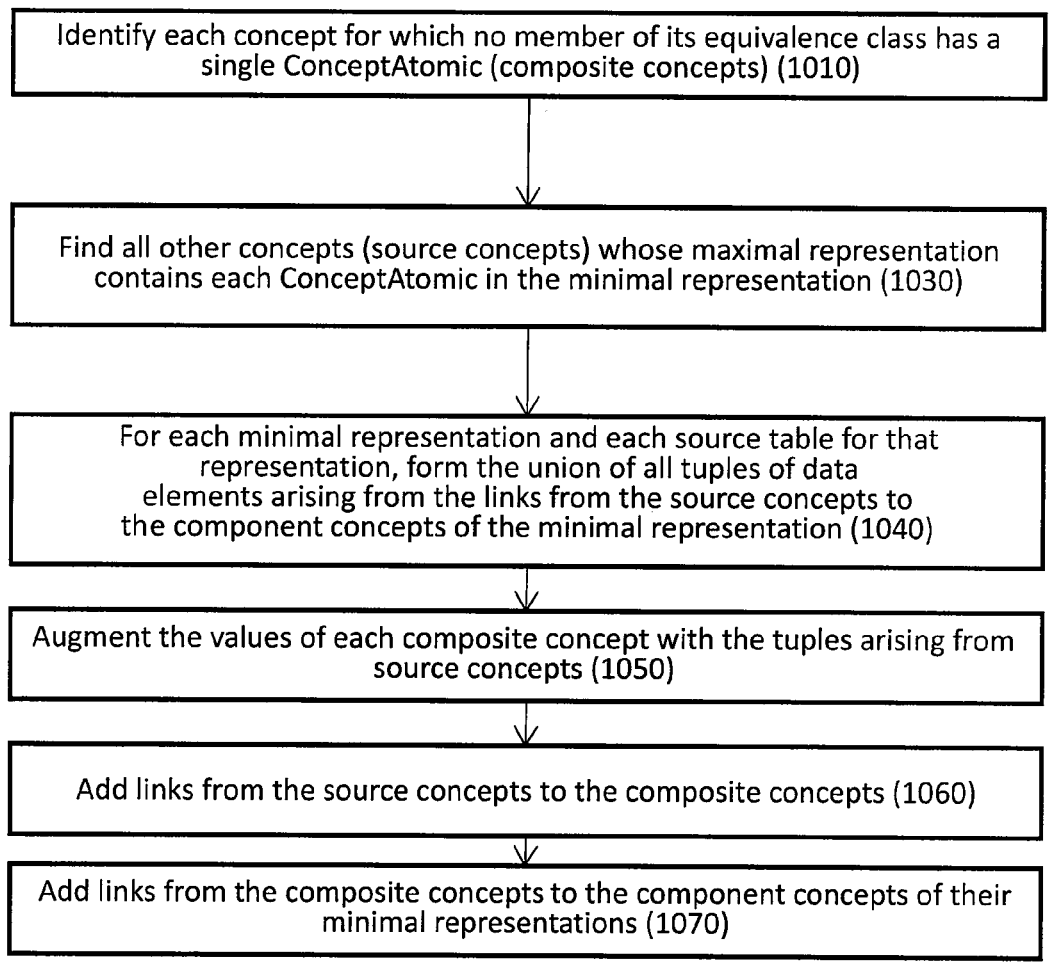
Figure 44 – Conform Data to Lattice Constraints

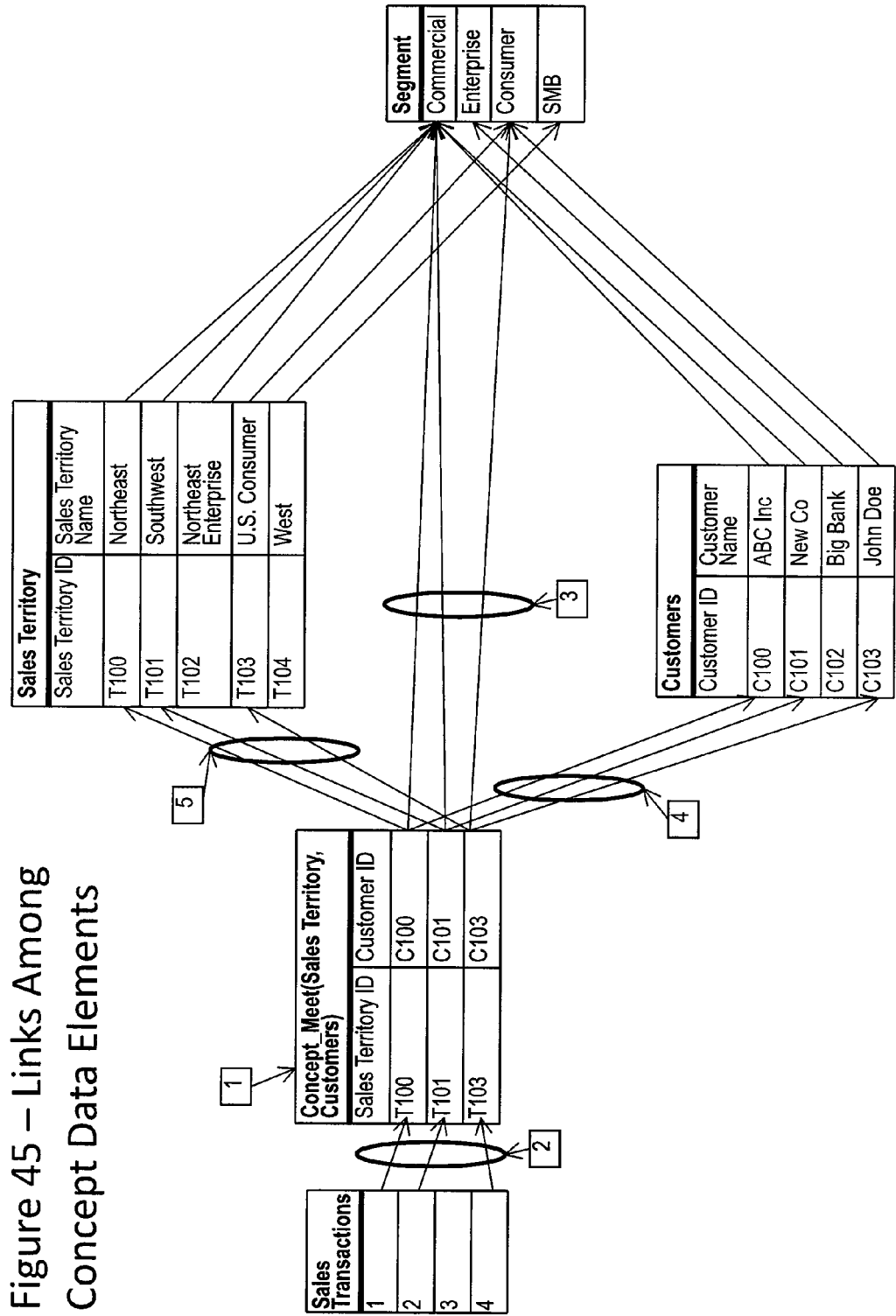
Figure 45 – Links Among Concept Data Elements

Figure 46 – Constraint Specification Example

| Constraints |
|---|
| Constraint( ConceptSubset_TableColumn("SalesTransactions","SalesTerritoryID") , ConceptSubset_All(Concept(ConceptAtomic("SalesTerritoryID"))), Entire_Target_Increasing ) |
| Constraint( ConceptSubset_TableColumn("SalesTerritory","Segment") , ConceptSubset_All(Concept(ConceptAtomic("Segment"))), Entire_Target_Increasing) |
| Constraint_MaximalExtent( ConceptSubset_TableColumn("Products","ProductID") , "ProductID") |

Figure 47 – Conform Data to Set Constraints
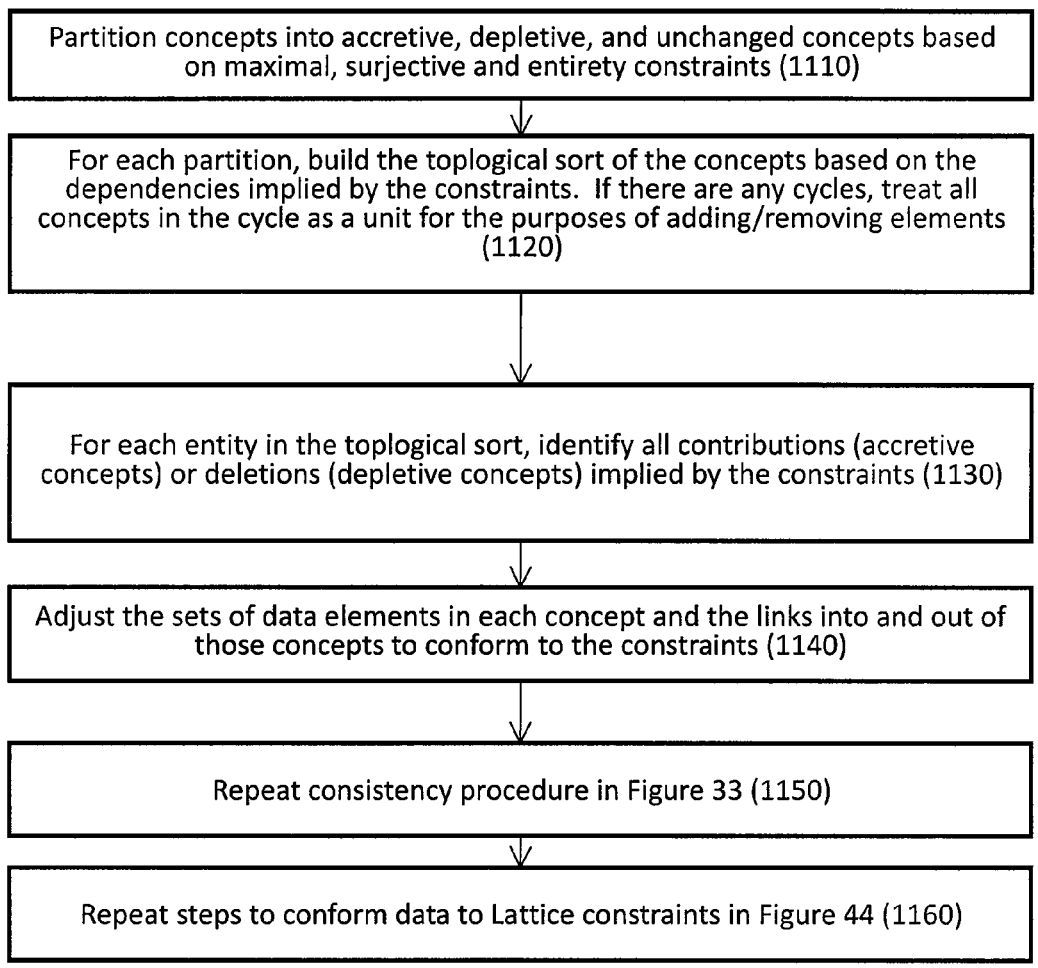

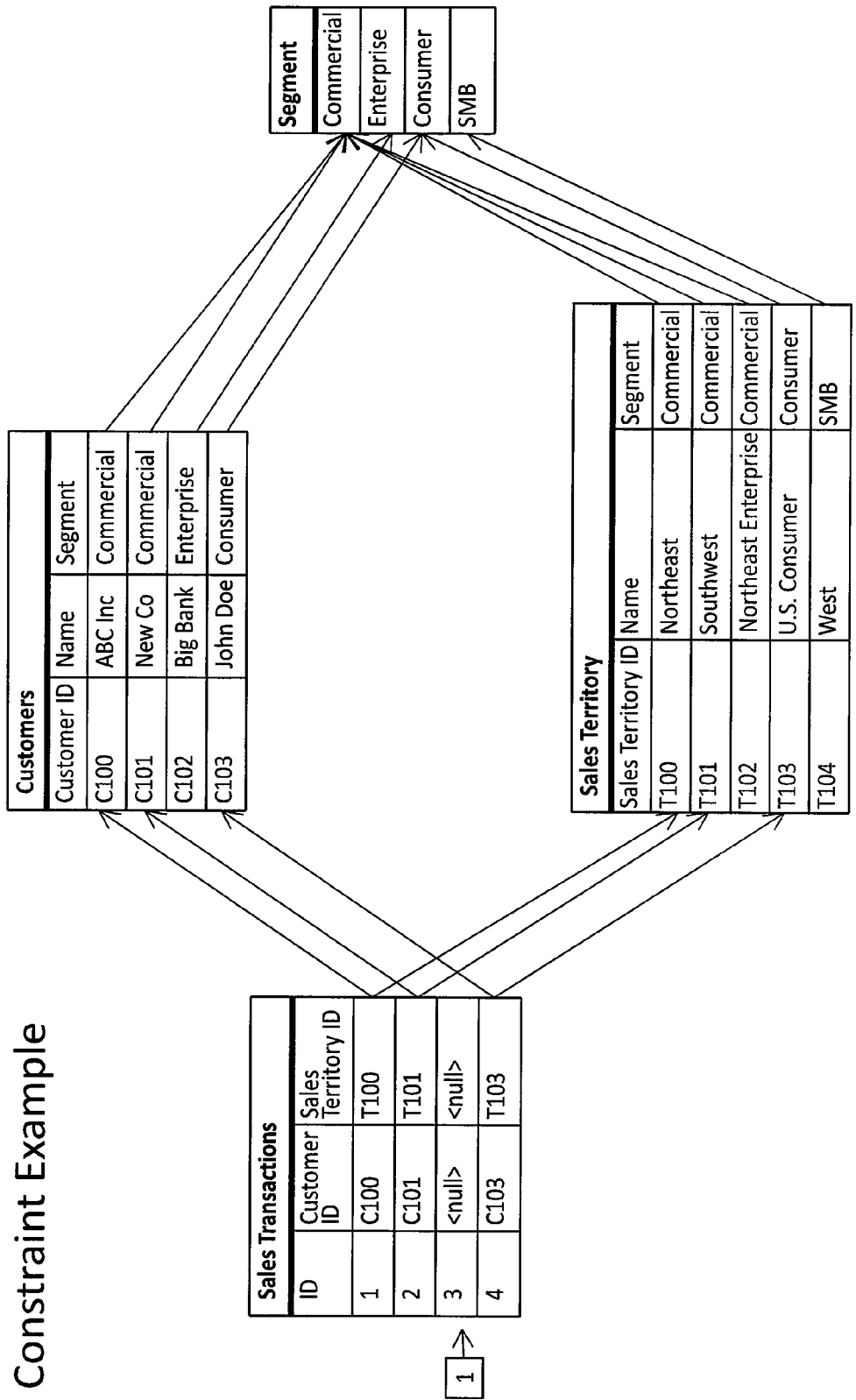
Figure 48 – Source Concepts, Data Elements, and Links for Constraint Example

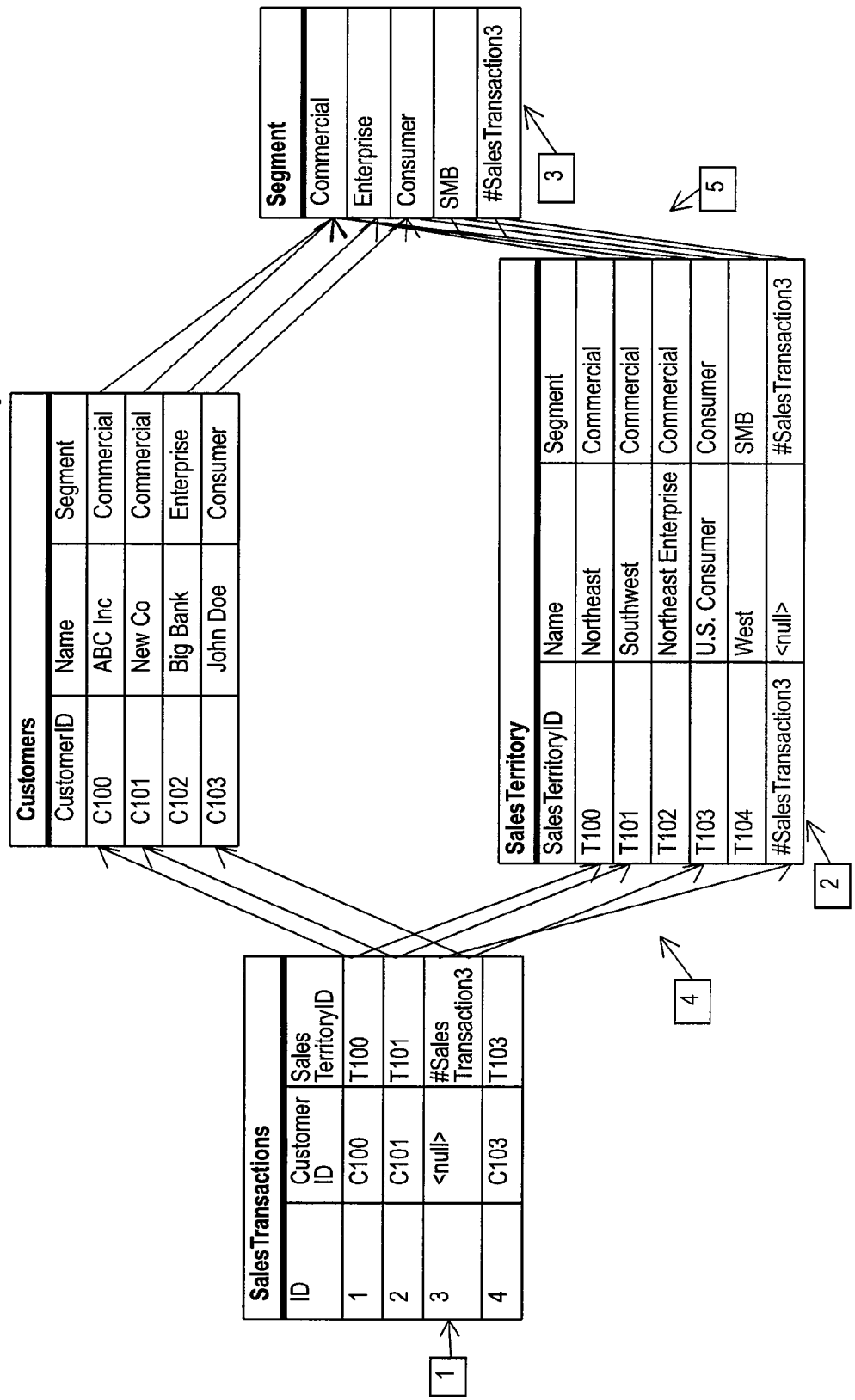
Figure 49 – Additional Elements Created by Constraints

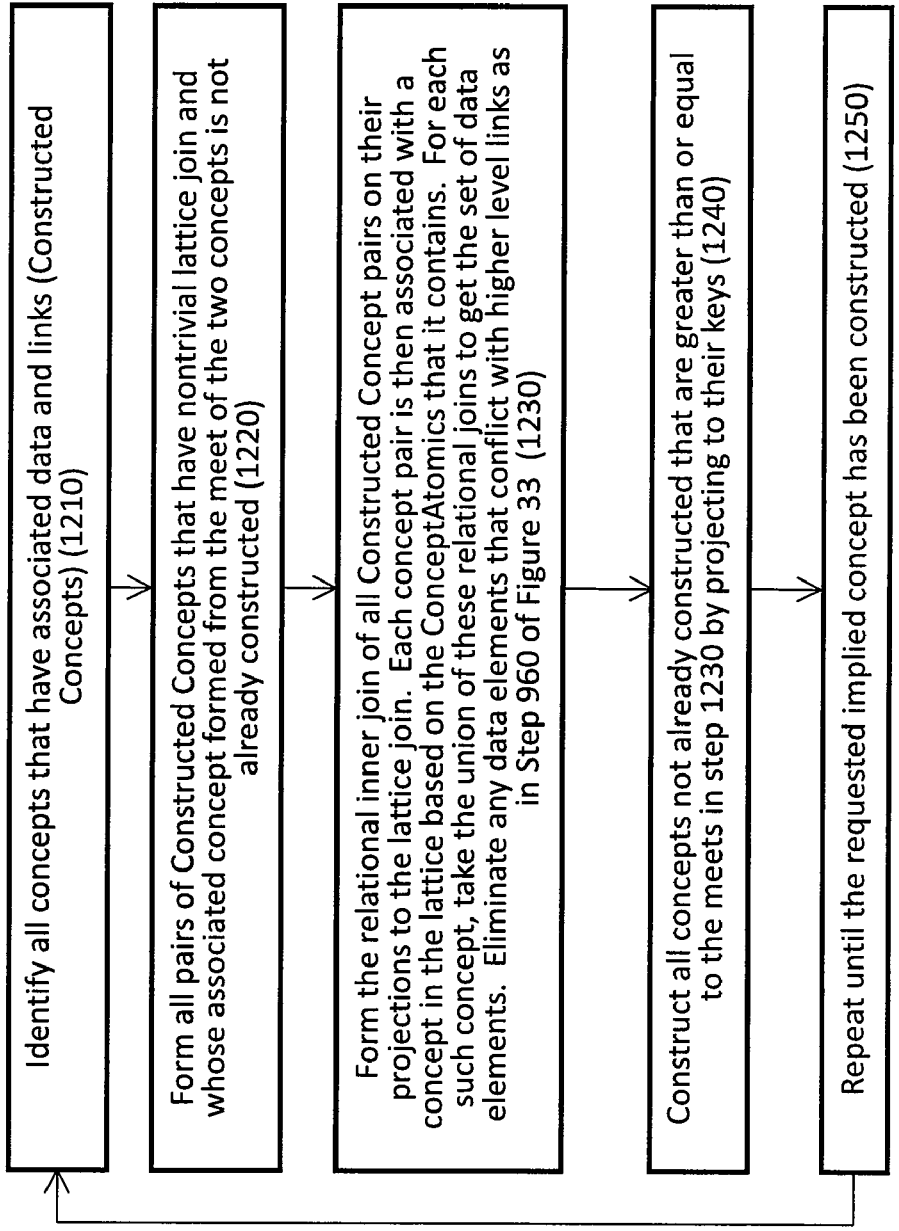
Figure 50 – Generate Additional Data and Links for Implied Concepts

Figure 51 – Inner Join Calculation

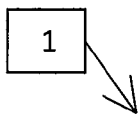

| Sales Transactions | | | |
|---|---|---|---|
| Customer ID | Sales Territory ID | Product ID | Product Class |
| C100 | T100 | P100 | Platform |
| C101 | T101 | P100 | Platform |
| C102 | T102 | P101 | Platform |
| C103 | T103 | P102 | Department |

| Copy( Sales Transactions , "SameClass") | | | |
|---|---|---|---|
| Copy(Customer ID, "SameClass") | Copy(Sales Territory ID, "SameClass") | Copy(Product ID, "SameClass") | Product Class |
| C100 | T100 | P100 | Platform |
| C101 | T101 | P100 | Platform |
| C102 | T102 | P101 | Platform |
| C103 | T103 | P102 | Department |

Note: For brevity, the Concept, ConceptAtomic, and CopyIdentifier constructors have been removed from the column labels in this example Figure 51 – Continued  3 →

| ConceptMeet(Sales Transactions, Copy(Sales Transactions, "SameClass")) | | | | | | | |
|---|---|---|---|---|---|---|---|
| Customer ID | Sales Territory ID | Product ID | Product Class | Copy(Customer ID, "SameClass") | Copy(Sales TerritoryID, "SameClass") | Copy(Product Class, "SameClass") |
| C100 | T100 | P100 | Platform | C100 | T100 | P100 |
| C101 | T101 | P100 | Platform | C101 | T101 | P100 |
| C102 | T102 | P101 | Platform | C102 | T102 | P101 |
| C103 | T103 | P102 | Department | C103 | T103 | P102 |
| C100 | T100 | P100 | Platform | C101 | T101 | P100 |
| C100 | T100 | P100 | Platform | C102 | T102 | P100 |
| C101 | T101 | P100 | Platform | C100 | T100 | P100 |
| C101 | T101 | P100 | Platform | C102 | T102 | P100 |
| C102 | T102 | P101 | Platform | C100 | T100 | P101 |
| C102 | T102 | P101 | Platform | C101 | T101 | P100 |

↑ Inner join on Product Class

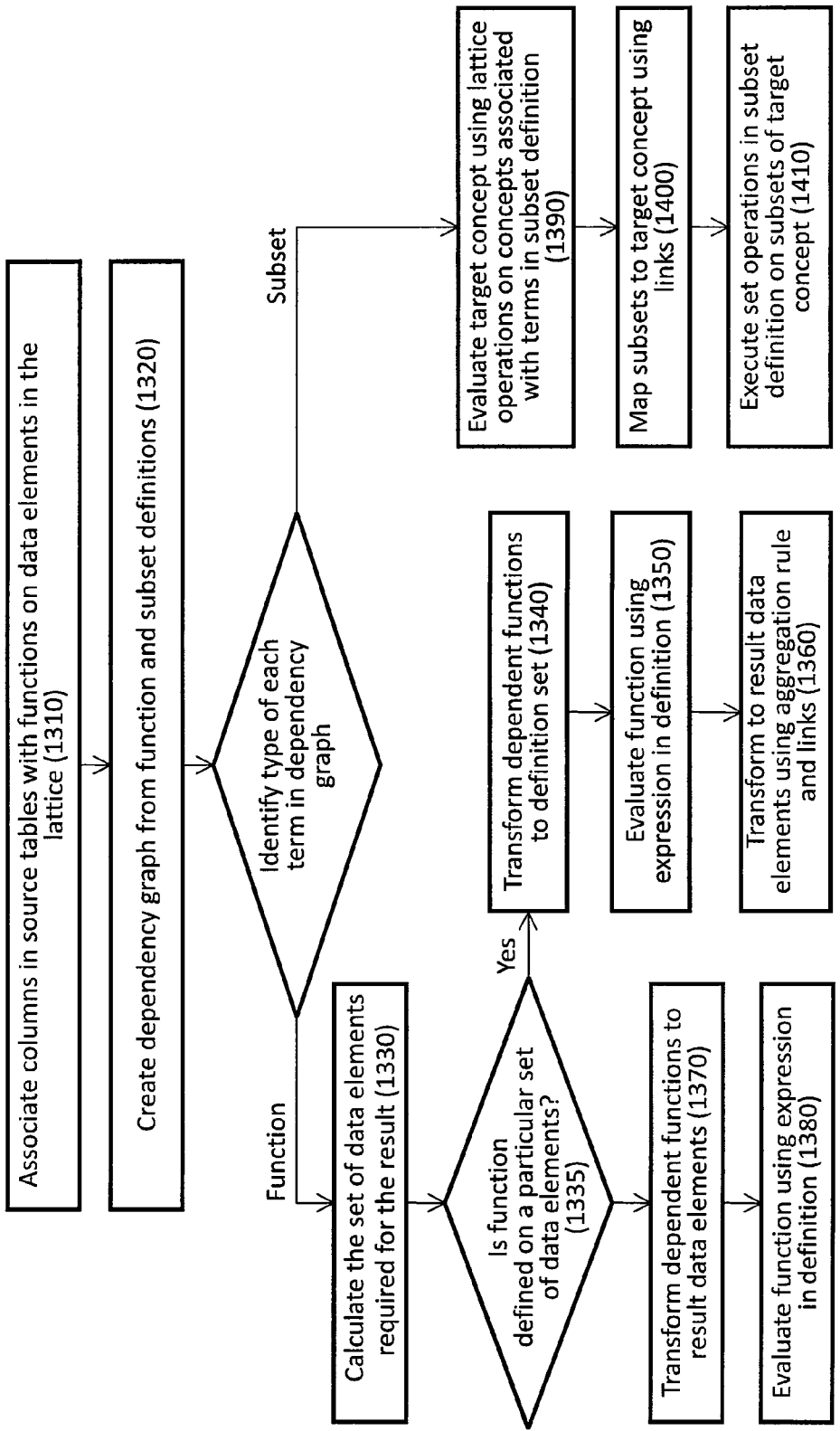
Figure 52 – Calculate Functions and Subsets from Source Table Columns and Definitions

Figure 53 – Function Evalutated on Segment Concept

| Segment | SegmentAnnualRevenue |
|---|---|
| Commercial | Commercial |
| Enterprise | Enterprise |
| Consumer | SMB |
| SMB | <null> |

Figure 54 – Function Transformation Possibilities

| Relation between concept of definition set and concept of result set | Transformation option |
|---|---|
| Definition Concept > Result Concept | Use the lattice map to assign definition value directly to each result value (pullback) |
| Definition Concept > Result Concept | Allocation. Use another function to allocate the values of the definition concept to values on the result concept |
| Definition Concept < Result Concept | Aggregation with an aggregation function (e.g., max, min, sum) that combines the set of values into a new value. Other forms of reduction are possible, especially if another function can be used to define a total order on the set of values in the definition concept. For example, the fold operation found in functional languages such as Haskell and ML can be used to aggregate a function using another function |
| Definition Concept has no relation to Result Concept | For every two concepts A and B, there are two unique concepts in the lattice, Meet(A, B) and Join(A, B). Functions can be transformed from A to B by first transforming to either the Meet or Join and then transforming again to the result |

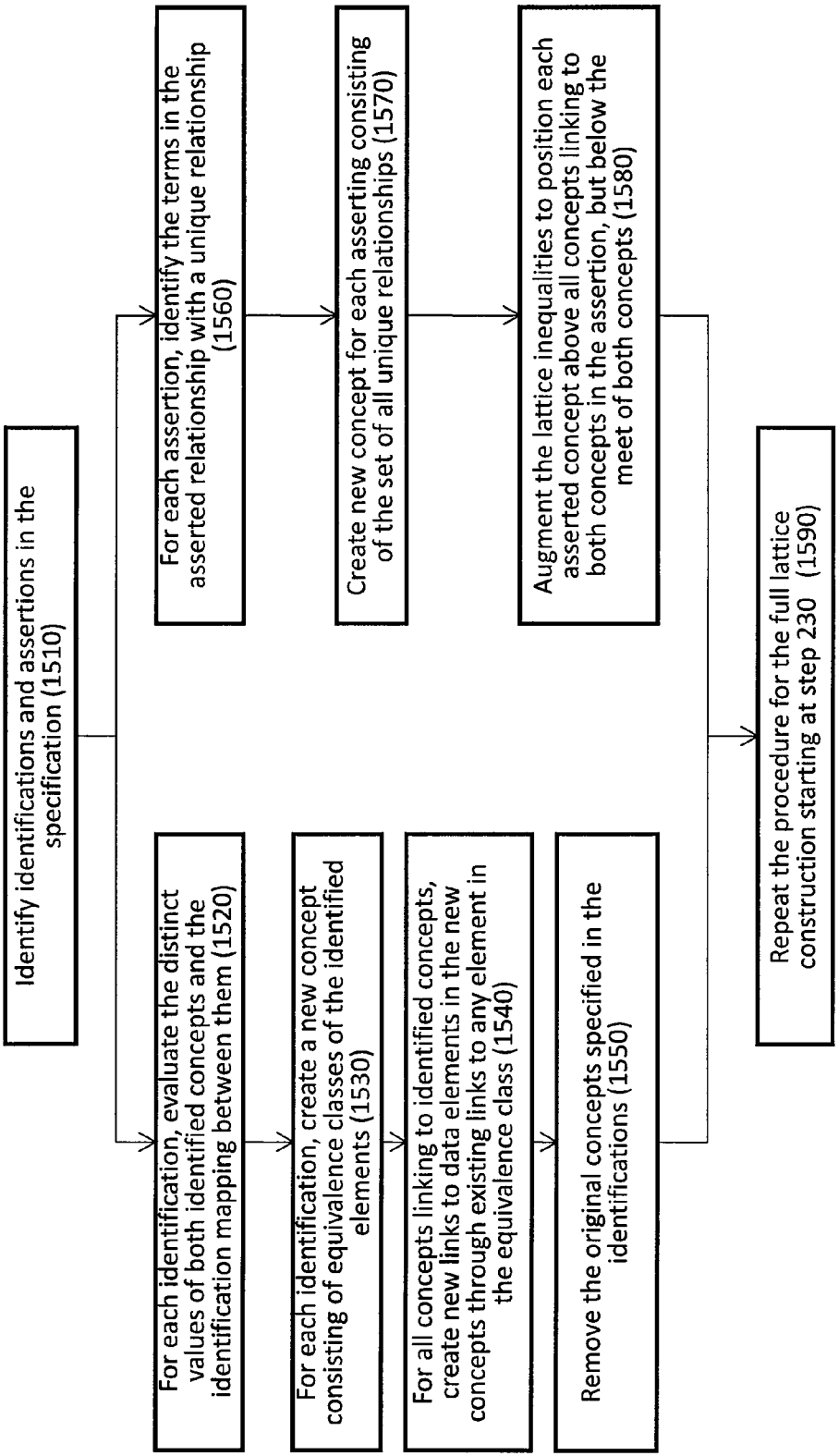
Figure 55 – Generate New Lattice With Calculated Functions and Assertions Figure 56 – Missing Data

| Customers | | | |
|---|---|---|---|
| Customer ID (KEY) | Country | City | State |
| C100 | USA | Paris | Texas |
| C101 | France | Paris | |
| C102 | USA | Paris | |
| C103 | USA | Kansas City | Missouri |
| C104 | USA | Kansas City | Kansas |
| C105 | USA | Kansas City | |
| C106 | USA | Los Angeles | California |
| C107 | USA | Los Angeles | |

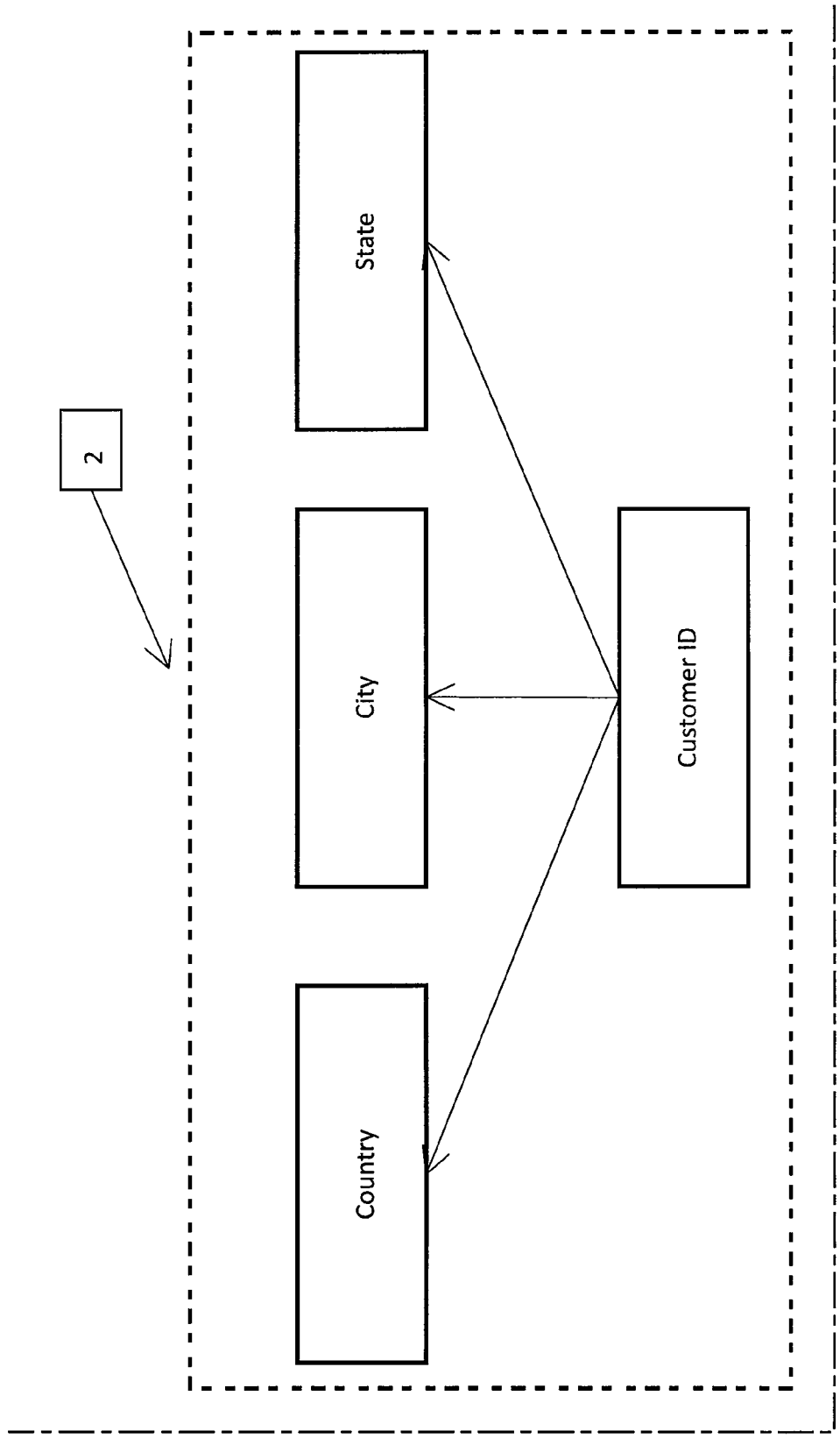
Figure 56 – Continued

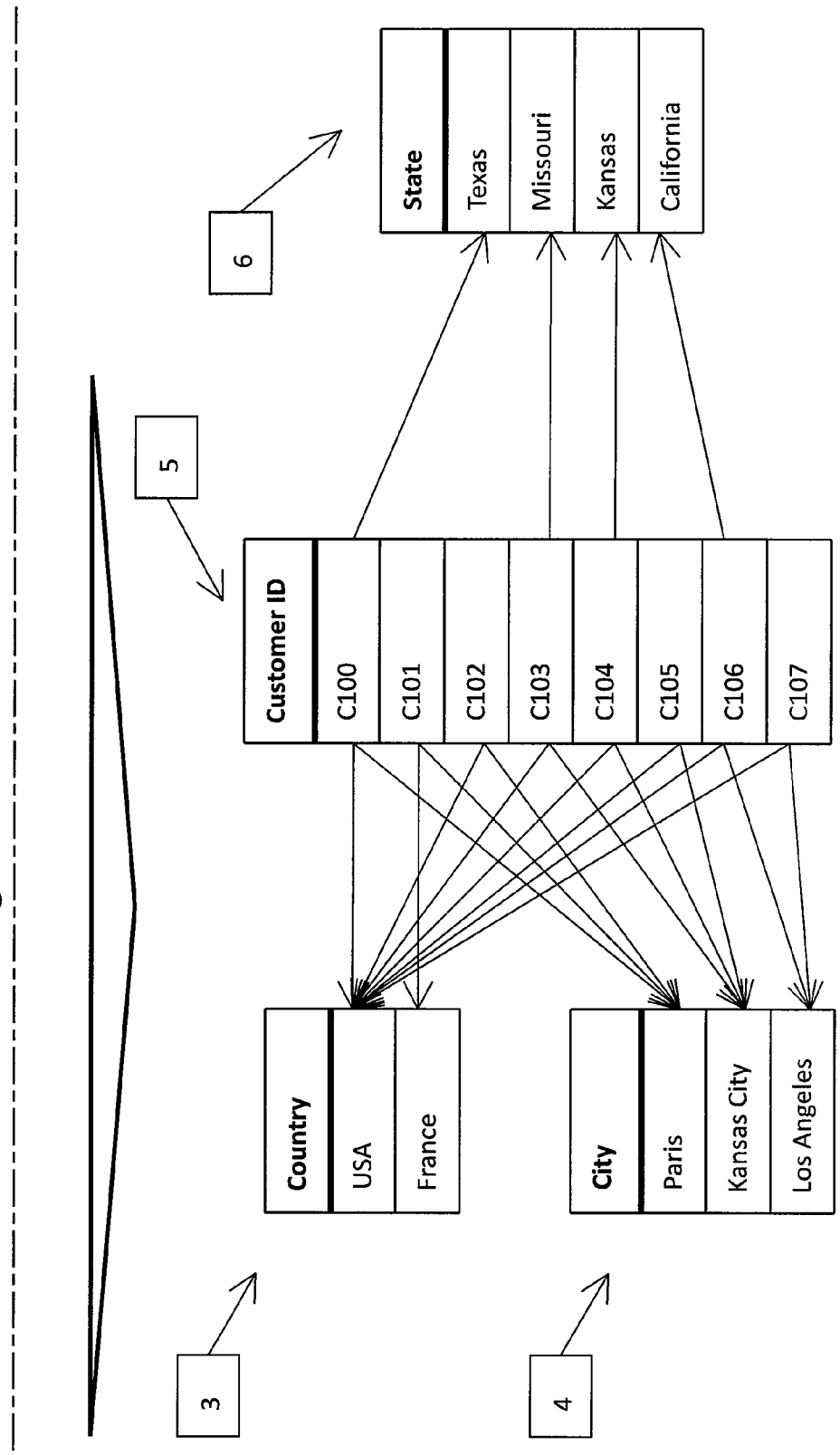
Figure 56 – Continued

Figure 57 – Missing Data with an Assertion

| Customers | | | |
|---|---|---|---|
| Customer ID (KEY) | Country | City | State |
| C100 | USA | Paris | Texas |
| C101 | France | Paris | |
| C102 | USA | Paris | |
| C103 | USA | Kansas City | Missouri |
| C104 | USA | Kansas City | Kansas |
| C105 | USA | Kansas City | |
| C106 | USA | Los Angeles | California |
| C107 | USA | Los Angeles | |

3, 4, 5, 6, 7, 8, 9

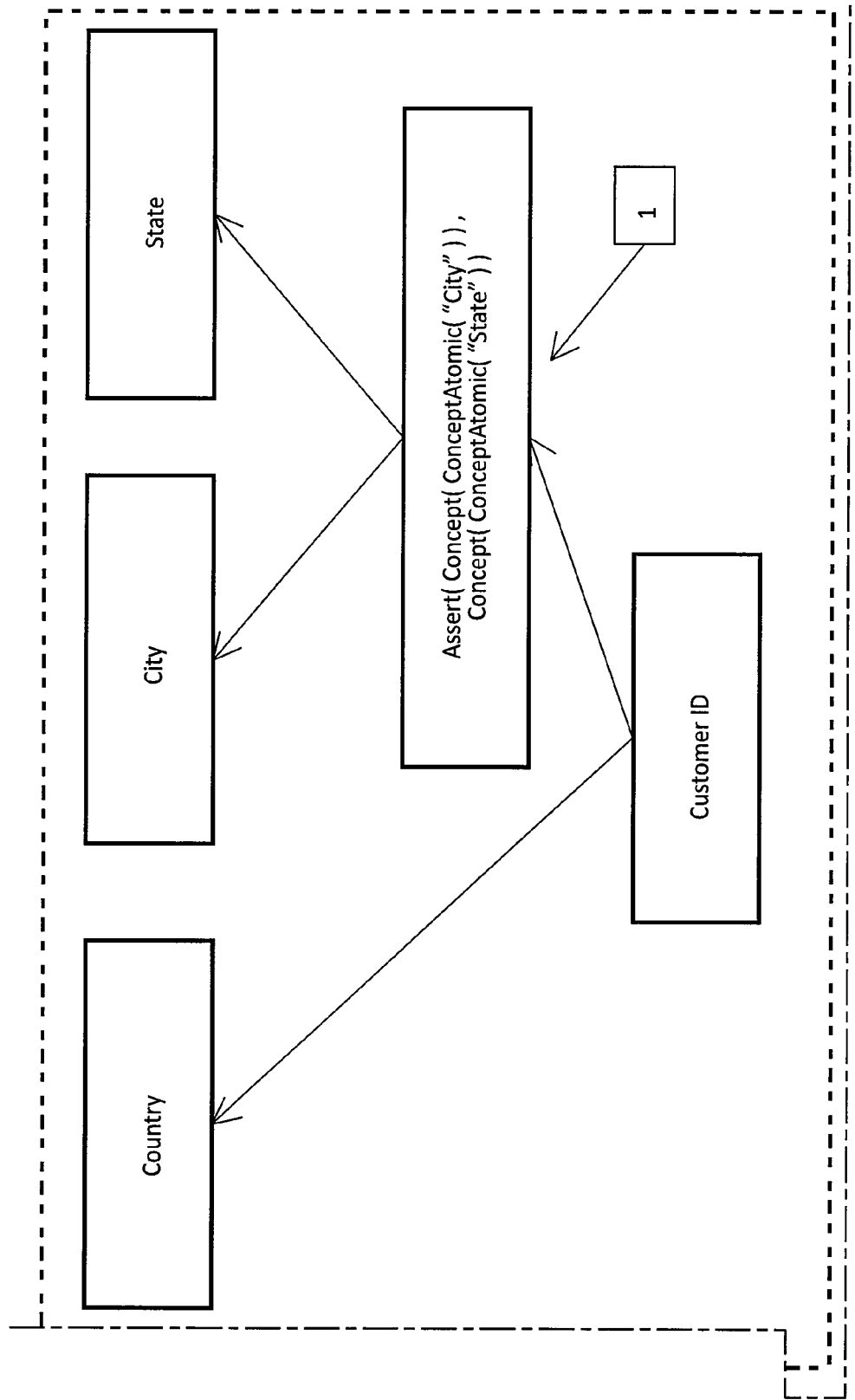
Figure 57 – Continued

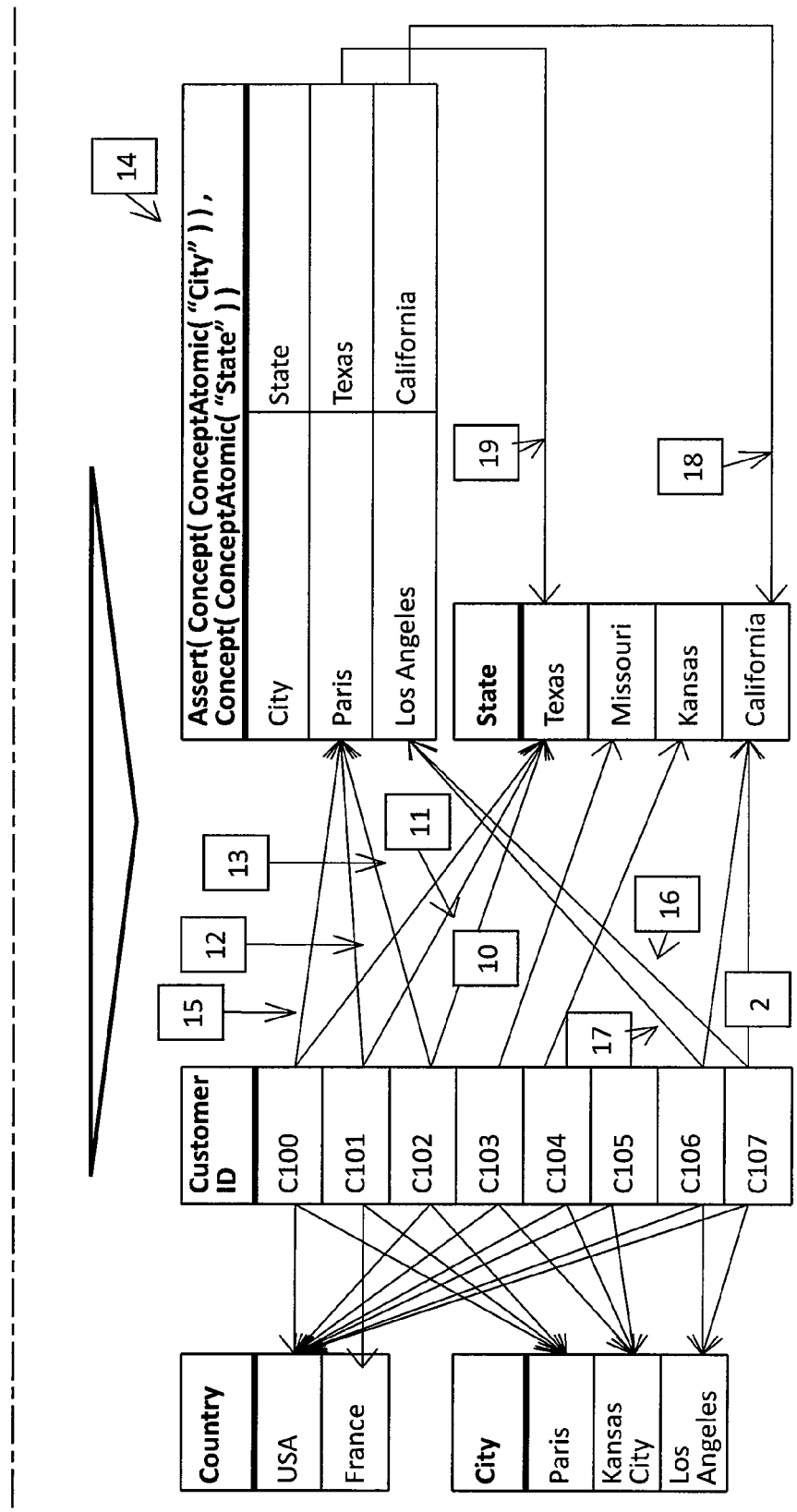
Figure 57 – Continued

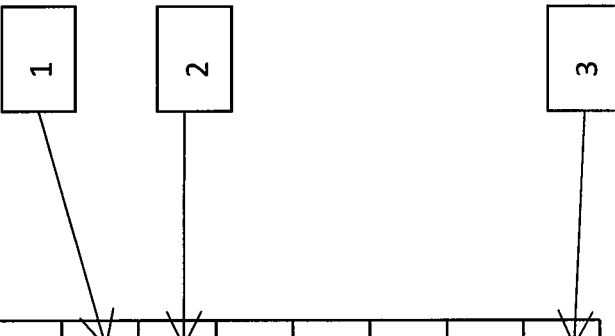
Figure 58 – Relation Resulting from Assertion

Figure 59 – Missing Data with a More Specific Assertion

| Customers | | | |
|---|---|---|---|
| Customer ID (KEY) | Country | City | State |
| C100 | USA | Paris | Texas |
| C101 | France | Paris | |
| C102 | USA | Paris | |
| C103 | USA | Kansas City | Missouri |
| C104 | USA | Kansas City | Kansas |
| C105 | USA | Kansas City | |
| C106 | USA | Los Angeles | California |
| C107 | USA | Los Angeles | |

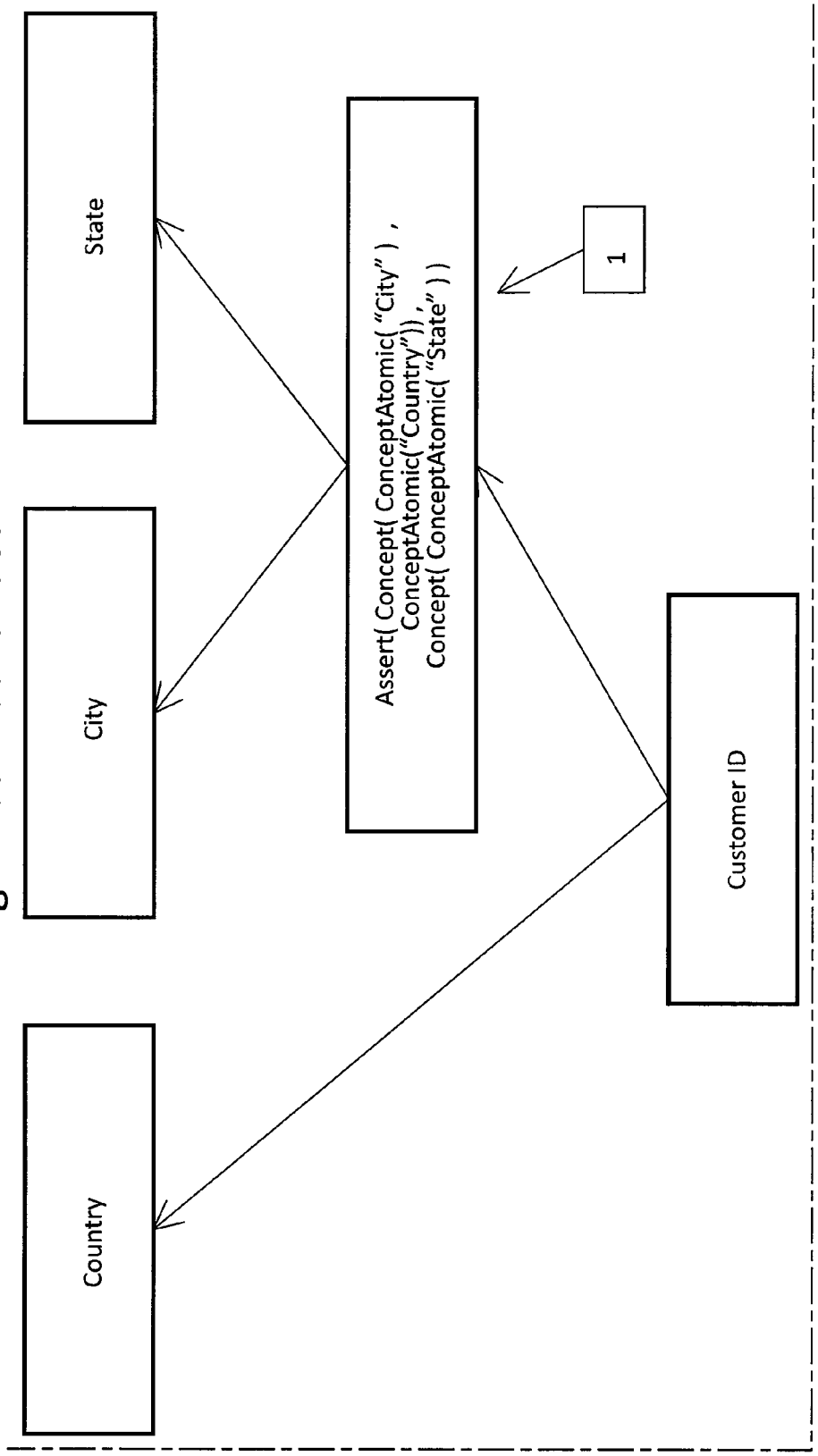
Figure 59 – Continued

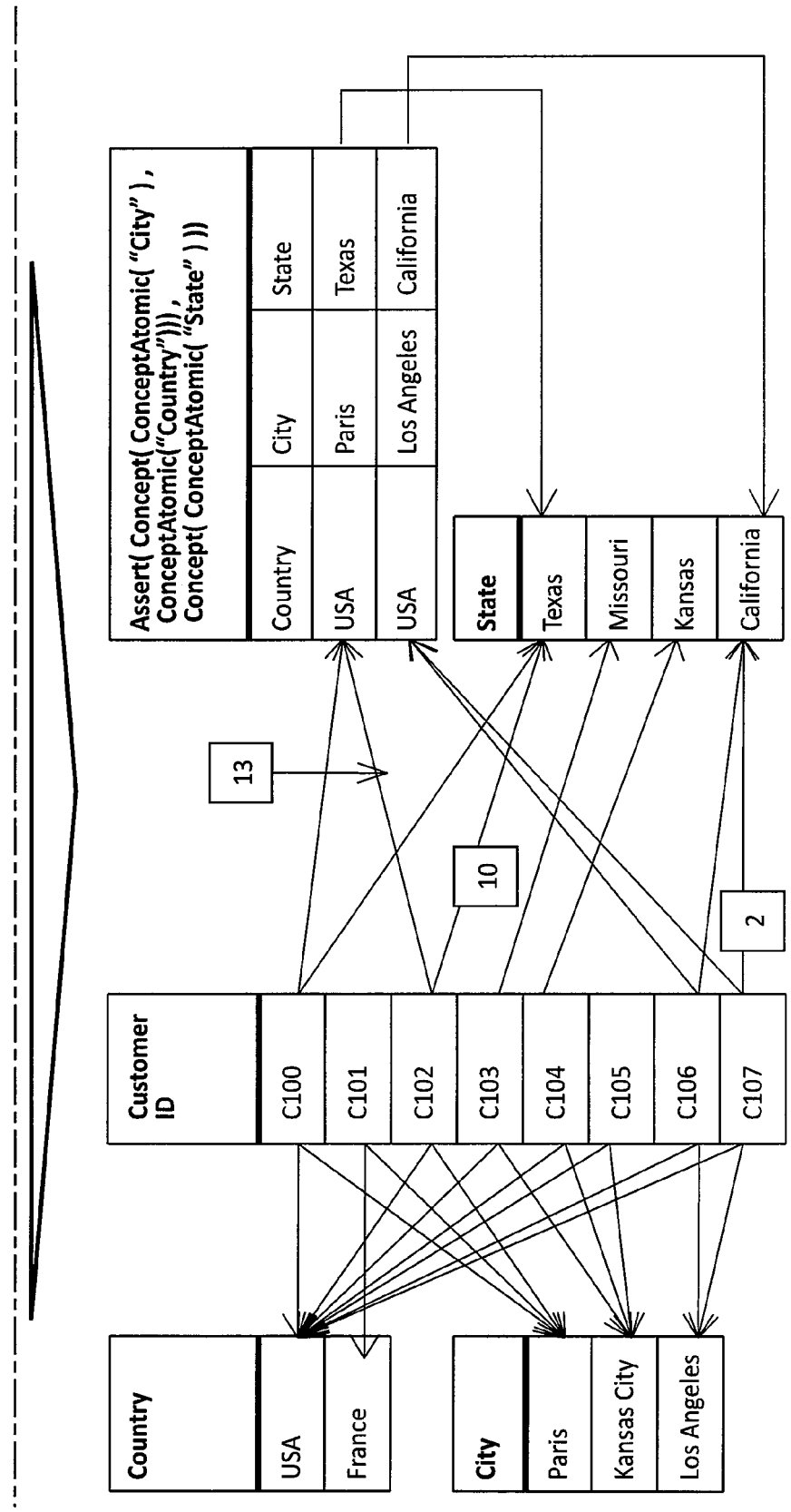
Figure 59 – Continued

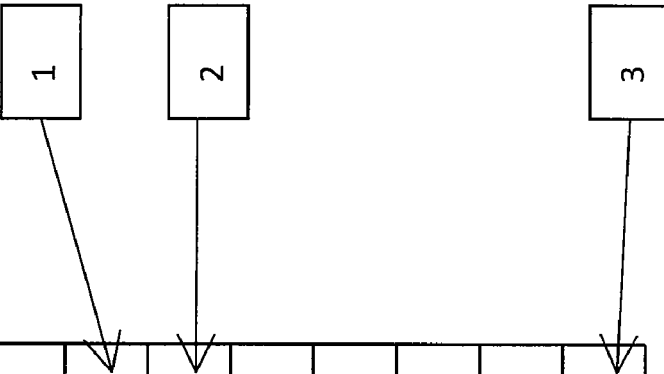
Figure 60 – Relation Resulting from More Specific Assertion

LATTICE DATA SET-BASED METHODS AND APPARATUS FOR INFORMATION STORAGE AND RETRIEVAL

This application claims the benefit of priority of U.S. Patent Application Ser. No. 61/045,749, filed Apr. 17, 2008, having the same title hereof, the teachings of which are incorporated herein by reference.

BACKGROUND OF THE INVENTION

The present invention pertains to digital data processing, and, more particularly, to digital data processing apparatus and methods for storing and retrieving information. Such apparatus and methods can be used, by way of example, for the design and implementation of database management systems ("DBMS"), e.g., in a business environment.

Although information storage in a computer system can be unstructured, enterprises typically maintain operational data in structured collections, referred to as "databases." The arrangement and interrelationships of data in those collections vary dramatically, depending on database type. Thus, for example, data elements in a so-called hierarchical database are linked in tree-like structures, while those in a relational database are stored in tables made up of records (rows) some or all of the fields (columns) of which can serve as keys to other tables. Software that stores and retrieves data to/from a database is typically referred to as a "database management system." There are a multitude of types of databases in use in the market today and even more database management systems for manipulating them.

Database management systems are not new. They have been available in one form or another since the advent of the computer, though, formalized commercial systems came to the fore in the 1970's. Since then, developers and purchasers alike have searched for a database management system that best meet their needs. While the consensus seemed to have settled around the relational database, now championed by the likes of Oracle and SAP, use of that model can result in data sets that are increasingly difficult to maintain and search.

In view of the foregoing, an object of this invention is to provide improved methods and apparatus for digital data processing.

A related object of the invention is to provide such methods and apparatus as facilitate the storage and retrieval of information.

Yet another object of the invention is to provide such methods and apparatus as facilitate the querying of data sets to extract information of interest.

Still yet another object of the invention is to provide such methods and apparatus as facilitate the efficient storage of valid data and the identification of invalid data.

SUMMARY OF THE INVENTION

The foregoing objects are among those attained by the invention which provides, in some aspects, digital data processing apparatus and methods for creating and searching lattice data sets.

In one aspect, an apparatus according to the invention comprises a lattice data set with a partial order of concepts (LDSWPOC) including a plurality of data elements, each of which belongs to exactly one associated concept. The set of concepts carries the structure of a partial order. Each data elements associated with a concept may be linked to one or more other data elements associated with one or more other concepts. The links define (i) a path between data elements directly linked thereby and/or (ii) a portion of a path between data elements linked by intermediate subsets of data elements. The paths define a relationship between the data elements in accord with the partial order of the concepts with which they are associated, such that selected conditions and/or constraints (collectively, "conditions") are satisfied.

In one aspect of the invention, those conditions are stated as follows: (i) if there exists a path from a first data element associated with a first concept to a second data element associated with a second concept, then all paths from the first data element to the second concept terminate on the second data element, (ii) if there exists a path from a data element a (associated with concept A) to a data element b (associated with concept B) and a path from a to a data element c (associated with concept C), and B is lower in the partial order than C, then there also exists a path from b to c.

A further aspect of the invention provides for the case where such a LDSWPOC for which the partial order of concepts satisfies two additional conditions: iii) For every two concepts A and B in the partial order of concepts, there exists a third, unique concept, denoted by A∧B and referred two as the 'meet' of A and B, that is the maximal lower bound of concepts A and B. By a maximal lower bound, we shall mean that for any concept C with C<=A and C<=B then C<= (A∧B). iv) For every concept C with C<=A and C<=B in the partial order, and for every data element c in C which maps to some element a in A and to some element b in B, there exists and element ab in A∧B such that c maps to ab, ab maps to a in A, and ab maps to b in B. Such a LDSWPOC satisfying these two additional conditions will be referred to as a lattice data set with a meet-semilattice of concepts (LDSWMSOC).

A further aspect of the invention provides for the case where such a LDSWMSOC has the following two properties: v) for any two concepts A and B in the LDSWMSOC, the minimal upper bound of those two concepts always exists and is unique. That minimal upper bound being denoted by the symbol A ∨ B and referred to as the join of A and B. vi) The maximal concept (obtain by taking the join of all concepts), henceforth referred to as ALL, has at least one data element, henceforth denoted by all, such that each data element in the LDSWMSOC maps to this element. Such a LDSWMSOC with properties v) and vi) will be referred to as a lattice data set with a lattice of concepts (LDSWLOC) because the partial order of concepts satisfies the definition for a mathematical lattice. The partial order of concepts is thus a lattice of concepts.

Further aspects of the invention provide such a LDSWLOC with operators that endow the set formed from the union of the power sets of each set of data elements associated with each concept with a lattice structure. Henceforth, this lattice structure will be called the lattice of data elements (LDE) to distinguish it from the lattice of concepts (LOC) that is already a part of the LDSWLOC. Related aspects of the invention implement the meet and join operators of the LDE according to the following rules: For any LDSWLOC in which $A^1$ is a subset of data elements of concept A, and $B^1$ is a subset of data elements of concept B:

(i) The concept associated with the term $A^1 \wedge B^1$ in the LDE is A∧B. The subset associated with A∧B that corresponds to the term $A^1 \wedge B^1$ is chosen so that it is the largest subset such that for all elements ab in that subset, there is a path from data element ab to a data element a1 in subset $A^1$ and there is also a path from the data element ab to data element b1 in subset $B^1$, and (ii) The concept associated with the term $A^1 \vee B^1$ in the LDE will be denoted by X. We further denote by $X^1$ the term $A^1 \vee B^1$ in the LDE. The concept X is chosen to be the minimal concept in the LOC that satisfies $X \geqq A \vee B$ and for all elements a1 in $A^1$ there exists an element xa in X such that there is a path from a1 to xa, and for all elements b1 in $B^1$ there exists an element xb in X such that there is a path from b1 to xb. The subset $X^1$ of X is chosen to the smallest subset such that, and for all elements a1 in $A^1$ there exists a path to some element xa in $X^1$ and for all elements b1 in $B^1$ there exists a path to some element xb in $X^1$. That there is at most one minimal concept X that satisfies these properties can be shown because for any two purported candidates X1 and X2, the concept X1∧X2 in the LOC also satisfies the aforementioned property because of condition (iv) on the paths in the LDSWMSLOC. That such a minimal concept X always exists follows from the requirement that there be a top element, ALL, in the LOC (this follows from the fact that the LOC is a lattice) and the requirement that all data elements in a LDSWLOC have a path to the data element, all, associated with the concept ALL as per condition vi) in the properties of a LDSWLOC.

Further aspects of the invention provide a mechanism for creating a partial order of concepts (POC) from a relational context (RC). A RC shall consist of set of relations, an optional set of cardinality constraints on those relations, an optional set of column identifications associated with the relations, an optional set of primary keys identified on those relations, an optional set of many-to-one constraints on pairs of sets of columns in a relation, an optional set of independent relational paths that should be considered as equivalent, and an optional set of declarations that specify that certain columns should be or should not be considered discrete-valued.

Further aspects of the invention provide a mechanism for creating a LDSWPOC and an error log and/or links errors and/or generating events and/or generating alerts about missing or inconsistent data in the LCDS when combined with the POC.

Further aspects of the invention provide a mechanism for creating a set of Constructed Concepts (SCC) from a RC and optionally a SCC using operators including but not limited to Relation, Copy, Assert, and Function-to-Concept operators that are defined in the details below.

Further aspects of the invention provide mechanisms for creating a LOC from a POC, an optional SCC, an optional set of LOC, and an optional set of lattice identifications and inequalities (SLII). In one such aspect of the invention, the lattice of concepts is created by formally extending the partial order of concepts with formal meet and join operators defined as described in the details below. In another such aspect of the invention, multiple lattices are combined by specifying a set of identifications of concepts from one lattice to concepts in another lattice.

Further aspects of the invention provide a mechanism for creating a LDSWLOC from a LOC, an optional set of lattice constraints (SLC), and a LDSWPOC. Further aspects of the invention provide a mechanism for generating logs of data and/or link errors and/or generating events and/or generating alerts about missing or inconsistent data in the LCDSWPOC.

Further aspects of the invention provide a mechanism for creating a LDSWLOC from a LDSWLOC, an optional Set of Injection Assertions (SIA), an optional SLC, an optional set of functions on a LDSWLOC (SFOLDSWLOC), and an optional SCC. Further aspects of the invention provide a mechanism for generating logs of data and/or link errors and/or generating events and/or generating alerts about missing or inconsistent data in the LDSWPOC.

Further aspects of the invention provide a mechanism for creating a set of functions on a LDSWLOC (SFOLD-SWLOC) from expressions, aggregations, lambda expressions, LDSWLOC, SFOLDSWLOC, and a LCDS.

Further aspects of the invention provide a mechanism to query a LDSWLOC and an optional associated SFOLD-SWLOC and an optional cache of previous results. Additional aspects of the invention update the cache of previous results with either results of the current query or with any intermediate calculations performed therein. Additional aspects of the invention provide methods for querying a lattice data set, e.g., of the type described above, in which any of the query, functions, and lattice elements are evaluated "lazily."

Further aspects of the invention provide a mechanism to generate a LCDS from an optional LDSWLOC, and optional SFOLDSWLOC, an optional SCC, and an optional LCDS.

Further aspects of the invention provide a mechanism whereby all components of the system specification including RCs, CCs, LCDS, SLII, LOC, SLCs, LDSWPOC, LDSWLOC, Functions, Queries, and the sources of the underlying data sets themselves may be independently or collectively managed by a versioning system so that queries can reference any combination of valid versions of system specification and data set versions.

BRIEF DESCRIPTION OF THE DRAWINGS

A more complete understanding of the invention may be attained by reference to the drawings, in which:

FIG. 1 depicts the system architecture of a database management system according to the invention;

FIG. 2 is a flowchart for a query engine of the database management system according to the invention;

FIGS. 3-4 are basic and primary types in a specification of a data set according to the invention of the type managed by a database management system of the type shown in FIG. 1;

FIG. 5 is a flowchart for creation of a partial order of concepts for a data set according to the invention of the type managed by a database management system of the type shown in FIG. 1;

FIG. 6 depicts sample source data of the type from which a data set according to the invention is created by a database management system of the type shown in FIG. 1;

FIG. 7 depicts values of types "SourceTable" and "Implication" defining a specification of the type used in a database management system according to the invention for the sample source of FIG. 6;

FIG. 8 depicts a partial order of concepts in a database management system according to the invention for the sample data of FIG. 6 and specification of FIG. 7;

FIG. 9 depicts a specification of the type used in a database management system according to the invention as modified to distinguish concept names;

FIG. 10 depicts a partial order of concepts in a database management system according to the invention for the sample data of FIG. 6 and specification of FIG. 9;

FIG. 11 identifies concepts utilized in a database management system according to the invention from the specification of FIG. 9;

FIG. 12 depicts additional specification items (i.e., implications and identifications) used in a database management system according to the invention in connection with the specification of FIG. 9;

FIG. 13 depicts a partial order of concepts in a database management system according to the invention for the sample data of FIG. 6 and specification of FIGS. 9 and 12;

FIG. 14 is a flowchart for creation of "constructed concepts" (i.e., concepts created through a logical relationship to other concepts or data) in a specification of the type used in a database management system according to the invention;

FIG. 15 depicts additional constructors that can be used in a database management system according to the invention to create new concepts;

FIG. 16 depicts relationships implied by constructed concepts that are introduced into a specification of the type used in a database management system according to the invention;

FIG. 17 depicts an additional specification of functions that can be used in a database management system according to the invention to create new "atomic" concepts with a concept partial order;

FIG. 18 depicts a calculation of the "SegmentAnnualRevenue" function of FIG. 17 in a database management system according to the invention;

FIG. 19 depicts a concept partial order in a database management system according to the invention for the specification of FIG. 17 as applied to the specification that generated the concept partial order of FIG. 13;

FIG. 20 depicts a concept partial order in a database management system according to the invention after using a Copy concept constructor to create new concepts for a concept partial order;

FIG. 21 depicts a concept partial order in a database management system according to the invention after adding the new concepts of FIG. 20 and "identification" concepts to the specification;

FIG. 22 depicts a sample relation concept constructor that can be used in a database management system according to the invention to enable a single source table to establish a link between original concepts and the concepts through the relation;

FIG. 23 depicts an addition of a relation constructor into a specification of the type used in a database management system according to the invention;

FIG. 24 depicts a calculation of "construction depths" that can be used in a database management system according to the invention in order to describe each concept in a unique form;

FIG. 25 is a flowchart for creation of a lattice of concepts in a database management system according to the invention;

FIG. 26 depicts equivalence classes of subsets for atomic concepts in a database management system according to the invention;

FIG. 27 depicts a partial order structure (i.e., a lattice of equivalence classes) in a database management system according to the invention for the equivalence classes of FIG. 26;

FIG. 28 depicts meet and join calculations performed on equivalence classes in a database management system according to the invention;

FIG. 29 depicts a flowchart for conversion of source data into elements and links utilized in a database management system according to the invention;

FIG. 30 depicts a flowchart for identification of distinct tuples for the "Segment" concept arising from the "Customers", "Sales Territory" and "Segment" relations of FIG. 6 in a database management system according to the invention from the specification that led to the partial order structure of FIG. 13;

FIG. 31 depicts a complete set of concepts in a database management system according to the invention resulting from step 820 of FIG. 29;

FIG. 32 depicts links among data elements utilized in a database management system according to the invention created in step 840 of FIG. 29;

FIG. 33 depicts a flowchart for conforming source data to partial order constraints in a database management system according to the invention;

FIG. 34 depicts links created among concept data elements in a database management system according to the invention from the source tables of FIG. 32;

FIG. 35 depicts links among concept data elements utilized in a database management system according to the invention after removing the one-to-many links of FIG. 34;

FIG. 36 depicts a topological sort of the sets of links of FIG. 35 utilized in a database management system according to the invention (step 950 of FIG. 33);

FIG. 37 depicts links among concept data elements utilized in a database management system according to the invention after removing conflicting links (step 960 of FIG. 33);

FIG. 38 depicts a lattice of concepts in a database management system according to the invention including new links (labeled 6 and 7) among concept data elements according to the flowchart of FIG. 33;

FIG. 39 depicts a sample lattice in a database management system according to the invention for link contributions to the lattice of concepts of FIG. 38;

FIG. 40 depicts link contributions in a database management system according to the invention from source relations used in the calculations of FIG. 42 (below);

FIG. 41 depicts the calculation of links utilized in a database management system according to the invention that conform to the partial order (i.e., the objective of the flowchart of FIG. 33);

FIG. 42 depicts link contributions in a database management system according to the invention from the source relations of FIG. 40;

FIG. 43 depicts a comparison of source relations in a database management system according to the invention to resulting data elements and links in a database management system according to the invention;

FIG. 44 depicts a flowchart for conforming data to lattice constraints in a database management system according to the invention;

FIG. 45 depicts links among concept data elements in a database management system according to the invention;

FIG. 46 depicts a sample constraint specification of the type used in a database management system according to the invention;

FIG. 47 depicts a flowchart for conforming data to set constraints in a database management system according to the invention and incorporating those constraints into a specification, e.g., the specification of FIG. 9 or FIG. 12;

FIG. 48 depicts source concepts, data elements, and links in a database management system according to the invention for the sample constraint specification of FIG. 46;

FIG. 49 depicts additional elements used in a database management system according to the invention created by constraints of the type used in a database management system according to the invention (step 1140 of FIG. 47);

FIG. 50 depicts a flowchart for generation of additional data and links in a database management system according to the invention for implied concepts;

FIG. 51 depicts an inner join calculation in a database management system according to the invention (step 1230 of FIG. 50);

FIG. 52 depicts a flowchart for the calculation of functions and subsets in a database management system according to the invention from source table columns and definitions of the type used in practice of the invention;

FIG. 53 depicts a calculation of the type used in a database management system according to the invention for a function of the specification of FIG. 17;

FIG. 54 depicts sample rules for function transformation in a database management system according to the invention;

FIG. 55 depicts a flowchart for generation of a new lattice in a database management system according to the invention with calculated functions and assertions of the type used in a database management system according to the invention;

FIG. 56 depicts a sample relation model utilized in a database management system according to the invention;

FIG. 57 depicts a sample relation model in a database management system according to the invention after introducing an "asserted" concept into the relation model of FIG. 56;

FIG. 58 depicts a sample relation of the type used in a database management system according to the invention resulting from the assertion of FIG. 57;

FIG. 59 depicts a sample relation model of the type used in a database management system according to the invention with a more specific assertion; and FIG. 60 depicts a sample relation of the type used in a database management system according to the invention resulting from the more specific assertion of FIG. 49.

DETAILED DESCRIPTION OF THE ILLUSTRATED EMBODIMENT

In traditional database management systems, the data model (i.e., relational, hierarchical, etc.) and the data representation (e.g., a set of data values organized into a row in a relational table) that users of the database system use to interact with the system are closely linked. In order for users to input data, there has to be a particular instance of the data model (e.g., the data schema in relational data models) that defines the structures of the tables that are available in the system. Only after that structure has been defined can users begin to work with data in the system. Any changes to the particular instance of the data model (e.g., changes to a relational schema that separate the contents of one table into two tables) require changes to both the instance of the data model (the new table has to be defined) and to the data representation (new physical tables have to be created and the data has to be transformed from the original tables to fit into the new tables). However, these types of underlying transformations effectively lose the relationship between the original representation and the new representation.

The point of departure of database management systems and their respective data models/data representations according to the invention and of the illustrated embodiments (hereinafter, alternatively, "lattice systems", "lattice databases," "lattice database management systems," and the like) is different. Rather than require that data be organized according to a specific instance of the lattice data model, the embodiments of the invention accommodate data in a variety of representations and impose an instance of the lattice data model on those representations. By way of example, an added benefit of this approach is that one can impose different models on the data simultaneously. This is practical as well as functional, since most data is not currently organized according to a lattice data model and some transformation mechanism would be needed in any case. Having imposed the data model on the initial representation, one can pose queries to the system using a particular instance of the lattice data model and obtain a representation of the initial data that is consistent with the particular instance of the lattice data model.

The illustrated embodiments include mechanisms to specify and transform an initial data representation so that, when queried by a client that references an instance of a lattice data set, the data representation conforms to that instance. Logical components of the system and its clients are illustrated in FIG. 1, although other embodiments may include other components and may be configured otherwise. Illustrated Query Client (110) sends a query to the Lattice Query Engine (120). This query references not just the particular data set of interest, but also the specification in the Specification Repository (130) that defines that particular instance of the Lattice Data Set to be used to interpret the query. The Lattice Query Engine interprets both the query and the specification to find the source data in the Source Data Repository (140) or in the Cache (190). The Lattice Query Engine then applies any required transformation or calculations to the source data so that it properly conforms to the specification and the query. The resulting data set is returned to the Query Client.

In the illustrated embodiment, two other clients (170 and 150) are used to configure the system, e.g., as shown in FIG. 1, although in other embodiments the system may be configured otherwise (e.g., with a greater or lesser number of such clients, etc.). Consider first the Configuration Client. The Configuration Client (170) is used to define the specifications that will ultimately be accessible to the query client. These are stored in the specification repository (130). As discussed later, the specification repository may include specific functionality to improve its utility beyond standard versioning capabilities.

To add data to the system in the illustrated embodiment, an Import Client (150) directs the Transaction Manager (180) to import data into the system, although in other embodiments, the system may add data otherwise (e.g., by query client 110, import client 150, or other component of the system). The Transaction Manager directs the Source Data Repository (140) to fetch data from some external repository (160). The external repository could be a RDBMS or even data from the import client itself. If the import is successful, the Transaction Manager updates the Specification Repository (130) to indicate that new source data is available. If the import is not successful, the Transaction Manager rolls back the transaction and alerts the Import Client.

Lattice Query Engine

To service query requests, the query engine executes the high level flow illustrated in FIG. 2. Each of these steps will be discussed in turn. Those skilled in the art will appreciate that the illustrated sequence of steps is just one of many with which the invention may be practiced. Thus systems according to the invention may use a greater or lesser number of steps than those shown here, ordered as shown in the drawing or otherwise.

Retrieve Specification and Combine with Query

To execute a query, in the illustrated embodiment, the Lattice Query Engine (120) uses a specification as well as a query, although in other embodiments queries may be executed otherwise. As illustrated in FIG. 1, queries from the query client (110) contain a reference to a particular specification in the specification repository (130), although in other embodiments the specifications may be stored and/or referenced otherwise (e.g., by the query engine (120) or other component(s) of the system). Upon receiving the query and this reference, the Lattice Query Engine (120) instructs the repository (130) to retrieve the required specification.

While specifications could be defined and stored in any of a number of ways, the mechanism used in the preferred embodiment is to encode the specification as a set of values of data types. The basic types used in the specification are illustrated in FIG. 3 by way of non-limiting example.

The Concept type is the abstraction corresponding to a class of entities. A discussion of concepts as a data modeling device can be found in Alexandr Savinov—"Hierarchical Multidimensional Modelling in the Concept-Oriented Data Model", Proceedings of the CLA 2005 International Workshop on Concept Lattices and their Applications Sep. 7-9, 2005, the teachings of which are incorporated herein by reference. Typical concepts that arise often in enterprise data systems include, by way of non-limiting example, entities like Employees, Customers, and Products. However, Concepts can also include combinations, by way of non-limiting example, such as Customers and Products. The interpretation of this combination depends on the specific context but could be something like all tuples of Customers and Products that a Customer has purchased. Alternatively, it could be all tuples of Customers and Products where a customer has received a quotation. To enable distinctions between these cases, there is a ConceptSubset abstraction illustrated in FIG. 3. This enables specification of a particular subset of the entities of a concept. Finally, the abstraction ConceptAtomic covers those concepts that are not further decomposable.

To illustrate the syntax of FIG. 3, consider again the concept of Customers and Products. This instance of the concept type could be written as:

Concept(ConceptAtomic("Customers"), ConceptAtomic("Products")).

This syntax is similar to a variety of software systems that are based on rewriting rules. One example is the Maude System, an open source rewriting tool, a discussion of which can be found in Manuel Clavel et al., "Maude Manual (Version 2.4)," SRI International (October 2008, Revised February 2009); Theodore McCombs, "Maude 2.0 Primer (Version 1.0)," (August 2003); and Narciso Marti-Oliet and Jose Meseguer, "Rewriting Logic: Roadmap and Bibliography," SRI International (June 2001), the teachings of all of which are incorporated herein by reference.

FIG. 4 illustrates, by way of non-limiting example, the primary types used in the specification. These include SourceTable, Function, Identification, Implication, Set identification, and Constraint. Also illustrated in FIG. 4 is the type Query that encodes a request to calculate a set of functions on a particular ConceptSubset. FIG. 7 shows, by way of example, a set of values of type SourceTable and of type Implication that define a specification.

In the illustrated embodiment, combing the specification with the query consists of forming an instance composite type:

SpecAndQuery(Set{SourceTable}, Set{Functions}, Set{Identification}, Set{Implication}, Set{SetIdentification}, Set{Constraint}, Query).

Although in the illustrated embodiment, the specification and query are combined as above, in other embodiments, they may be combined otherwise.

Create Partial Order of Concepts

By way of example, one of the primary reasons for using concepts is that concepts often possess partial order relationships that aid in reasoning about the particular members. In the current context, the relevant partial order on concepts is as follows: If there is a many-to-one relationship between the data elements of a first concept and the data elements of a second concept, then the first concept is 'less than' the second concept in the partial order. That is, if one has an instance of a particular concept in mind (e.g., a customer) then one knows that there are either 0 or 1 data elements of a second concept (e.g., a customer segment) for each data element in the first concept, then the first concept is less than the second concept. When this relationship holds between two concepts, we say that one concept implies the other. Whether this condition holds will depend on the particular interpretations given to the concepts. Consider specifically the relationship between a Customer concept and a CustomerSegment concept. Suppose the Customer is Bethesda Naval Hospital. If the segments in the CustomerSegment concept include Government and Healthcare, then there is not deterministic relationship between Customers and CustomerSegments. Of course, it is possible that one could define the relationship between Customers and CustomerSegments so that, for example, Bethesda Naval Hospital is classified as Government only and not as a Healthcare. If this is done in all cases, then there would be a deterministic relationship between Customer and CustomerSegment.

A starting point for the definition of concepts is the available source data. FIG. 5 illustrates the process for creating a Partial Order of Concepts from source data. Those skilled in the art will appreciate that the illustrated sequence of steps is just one of many with which the invention may be practiced. Thus systems according to the invention may use a greater or lesser number of steps than those shown here, ordered as shown in the drawing or otherwise. To understand this flow, consider the source data represented as an instance of a relational data model depicted in FIG. 6. There are 5 relations: SalesTransactions, Products, Segment, SalesTerritory, and Customers. Data that arises from a relational source typically has several components including, for example, the relations themselves, primary keys, and many-to-one constraints. The totality of information in the relations and the associated components will be termed a Relational Context (RC) in the sequel.

As per Step 410 in FIG. 5, the first task is to create concepts from the keys of the tables. Key fields are marked with the KEY identifier in FIG. 6. The concepts arising from this construction include:

Concept(ConceptAtomic("CustomerID"))
Concept(ConceptAtomic("ProductID"))
Concept(ConceptAtomic("Segment"))
Concept(ConceptAtomic("SalesTerritory"))

As per Step 420 in FIG. 5, the next step is to create concepts for any source tables that do not have keys. In the example in FIG. 6, the table SalesTransactions does not have a key even through it has foreign keys. The concept thereby generated is:

Concept(ConceptAtomic("SalesTransactions"))

As per Step 430 in FIG. 5, the next step is to create concepts from discrete-valued columns. Automated analysis of the data types can be used to identify these column candidates. For example, strings, small integers, and foreign keys would all typically be considered as discrete-valued columns. In this example, this would result in the following concepts:

Concept(ConceptAtomic("Name"))—from Customers table, Products tables, and Sales Territory table
Concept(ConceptAtomic("ProductClass"))
Concept(ConceptAtomic("ProductFamily"))

Note that the columns "Annual Revenue $M", "Price", and "Target" have been excluded because they wouldn't typically be considered to be discrete-valued columns. Since they do draw their values from finite tables, they could each be included as distinct concepts if one chose to do so in the specification, but typically these types of values are better modeled as functions on the lattice concepts.

As per Step 440 in FIG. 5, the next step is to add Implication terms between the concepts associated with Keys and the concepts associated with their columns. As discussed above, these implications are precisely the partial order relationship between concepts. This results in the following implications:

Implication(Concept(ConceptAtomic("CustomerID")), Concept(ConceptAtomic("Name")))

Implication(Concept(ConceptAtomic("CustomerID")), Concept(ConceptAtomic("Segment")))

Implication(Concept(ConceptAtomic("SalesTerritoryID")),Concept(ConceptAtomic("Segment")))

Implication(Concept(ConceptAtomic("SalesTerritoryID")),Concept(ConceptAtomic("Name")))

Implication(Concept(ConceptAtomic("ProductID")), Concept(ConceptAtomic("Name")))

Implication(Concept(ConceptAtomic("ProductID")), Concept(ConceptAtomic("ProductClass")))

Implication(Concept(ConceptAtomic("ProductID")), Concept(ConceptAtomic("ProductFamily")))

Implication(Concept(ConceptAtomic("SalesTransactions")),Concept(ConceptAtomic("CustomerID")))

Implication(Concept(ConceptAtomic("SalesTransactions")),Concept(ConceptAtomic("SalesTerritoryID")))

Implication(Concept(ConceptAtomic("SalesTransactions")),Concept(ConceptAtomic("ProductID")))

In the sequel, implication may also be denoted using the '=>' operator.

Notice that with this set of implications, there are two possible ways to imply the Segment concept from the SalesTransactions concept. One can first imply SalesTerritoryID and then Segment. Alternatively, one could imply CustomerID and then Segment. However, because these relationships are specified by data tables, there is no particular reason that these different paths would associate the same segment with a particular row of the SalesTransaction table. To see this, consider again the example in FIG. 6. The row labeled 511 in the SalesTransaction table links to the row labeled 512 in the Customers table. In that row, the segment is identified as "Enterprise". Row 511 also links to row 513 in SalesTerritory where the segment is identified as "Commercial". Because both segment classifications may be relevant, the default behavior for interpreting a relational schema is to create two additional concepts for the linkages:

Concept(ConceptAtomic("Segment_Customers")),
Concept(ConceptAtomic("Segment_SalesTerritory"))

The resulting set of implications is illustrated in FIG. 7 in the implications table (532) by way of example. The entire partial order is illustrated in FIG. 8, again by way of example.

In addition to specifications that are derived by examining the schema of the source tables, the user (or other operator, system, etc., collectively "user") may update the specification through the configuration client (Item 170 in FIG. 1). By way of example, one reason to modify specifications is to enable the user to create a model of the data that better expresses the business entities. In this case, the concept "name" was created from several different source tables that represent essentially unrelated concepts. To address this, the user can modify the specification to disambiguate the name fields from the different specifications as illustrated in FIG. 9 Items 554-559. The resulting partial order is shown in FIG. 10.

FIG. 12 illustrates, by way of non-limiting example, some additional specification items that would likely be included for this example. These include three things. First, additional implication relationships between ProductName, ProductClass and ProductFamily to define a product hierarchy. Second, identifications that once again combine Segment_SalesTerritory, Segment_Customers, and Segment into a single concept. And finally, identifications that relate names and IDs for the SalesTerritory and Customer tables endow the SalesTerritory and Customer concepts with two independent keys.

The resulting partial order is shown in FIG. 13. In addition to their impact on the partial order structure, these additional specification items will impact the downstream steps in the Query Engine flow, Items 230-310 in FIG. 2.

In some embodiments, the system includes a mechanism for creating a partial order of concepts (POC) from a relational context (RC). A RC shall consist of set of relations, an optional set of cardinality constraints on those relations, an optional set of column identifications associated with the relations, an optional set of primary keys identified on those relations, an optional set of many-to-one constraints on pairs of sets of columns in a relation, an optional set of independent relational paths that should be considered as equivalent, and an optional set of declarations that specify that certain columns should be or should not be considered discrete-valued.

Create Constructed Concepts

In the previous example, all of the concepts in the partial order arose directly from source tables or the columns within them. The system of the illustrated embodiment also allows for concepts that are created through the logical relationship to other concepts or data, although in other embodiments, the system may not allow for such concepts. In the illustrated embodiment, this construction is parallel to the creation of views in a relational database. Views are relations derived from other relations. Constructed concepts are concepts constructed from other concepts.

FIG. 14 illustrates the sequence of steps used to process constructed concepts that appear in a specification. Those skilled in the art will appreciate that the illustrated sequence of steps is just one of many with which the invention may be practiced. Thus systems according to the invention may use a greater or lesser number of steps than those shown here, ordered as shown in the drawing or otherwise.

The constructed concepts are identified by examining the inequalities (step 610), the functions (step 620), the source tables (step 630), and the identifications (step 640) that are present in the specification. Each of these components of the specification relies on values of the type Concept. As shown in FIG. 3, values of type Concept can be created from a set of ConceptAtomic values using the Concept constructor with type signature Concept: Set {ConceptAtomic}->Concept. The '->' operator in this signature demarks the result type from the source type of the function. FIG. 15 illustrates additional constructors for ConceptAtomic values. With these constructors many new concepts can be created.

When Constructed Concepts are introduced into the specification, they implicitly add additional implications to the specification by virtue of their relationship with existing concepts. The implied relationships are illustrated in FIG. 16.

To see how this comes together with a concept example, consider the incremental specification components shown in FIG. 17. A new function, "SegmentAnnualRevenue", is defined. It categories the annual revenue value (Item 525 in FIG. 6) into four distinct values: "Enterprise", "Commercial", "SMB", and "Consumer". FIG. 18 shows the values of SegmentAnnualRevenue for the example Customer relation from FIG. 6. The function specification in FIG. 17 indicates that this calculation is to be associated with the concept, Concept(ConceptAtomic("CustomerID")). As a function, this item behaves similarly to the existing function "Annual Revenue $M" that is also defined on the same concept. However, through the Concept Constructor, "FunctionToConcept", shown in FIG. 17, this function is used to create a new atomic concept within the concept partial order. As indicated in FIG. 15, the FunctionToConcept constructor uses the distinct values of a function evaluated on a concept to define a new concept.

If the incremental specifications illustrated in FIG. 17 are applied to the specification that generated FIG. 13, then the new partial order of concepts will be as shown in FIG. 19. The new concept is indicated as Item 100 in FIG. 19. Notice that this new concept is related to the CustomerID concept through the relation shown as Item 101 in FIG. 19. This partial order relationship arises from the implied implication labeled as Item 105 in FIG. 16. Item 105 encapsulates the idea that if a constructed concept arises from a function on attributes of a second concept, then the constructed concept can be implied from the second concept.

As a further illustration of constructed concepts, consider the Copy constructor, Item 101 in FIG. 16. Suppose the specification used in FIG. 13 also included a reference to an atomic concept given by the Copy constructor. As an example, consider the following ConceptAtomic value:

Copy(ConceptAtomic("ProductName", CopyIdentifier ("SameClass"))

This constructed concept refers to a parallel concept partial order that is distinguished from the original concept partial order by the label provided by the CopyIdentifier argument, which is "SameClass" in this case. By allowing this type of construction, a specification can reference more complex conceptual structures without requiring repetitive specification or duplication of source data. FIG. 20 illustrates the impact of using the Copy concept constructor to create new concepts for the concept partial order. Notice that the partial order relationships among the constructed concepts (e.g., Item 300) arises from the corresponding partial order relationships among the initial set of concepts (e.g., Item 200). This follows from the implied implication shown as Item 104 in FIG. 16.

Typically, a specification would not reference Copy-constructed concepts without some additional relationship between the Copy-constructed concepts and the original set of concepts. FIG. 21 shows one possibility for the current example. FIG. 21 shows the result of adding the identification:

Identification(Concept(ConceptAtomic("Product-Class")),Concept(Copy(ConceptAtomic("Product-Class"), CopyIdentifier("ProductClass"))))

to the specification. The identified concepts are shown as Item 400 in FIG. 21 by way of example. Notice, however, that the higher level concepts (e.g., Items 402 and 403) are not necessarily identified.

The Relation constructor listed in FIG. 16 behaves similarly to the Copy constructor except that it enables a single source table to establish the linkage between the original concepts and the concepts constructed through the Relation. A common use case for a relation constructor would be to include a relationship that compares different time period. For example, one could define a relationship that relates the current quarter to the four prior quarters. A specific instance of that relationship is illustrated in FIG. 22. This table would be specified as:

SourceTable("Prior Year Quarters", (Column("Qtr", ConceptAtomic("Quarter")), Column("PriorQtrs",Relation (ConceptAtomic("Quarter"),RelationIdentifier ("PriorYearQuarters")))))

If the specification only included the concept Quarter and the concept Sales Transactions as illustrated in Item 600 of FIG. 23, then the addition of this relationship into the specification would lead to the partial order structure in Item 601 of FIG. 23.

Having identified all of the constructors in Steps 610-640 of FIG. 14, the next task is to assign constructions a construction depth. To motivate this, consider the following concept:

FunctionToConcept(FunctionName("f1"),Concept(FunctionToConcept("f2",Concept(ConceptAtomic("CustomerID"))), ConceptAtomic("CustomerID")))

This concept relies on calculating the function f1 on the concept created from a pair of concepts. The concept pair includes a concept derived from another function, f2, evaluated on CustomerID. Note, however, that the following two concepts are equivalent:

1) Concept(FunctionToConcept("f2"), Concept(ConceptAtomic("CustomerID")))

2) Concept(ConceptAtomic("CustomerID"))

The equivalence of these concepts is guaranteed by Item 105 in FIG. 16. Thus, the original concept derived from f1 could also be equivalently expressed as:

FunctionToConcept(FunctionName("f1"), Concept(ConceptAtomic("CustomerID")))

To resolve this ambiguity, the system simplifies the description of concepts to a unique form. To do that, a construction depth is assigned to all concepts. The construction depth is defined over the various constructors as shown in FIG. 24. Having defined the Construction Depth for each ConceptAtomic, a standardized form can be created (step 660 in FIG. 14). This standardized form respects the equivalent representations as in the example of the concept created from f2 in the discussion above. The process of standardizing ConceptAtomic terms continues until no further changes in the representations of the ConceptAtomic terms occurs (Step 670 in FIG. 14).

In some embodiments, then, the system includes a mechanism for creating a set of Constructed Concepts (SCC) from a RC and optionally a SCC using operators including but not limited to Relation, Copy, and Assert as defined in FIG. 15 and FIG. 16 and these examples.

Create Lattice of Concepts

Having defined a set of concepts and a partial order relationship among those concepts and any associated constructed concepts, the next step in FIG. 2 is Step 230—Create the Lattice of Concepts. The Lattice of Concepts (LOC) will be an extension of the partial order structure that satisfies the additional conditions for a mathematical lattice, namely, that the greatest lower bound and least upper bound of any two elements in the partial order should always exist and be unique. This procedure is described in FIG. 25. As above, the illustrated sequence of steps is just one of many with which the invention may be practiced. Thus systems according to the invention may use a greater or lesser number of steps than those shown here, ordered as shown in the drawing or otherwise.

First, all subsets of the initial set of ConceptAtomics is formed. To illustrate this step, consider just the following ConceptAtomic elements from FIG. 13: Segment, SalesTerritoryID, CustomerID, SalesTransactions. The set of all subsets of these ConceptAtomics is shown in the left column of FIG. 26 and labeled as Item 700. Note that in the preferred embodiment, not all subsets need to be considered because only some of the subsets will actually appear in the dependencies for any particular query to this system. The subsets in the preferred embodiment are identified by examining the dependency tree associated with a query and accumulating the subsets of ConceptAtomics that actually appear therein.

For Step 720 in FIG. 25, all of the implications and identifications arising from the specification (e.g., those in FIGS. 9 and 12) and those arising from the Constructed Concepts (e.g., FIG. 16) are combined into a set of rules for transforming one subset of ConceptAtomics into another. In Step 730, these rules are applied to the subsets until all equivalent subsets are identified. The procedure is an instance of the forward chaining algorithms used in propositional logic, a discussion of which can be found in Stuart J Russel and Peter Norvig—"Artificial Intelligence A Modern Approach," §7.5 (2d ed., Pearson Education Inc. 2003), the teachings of which are incorporated herein by reference.

To see how this works, consider Item 701 in FIG. 26. It is the entry for the SalesTransactions concept. The implication rules 560 and 561 in FIG. 9 imply that CustomerID and SalesTerritoryID can also be reached. The implication rule 562 in FIG. 9 indicates that Segment_SalesTerritory can also be reached. In this example, we are also including the identification 570 in FIG. 12 that identifies Segment_SalesTerritory with Segment. Thus, Item 701 in FIG. 26 is equivalent to Item 702 in FIG. 26 because each of the other ConceptAtomics in Item 702 can be implied from SalesTranactions. Hence, both Item 701 and Item 702 in FIG. 26 belong to the same equivalence class. This is indicated in the table by assigning them both to the same Equivalence Class ID, Items 703 and 704. The same type of reasoning applies to all the other subsets illustrated in FIG. 26 and this gives rise to the set of Equivalence Class IDs (Item 705).

The resulting equivalence classes can be arranged into a partial order structure by defining the following order relation:

Equivalence class A is larger than Equivalence class B if the largest subset of concepts in A contains the largest subset of concepts in B The resulting partial order structure for the equivalence classes is illustrated in FIG. 27. Notice that the original partial order structure (FIG. 13 without the Product nodes) is contained within this partial order. There are, however, two new terms in this partial order corresponding to Equivalence Class ID=5 and Equivalence Class ID=6. Equivalence Class ID=6 just corresponds to the empty set of ConceptAtomics. This will be present in all lattice constructions and corresponds to the idea of 'All' objects. Equivalence Class ID=5 corresponds to the composite concept formed from CustomerID and SalesTerritoryID. This concept is distinguished from SalesTransactions because there may be many SalesTransactions for a particular pair of Customer and Sales Territory.

To qualify as a lattice, a partial order possesses two operators, meet and join (denoted by $\wedge$ and $\vee$ respectively) that define the unique greatest lower bound and least upper bound for two elements respectively. As per FIG. 25, these two operators are defined in Step 740 and 750 as operations on the associated equivalence classes.

For two equivalence classes, A and B, the meet operator associates a third equivalence class C, that is given by the equivalence class of the member corresponding to the union of the ConceptAtomic elements from any representation of A and any representation of B.

For two equivalence classes, A and B, the join operator associates a third equivalence class C, that is the given by the equivalence class of the member corresponding to the intersection of the maximal subset representations of A and B in their respective equivalence classes.

This procedure is illustrated in FIG. 28. Item 900 in FIG. 28 is the desired meet calculation: CustomerID$\wedge$SalesTerritoryID. The union of these two subsets of ConceptAtomics is identified with Equivalence Class ID=5.

Item 901 in FIG. 28 is the desired join calculation: CustomerID $\vee$ SalesTerritoryID. The largest equivalence class for CustomerID is shown as Item 902 in FIG. 28. The largest equivalence class for SalesTerritoryID is shown as Item 903 in FIG. 28. Finally, the intersection of these two is "Segment" as illustrated in Item 904 of FIG. 28. The resulting Equivalence Class ID is 1.

In some embodiments, the system includes mechanisms for creating a LOC from a POC, an optional SCC, an optional set of LOC, and an optional set of lattice identifications and inequalities (SLII). In one such embodiment, the lattice of concepts is created by formally extending the partial order of concepts with formal meet and join operators defined as described in the details above. In other embodiments, multiple lattices are combined by specifying a set of identifications of concepts from one lattice to concepts in another lattice.

Convert Source Data into Element and Links

Continuing on the construction procedure illustrated in FIG. 2, the next step is Step 240 in which source data is converted into elements and links. The process is shown in more detail in FIG. 29. As above, those skilled in the art will appreciate that the illustrated sequence of steps is just one of many with which the invention may be practiced. Thus systems according to the invention may use a greater or lesser number of steps than those shown here, ordered as shown in the drawing or otherwise.

The first step in FIG. 29 is to create the set of all distinct tuples of values for each set of columns associated with the concept (Step 810 in FIG. 29). FIG. 30 illustrates this process for Segment concept arising from the Customers, Sales Territory and Segment relations from FIG. 6 using the specification that lead to the partial order structure in FIG. 13. The contributions from each of these relations to the Segment Concept (Item 1100 in FIG. 30) are illustrated in FIG. 30. Where these relations have null values (Items 1101 and 1102 in FIG. 30), there is no contribution to the Segment concept.

For source tables that don't have a key, unique identifiers are created for the rows of those tables as discussed in Step 820 of FIG. 29. The resulting sets of values for each concept are shown in FIG. 31. Item 1200 in FIG. 31 shows distinct values that were created for the concept Sales Transactions because that concept arose from a source table without any key columns.

In certain circumstances, there may be occasion to define equivalence relations between different values for a particular concept. For example, if Sales Territory ID=T100 and Sales Territory ID=T102, which both refer to the Northeast, had been identified as the same sales territory, then these two different entities would be consolidated in the Sales Territory Concept in FIG. 31. This step is also illustrated as Step 830 in FIG. 29.

Having established the basic sets associated with each concept, the next step, Step 840 in FIG. 29, is to create a relation between each pair of concept data elements that are related through the concept implications. For example, the Products relation in FIG. 6 has the following columns: ProductID, Name (identified as the ConceptAtomic Product Name in the Source Table specification), Product Class, and Product Family. The following implications hold for these concepts:

Product ID=>Product Name
Product ID=>Product Class
Product ID=>Product Family
Product Name=>Product Class
Product Name=>Product Family
Product Class=>Product Family The links created from Step 840 are illustrated in FIG. 32 by way of example. Notice that even though there is an implication from Sales Transactions to Segment, there is not yet a direct link between these tables. However, for Product ID and Product Family, there is a direct link. The difference is that the source relation Products in FIG. 6 contains both the Product ID and the Product Family columns which are mapped to concepts that share an implication relation. In contrast, the Sales Transactions relation does not have a column mapping to the Segment concept and thus there is not a contribution from this step.

In some embodiments, the system includes a mechanism for creating from a RC and a POC, a data set where each data element is associated with one of a set of concepts and where there are zero or more links between data elements. Such a collection of data elements, concepts, and links shall henceforth be referred to as a Linked Concept Data Set (LCDS).

Conform Source Data to Partial Order Constraints

While the initial construction in Step 840 did not create a link between data elements of the Sales Transactions and the Segment concepts, such a link should be created because it can be formed by combining existing links to form a 'path' between the data elements. FIG. 33 describes the procedure for converting the initial set of links that arose from the source tables (e.g., FIG. 32) into a set of links for the lattice data model. As above, those skilled in the art will appreciate that the illustrated sequence of steps is just one of many with which the invention may be practiced. Thus systems according to the invention may use a greater or lesser number of steps than those shown here, ordered as shown in the drawing or otherwise.

The procedure in FIG. 33 begins with step the links derived from the source relations. As first example, consider the links from source tables that were shown in FIG. 32. According to Step 910 in FIG. 33, these initialize the links at level 1. Per Step 920 in FIG. 33, the links are augmented with contributions from compositions of links between intermediate nodes. Returning to the example, consider the link from Sales Transactions to Segment. There were no contributions to this link in FIG. 32 because none of the source relations contained columns that mapped to both concepts. However, links between these concepts can be formed by composing the links from Sales Transactions to Sales Territory with the links from Sales Territory to Segment. A similar set of compositions is possible with Customers as the intermediary. The links at level 1 created from these compositions are illustrated in FIG. 34. Item 1 in FIG. 34 arises because both sets of compositions provide the same contribution. Items 2 and 5 in FIG. 34 arise from compositions through only one intermediate (Sales Territory and Customers respectively). Items 3 and 4 arise from compositions through Sales Territory and Customers, respectively, but these links terminate on different values in the Segment concept.

The next step, Step 930, looks for any contributions that arise from lower level links that are from a concept lower than the source concept of the link. At level 1, there are no such lower level links because all links at level 0 are from source relations that connect only adjacent items in the concept partial order.

Step 940 addresses the situation with Items 3 and 4 in FIG. 34. These two links terminate on different data elements and thus these two links are removed. The resulting links are shown in FIG. 35.

For Step 950 in FIG. 33, a topological sort is performed on the sets of links between two concepts using the dictionary order derived from the partial order on the concepts. A topological sort ordering for the sets of links in FIG. 35 is shown in FIG. 36 where the numbers indicate the topological ordering of the links.

In Step 960 of FIG. 33, links are removed when they conflict with higher level links. In the example in FIG. 35, the links labeled 3 and 4 are to be removed. In FIG. 35, when link 3 is combined with link 6 it conflicts with the absence of the link from Item 8 (Sales Transaction 3) to Segment. Similarly, when link 4 is composed with link 7 in FIG. 35, it again conflicts with the absence of a link from Item 8 in Sales Transactions to Segment. The resulting set of links is shown in FIG. 37.

For Step 970 of FIG. 33, the links have clearly changed from the links generated from the source relations (links at level 0), and so the process repeats again at Step 910. For this iteration, there are no new contributions from Step 920 in FIG. 33.

For Step 930 in FIG. 33, however, there are two links where a lower level concept can contribute, namely Customers=>Segment and Sales Territory=>Segment. In both cases the concept Sales Transactions links to both concepts and thus, in Step 930, additional links are added to Customers=>Segment and Sales Territory=>Segment. To see how these links arise, consider Items 3 and 5 in FIG. 37. By following Item 3 in the inverse direction and composing that with Item 5, one obtains a link between the Sales Territory data value U.S. Consumer and the Segment data value Consumer. Similarly, Items 4 and 2 create a link between data element Big Bank in the Customers concept and data element Commercial in the Segment concept. The new links are labeled as Items 6 and 7 in FIG. 38.

No additional changes are required in the sequence in FIG. 33, but if they were, the process would just continue until it reached the required fixed point.

To illustrate the process in FIG. 33 with a more complex example, consider first the lattice of concepts of FIG. 38. Suppose that three source relations—VXY, XAB, and YBC—are also supplied as shown in FIG. 39. These source relations contribute the links shown in FIG. 40. FIG. 41 illustrates the objective of the process of FIG. 33, namely the calculation of links that conform to the partial order. FIG. 42 shows the sequence of the calculations of FIG. 33 for the links in FIG. 41 given the source relations of FIG. 40.

The notation in FIG. 42 is as follows:
 a) A link from A to B is denoted by AB
 b) The composition of link AB and BC is denoted by Compose(AB, BC)
 c) The union of link L1 and L2 is denoted by Union(L1, L2)
 d) If link L1 is a link from A to B and L2 is a link from A to C, then Combine(L1, L2) is the composition of the inverse of L1 with L2.

In FIG. 42, Item 1 corresponds to the set of links illustrated in FIG. 41. Item 2 is the set of initial links provided by the source relations as shown in FIG. 40. Item 3 is the set of links that arise from Step 920 in FIG. 33. For example, Item 5 shows that a link from A to C can be created by composing the links AB and BC that arose from the source relations. As another example, Item 6 illustrates the situation where more than set of compositions (in this case VX, XB and VY, YB) can be used to create a link. Since both contributions need to be considered, the link is formed form the union of these links arising from each source. Note that there are no contributions from Step 930 at Level 1 in this example. However, the links at level 2 (Item 4 in FIG. 42) do contain contributions from Step 930. Consider Item 7 in FIG. 42. This link is the union of the direct link AB that arose from the relation XAB and a second link. The second link arises from Step 930 in FIG. 33. The Concept V is less than both A and B, so according to Step 930 in FIG. 33, the link from A to B should include the contribution from traversing link VA at Level 1 in the inverse direction and composing that with the link VB at Level 1. The Link VA at level 1 is itself a composition of the links VX and XA, and the Link VB is the composition of the links VY and YB. Note, however, that the contribution to VB from the composition VX and XB is not included. The reason is that this link is already included through the link AB because AB arose from the same source relation—XAB.

As a consequence of the procedure in FIG. 33, the data elements and the associated links satisfy the following properties which define a "path-independent, complete data set":

1) If there exists a path from a first data element associated with a first concept to a second data element associated with a second concept, then all paths from the first data element to the second concept terminate on the second data element 2) For data elements a, b, c where a is associated with concept A, b is associated with concept B, and c is associated with concept C, if there exists paths from a to b, and a to c, and the inequality B<C is defined in the partial order of concepts, then there exists a path from b to c.

To see the impact of this in more relational terms, consider FIG. 43. The initial relations with only the relevant linking columns are shown on left side and the relations equivalent to the data elements and their links are shown on the right side of the figure. Items 1 and 2 show that data which was previously missing in the source data has been filled in from the consistency requirements. Item 3 shows that the Sales Transaction table has been given a new ID column to uniquely identify its rows. Item 4 shows that an entry in the Sales Transactions table linked to data with inconsistent mappings and it has thereby been eliminated. Item 5 shows that the data element SMB that was referenced as a foreign key in the Sales Territory table has been added to the Segment relation. Thus, conforming data to the lattice model has enabled a set of automated data cleaning and data augmentation steps that arise purely from the model description and the source relations without any human investigation of the source relations.

In some embodiments, the system includes a mechanism for creating a LDSWPOC and an error log and/or links errors and/or generating events and/or generating alerts about missing or inconsistent data in the LCDS when combined with the POC.

Conform Data to Lattice Constraints

The next step in the overall Query Engine Flow (FIG. 2) is Step 260. In this step, the source data is conformed to the Lattice Constraints. The details steps are outlined in the procedure in FIG. 44. As above, the illustrated sequence of steps is just one of many with which the invention may be practiced. Thus systems according to the invention may use a greater or lesser number of steps than those shown here, ordered as shown in the drawing or otherwise.

The first step (Step 1010 in FIG. 44) is to find those concepts that don't have a member of their equivalence class that contains a single ConceptAtomic. These concepts will be termed composite concepts. Returning to the example of equivalence classes illustrated in FIG. 26, the only Equivalence Class ID with this property is Equivalence Class ID=5. All of the subsets in this equivalence class have CustomerID and SalesTerritoryID.

The next step, Step 1030 in FIG. 44, is to find all other concepts (e.g., the other equivalence classes in FIG. 26) that have maximal representations that contain all of the ConceptAtomic elements of the initial concept. For the concepts in FIG. 26, the only other concept that contains both CustomerID and SalesTerritoryID is Equivalence Class ID=3.

The next step in FIG. 44, Step 1040, creates the union of all tuples arising from the concepts that contain the ConceptAtomics of the compose concept. For the example in FIG. 26, consider the source data as represented in FIG. 38. The set of all distinct tuples of Sales Territory ID and Customer ID that arise from Sales Transactions is illustrated in FIG. 45 and labeled as Item 1. This concept is also associated with the meet of concept Sales Territory and concept Customers.

Since there were no data elements associated with the meet initially, there are no contributions from Step 1050 in FIG. 44. In general, source relations would contribute directly to this concept if they had a composite key consisting of Sales Territory ID and Customer ID, or any of the other ConceptAtomic's that were identified with these (e.g., Sales Territory Name).

Next, Step 1060 in FIG. 44 indicates that links are to be added from the lower level concepts. These links are illustrated in FIG. 45 as Item 2.

Finally, Step 1070 in FIG. 44 indicates that links are to be added for all high level concepts. These links are illustrated in FIG. 45 as Items 3, 4, and 5.

Having completed this sequence of steps, the data elements and links now satisfy the following properties (1) and (2) for a path-independent, complete data set defined above as well as the following additional property:

3) For concept C with C<A and C<B and for data elements a, b, c where a is associated with concept A, b is associated with concept B, and c is associated with concept C, and there exists paths from c to a and c to b, then for each concept X such that X<A and X<B and there does not exist a concept Y such that X<Y and Y<A and Y M B, then there exists an element ab associated with concept X such that there exists path from c to ab, ab to a, and ab to b.

A data set that satisfies all three of these properties will be called a partial order data set.

When the partial order for the set of concepts also forms a lattice, the data set will be called a lattice data set.

Conform Data to Set Constraints

The previous construction produced a set of data elements and links from source tables that have several desirable properties. In many circumstances, additional control is needed to generate the appropriate sets of data elements and links. This control comes through the addition of constraints to the specification (see FIG. 4 for the syntax of Constraints). There are three broad types of constraints:

1) Maximal Extent constraints
2) Surjective constraints
3) Entire constraints

Maximal Extent constraints in the specification dictate a maximal set of elements for a concept node. This can be used, for example, in situations where it is desirable to force errors if data elements are not present in a particular source relation or set of relations.

Surjective and entire constraints are constraints on links. They specify that a link maps to all data elements of a target concept (surjective) or that a link be defined for all elements of a source concept (entire). Moreover, both of these constraints can sometimes be applied to the same set of links between two concepts.

For constraints to work, the construction of the lattice data set can include, for example, a mechanism to satisfy the constraint. This can be done by adding links, removing links, adding data elements, or removing data elements. The maximal extent constraint includes the capability to remove elements from a particular concept. The entire (surjective) constraints can be satisfied by either adding elements to the target (source) or by removing elements from the source (target). If a constraint requires that elements be added (removed) to (from) a concept, then that concept is termed accretive (depletive). For a set of constraints in a specification to be consistent, concepts can be consistently labeled as accretive, depletive, or unchanged, but not both accretive and depletive.

As an example, consider the constraint specifications provided in FIG. 46. These constraints are intended to be part of the overall specification from FIG. 9 and FIG. 12. To incorporate constraints in the specification, the procedure in FIG. 47 is followed. As above, the illustrated sequence of steps is just one of many with which the invention may be practiced. Thus systems according to the invention may use a greater or lesser number of steps than those shown here, ordered as shown in the drawing or otherwise.

In Step 1110 of FIG. 47, concepts are partitioned into accretive, depletive and unchanged. Based on FIG. 44, the Sales Territory and Segment concepts are accretive, the concept Product is depletive, and all other concepts are unchanged.

For Step 1120 of FIG. 47, the accretive concepts Sales Territory and Segment have to be ordered so that Sales Territory precedes Segment.

For Step 1130 of FIG. 47, the constraints imply that Sales Transactions contributes to Sales Territory and that Sales Transactions and Sales Territory can contribute to Segment.

For Step 1140 of FIG. 47, new data elements and links are to be added or removed from the nodes. To continue with the example constraints from FIG. 46, suppose that the concepts, data elements, and links are as in FIG. 48. This example is the same as those on the right side of FIG. 43 and they correspond to the source relations that would have resulted in the set of data elements and links resulting from the process in FIG. 33. Notice, however, that Item 1 in FIG. 48 does not have a link to Sales Territory as indicated by the entirety constraint. In addition, since it was found in Step 1130 that Sales Transactions contributes to Segment, both the Sales Territory and Segment concepts have to be updated with values to satisfy the constraints.

The result of this update procedure is shown in FIG. 49. An additional data element is added to Sales Territory as Item 2. For definiteness, it was labeled as #SalesTransaction3 but any naming convention that uniquely identifies the Sales Transaction data element will suffice. A similar data element is also added to the Segment concept to insure that the set of links from Sales Territory to Segment is entire. In addition to the data elements, new links are created to link these data elements. See step 1140. These links are illustrated in FIG. 49 as Items 4 and 5.

To complete the procedure in FIG. 47, in Step 1150 the data elements and links again are to be checked for consistency with the process in FIG. 33. Finally, the data elements and links can also be made to conform to the Lattice constraints as per Step 1160 which invokes the process of FIG. 44. Having completed these steps, the resulting data set will now satisfy the properties of the partial order data set as well as the set constraints. If the partial order is a lattice then it will also satisfy the conditions for a lattice data set.

Generate Additional Data and Links for Implied Concepts

Returning to the overall process in FIG. 2, the next step is Step 280, which generates additional data and links for implied concepts. The purpose of this step is to insure that any possible meet that can be expressed as a set of ConceptAtomics can be assigned to a an appropriate set of data elements and have meaningful data links even if there is not a direct association between the concept and a source relation.

Since the purpose of this procedure is to calculate data elements for concepts that don't have an associated source relation, the example from FIG. 6 is a bit too simplistic because all concepts are reachable from source relations. Instead, consider the situation where the copy constructor was used to create additional lattice nodes and some of these nodes were related to the original nodes through identification, FIG. 21. For this concept partial order, the source relations of FIG. 6 supply elements and links to the same concepts as before (Sales Transactions, Sales TerritoryID, Segment, ProductID, ProductName, ProductClass, ProductFamily). In addition, the implicit interpretation of the copy constructor is that virtual copies of these source relations also populate the concepts annotated with the copy constructor and the copy identifier "SameClass". Yet even with this augmentation of the source relations, there is still not a source relation that can be used to populate concepts like the following:

1) Concept_Meet(Concept(ConceptAtomic("Sales Transactions")), Concept(Copy(ConceptAtomic("Sales Transactions"), CopyIdentifier("SameClass"))))

To calculate the data elements and links associated with these types of concepts, consider the procedure in FIG. 50. As above, the illustrated sequence of steps is just one of many with which the invention may be practiced. Thus systems according to the invention may use a greater or lesser number of steps than those shown here, ordered as shown in the drawing or otherwise.

The first step, Step 1210 of FIG. 50, is to identify all concepts that have associated data and links. Clearly all of the concepts in FIG. 20 have this property as do any concepts that arise from projections of these concepts (e.g., Concept_Meet(Concept(ConceptAtomic(CustomerID)),Concept(ConceptAtomic(SalesTerritoryID)))).

Next, in Step 1220 of FIG. 50, all pairs of constructed concepts with nontrivial join are formed. For this example, consider only the pair specified in (1) above because that is the only pair that will contribute to meet of those two terms. In general, several such pairs could contribute as described in FIG. 50. For these two concepts in (1), the lattice join is given by:

2) Concept(ConceptAtomic("ProductFamily"), Copy(ConceptAtomic("ProductFamily"), CopyIdentifier("SameClass")), ConceptAtomic("ProductClass"))

Where ConceptAtomic("ProductClass") has been identified with its copy.

Next, in Step 1230 of FIG. 50, for each concept, the data elements are formed as the union of the relational inner joins of the sets of concept data elements on their projections to their lattice joins. The concept data elements and their projections to product class are shown in FIG. 51 as Items 1 and 2. The projections to Product Family have been removed for simplicity because Product Family has a functional dependency on Product Class. The resulting relational inner join is shown as Item 3 in FIG. 51. This relation is in one-to-one correspondence with the data elements for the concept (1) above.

For Step 1240 of FIG. 50, one can project the relation, Item 3, in FIG. 51 into any of its columns to get contributions to higher level concepts. For example, one could project Item 3 in FIG. 51 onto Concept(ConceptAtomic("Sales Territory ID"), Copy(ConceptAtomic("Sales Territory ID", CopyIdentifier("SameClass")))).

In this example, the desired concept (1) was constructed directly by from constructed concepts. More generally, several such combinations may be used to reach the desired concept. Step 1250 of FIG. 50 indicates that the procedure can be iterated as many times as necessary to reach the desired concept. If it is not possible to reach the desired concept through repeated applications of this procedure, then the set of concept data elements associated with the concept is assigned to the empty set. This just indicates that there is no way to combine all the requested concepts with the source relations provided.

Note that this construction procedure preserves the lattice data set properties (1-3) described above.

In some embodiments, the system includes a mechanism for creating a LDSWLOC from a LDSWLOC, an optional Set of Injection Assertions (SIA), an optional SLC, an optional set of functions on a LDSWLOC (SFOLDSWLOC), and an optional SCC. In other embodiments, the system includes a mechanism for generating logs of data and/or link errors and/or generating events and/or generating alerts about missing or inconsistent data in the LDSWPOC.

In some embodiments, the system includes a mechanism for creating a LDSWLOC from a LOC, an optional set of lattice constraints (SLC), and a LDSWPOC. In other embodiments, the system includes a mechanism for generating logs of data and/or link errors and/or generating events and/or generating alerts about missing or inconsistent data in the LCDSWPOC.

Calculate Functions and Subsets from Source Table Columns and Definitions

Returning to FIG. 2, the next step is to Step 290 is to perform calculations in the form of functions and subsets. The detailed procedure is illustrated in FIG. 52. Those skilled in the art will appreciate that the illustrated sequence of steps is just one of many with which the invention may be practiced. Thus systems according to the invention may use a greater or lesser number of steps than those shown here, ordered as shown in the drawing or otherwise.

First, according to Step 1310 in FIG. 52, columns in source relations are associated with functions. In the example in FIG. 6, these function would include things like Item 525, "Annual Revenue $M". Column like this one typically contain measured quantities and thus are less useful for constructing concepts. These columns are often better modeled as functions on the underlying data elements for a particular concept.

Next, all of the associated functions defined in the specification (through values of the types in FIG. 4) and all of the reference ConceptSubsets are analyzed to form a calculation dependency tree (Step 1320 of FIG. 52). Consider again the function SegmentAnnualRevenue defined in FIG. 17. This function exhibits a functional dependency on the function Annual Revenue $M that was derived from the source table. In the event that the dependency graph contains cycles, the implementation can either report an error or attempt to evaluate to a fixed point.

For functions, the next step in FIG. 52 is step 1330. In this step, the set of data elements for the function is calculated. In the example in FIG. 17, only the definition of the function has been supplied. To evaluate a function, a target concept is also used. For this example, suppose that the target concept is Segment. The set of data elements for the result is then just the set of data elements corresponding to the Segment concept. Assuming the source relations of FIG. 6, these are illustrated in FIG. 38 as Item 8.

Next, Step 1335 conditions the next step on the definition of the function. For the function in FIG. 17, the transform function in the definition states that the function is defined on a particular set of data elements. Hence, the next step in FIG. 52 is 1340.

For Step 1340, the dependent functions have to be transformed to CustomerID since that is the set of data elements where the function is defined in the transform. Since the only dependent function is Annual Revenue $M, which is sourced from the Customers relation, no transformation is required.

For Step 1350, the function is evaluated per its definition using the values of the dependent functions when transformed to the definition set. For the function in FIG. 17, the evaluation on its definition set was illustrated previously in FIG. 18.

Finally, in Step 1360, the results are transformed to the requested result set. In this example it was stated above that the result data set was the data elements of the Segment concept. Thus, the values from FIG. 18 have to be transformed using the transformation rule in the function definition of FIG. 17. In this case, the transformation rule is Max because that is the final argument of the Function_Transform function. Using the links between Customers and Segment from FIG. 38, the calculation of the function in FIG. 17 at the concept Segment is shown in FIG. 53. According to the links of FIG. 38, there were two values in FIG. 18 (Items 530 and 531) that were aggregated with the Max function. Since both were Commercial, the result was also Commercial.

The branch for subsets in FIG. 52 executes in much the same was as for functions in FIG. 52. In fact, subsets are really the special case of boolean functions that define set membership. As such, the natural aggregation function is boolean OR and this corresponds to existence.

Steps 1370 and 1380 in FIG. 52 correspond to the situation where a function is meant to be evaluated on the result set directly rather than evaluated on a definition set and then manipulated through an aggregation.

Finally, we consider the transformations in Step 1340 and 1360, it is possible to define any number of rules for transforming functions. Several possibilities are illustrated in FIG. 54.

In some embodiments, the system includes a mechanism for creating a set of functions on a LDSWLOC (SFOLD-SWLOC) from expressions, aggregations, lambda expressions, LDSWLOC, SFOLDSWLOC, and a LCDS.

Generate New Lattice with Calculated Functions and Assertions

Returning to FIG. 2, the next step is Step 300 where a new lattice is created with calculated functions and assertions, although, as discussed above, the lattice may be created otherwise.

The motivation for this step is that the specification described with values of FIG. 4 could lead to the following situation:

1. A function is defined on a set of lattice nodes
2. The function is converted into a concept using the FunctionToConcept operator of FIG. 15
3. This new concept is then identified with an existing concept using an Identification value in FIG. 4.
4. The identification results in changes to the lattice links per step 960 of FIG. 33
5. The change in the links modifies the function calculated in #1

In order to give precise semantics to this situation, function calculations that appear as dependencies in identifications and set calculations that appear in assertions force the system to calculate a sequence of lattices. The interpretation of a query on the system is for values calculated as of the final lattice in the sequence. Identifications and assertions use calculations from the prior sequence. As for function calculations, the dependency tree involving lattice sequences will terminate as long as the definitions are acyclic. In the event of a cycle, an error is reported.

This procedure is illustrated in FIG. 55. As above, the illustrated sequence of steps is just one of many with which the invention may be practiced. Thus systems according to the invention may use a greater or lesser number of steps than those shown here, ordered as shown in the drawing or otherwise.

Having generated a new lattice, Step 310 in FIG. 2 continues the iteration through all levels of construction depth determined through the calculation described in FIG. 24. At that point, all of the constructed concepts are available and queries can be evaluated (Step 320 in FIG. 2). Lattice queries are calculated using the functions, links, and data elements calculated in the terminal lattice.

To see how this process works, consider first the example in FIG. 56. In this example there is only one relation, Item 1 in FIG. 56, to consider. The associated partial order of concepts is Item 2 in FIG. 56. The data elements and links are shown as Items 3-6 in FIG. 56. As is often the case with real data, several items are missing in the source relation. In this example, Items 7-10 in FIG. 56 illustrate the situation where a city and country and known but where the associated state was not provided. Because there is not a many-to-one relationship between cities and states (e.g., Kansas City), there can't be an inequality in the partial order between City and State. However, in situations where it is nearly many-to-one, it is desirable to explicitly model the near many-to-one relationship. This is done with the Assert constructor, Item 105 in FIG. 15.

The Assert constructor creates a new ConceptAtomic from two concepts that have a near many-to-one relationship. The rules for introducing the resulting ConceptAtomic into the partial order are shown as Item 103 in FIG. 16. FIG. 57 shows the impact of introducing an Asserted concept into the model of the relation in FIG. 56. The Asserted concept is Item 1 is FIG. 57.

To see how the presence of this concept impacts the lattice construction, return again to FIG. 2. In FIG. 2, Steps 230-310 form a cycle that repeats until all calculated functions and assertions are resolved. During the first iteration of this loop, the calculation of the lattice data elements and links produced Items 3-6 in FIG. 56 and their associated links. For the second iteration, the new ConceptAtomic corresponding to the assertion (Item 1 in FIG. 57) is introduced into the structure. It is introduced in this pass and not the initial pass because the construction depth of the Assert construction is one greater than the depth of its arguments (see FIG. 24 for the rule for construction depth). To form the data elements for the Asserted Concept (Item 1 in FIG. 57), all pairs of cities and states are included where the city uniquely determines the state (Step 1560 from FIG. 55). The results are shown as Item 14 in FIG. 57. Notice, for example, that Kansas City is not included because Item 6 and Item 7 show that there is not a many-to-one relationship between City and State for Kansas City.

Having calculated the data elements for the Asserted Concept, the next step is to calculate the links (Step 1570 from FIG. 55). These links are just a copy of the links from the concept CustomerID to the concept City that were created during the first pass of the lattice. For each CustomerID to City link that includes a city in the Asserted Concept, form the link from the CustomerID data element to the Assert Concept data element with the same city. These links are illustrated as Items 12, 13, 15, 16, and 17 in FIG. 57. The links from the Asserted Concept to State are calculated by just identifying the corresponding state element in the State concept (Items 18 and 19 in FIG. 57). Now, as the calculation proceeds through the cycle of Steps 230-310 in FIG. 2, Step 250 is executed again with these new links. During that step, it executes Step 920 in FIG. 33 which creates new links by combine existing links. It is from this step that Item 19 in FIG. 57 is composed with Items 12 and 13 in FIG. 57 to create links 10 and 11 in FIG. 57. Similarly, Item 18 in FIG. 57 is composed with Item 16 in FIG. 57 to yield Item 2 in FIG. 57. These new links fill the gaps in the source relation illustrated as Items 4, 5, and 9 in FIG. 57.

These steps collectively produce a lattice data set that would have arisen for the source relation illustrated in FIG. 58. Notice that this now includes Items 1-3 that were blank in the previous relation. It also illustrated that at least one of inference (Paris->Texas) is probably not desirable. To address this, the original assertion (City->State) needs to be modified. One possibility is to specify that the map from both City and Country to State be unique. The resulting Asserted Concept is shown as Item 1 in FIG. 59. As before, the calculation of the lattice performs two iterations through the steps of FIG. 2. This time, however, there is not a relationship between Paris, France and any state. Thus, the only link created for Paris is Item 13 in FIG. 59. The result is that the lattice data set created has the same structure as if the original source relation had been of the form illustrated in FIG. 60. Notice that there is no state for Paris, France (Item 1 in FIG. 60), but that Items 2 and 3 in FIG. 60 have been added as compared to the original source relation (Item 1 in FIG. 56).

In some embodiments, the system includes a mechanism to generate a LCDS from an optional LDSWLOC, and optional SFOLDSWLOC, an optional SCC, and an optional LCDS.

Querying the Lattice

Having completed the query execution through the process described in FIG. 2, the Lattice Query Engine (Item 120 in FIG. 1) passes the results back to the Query Client (Item 110 in FIG. 1). Because there may been several queries against the same specification and source data, it is possible to save a lot of calculations if some of the results are cached during the execution process. The Cache is illustrated as Item 190 in FIG. 1.

In the illustrated embodiment, the Lattice Query Engine (Item 190 in FIG. 1) uses the cache in the following way, although in other embodiments it may be otherwise. Each query request is broken down into its associated functions and the associated concept where the functions are to be calculated. Before evaluating any of these functions, the Lattice Query Engine checks the cache to determine if they have been calculated before for this combination of specification and source data. If so, then the calculation for that function can terminate and the values can be extracted from the cache. If not, the query proceeds to decompose the function into its constituent expressions and into the data element and data links needed for the calculation. Each of these items can in turn be checked against the items in the cache to see if there is an opportunity to reduce the number of calculation steps.

In some embodiments, the system includes a mechanism to query a LDSWLOC and an optional associated SFOLDSWLOC and an optional cache of previous results. In the same or other embodiments, the system can update the cache of previous results with either results of the current query or with any intermediate calculations performed therein.

In some embodiments, the system can query a lattice data set, e.g., of the type described above, in which any of the query, functions, and lattice elements are evaluated "lazily."

Versioning of the Specification

In the illustrated embodiment, the entire contents of the specification of the Lattice system are expressible in terms of a set of specification expressions as illustrated in FIG. 4, although in other embodiments it may be otherwise. In addition, a key identifying the precise contents of the source data repository is also saved in the Specification Repository (Item 130 in FIG. 1) by the Transaction Manager (Item 180 in FIG. 1), although in some embodiments this may not occur. Thus a full record of the state and response of the system to any query can be achieved by using standard techniques for versioning the specification and the data repository state. This also allows subsequent specification versions and queries to reference data or calculations available from any previous version of the system.

In some embodiments, the system includes a mechanism whereby all components of the system specification including RCs, CCs, LCDS, SLII, LOC, SLCs, LDSWPOC, LDSWLOC, Functions, Queries, and the sources of the underlying data sets themselves may be independently or collectively managed by a versioning system so that queries can reference any combination of valid versions of system specification and data set versions.

Described above are methods and apparatus meeting the desired objectives. Those skilled in the art will appreciate that the embodiments herein are merely examples of the invention and that other embodiments incorporating changes therein fall within the scope of the invention, of which is claimed:

The invention claimed is:

1. A lattice database management system comprising:
   a computer including a lattice data set and a mechanism to identify a subset of lattice data elements associated with a particular concept from the lattice data set;
   wherein the lattice data set comprises:
   A. a plurality of data elements, each of which is associated with a concept from a set of concepts having a partial order structure, wherein that set is hereinafter referred to as a partial order of concepts (POC),
   B. a plurality of paths between one or more data elements associated with a concept and one or more other data elements associated with another concept, the plurality of paths defining a relationship between data elements in accord with the partial order of the concepts with which the data elements are associated, such that:
      (i) when data element a is associated with concept A, data element b is associated with concept B, and there is a path (a, b) between a and b, A<B in the partial order of concepts, and
      (ii) when there exists a path from a first data element associated with a first concept to a second data element associated with a second concept, all paths from the first data element to the second concept terminate on the second data element,
   C. wherein the lattice data set is referred to hereinafter as a lattice data set with a partial order of concepts (LDSW-POC); and
   D. wherein the plurality of paths define a relationship between data elements in the lattice data set such that:
      (iii) for data elements a, b, c, when:
         a is associated with concept A,
         b is associated with concept B,
         c is associated with concept C,
         there exists a path (a, b) from a to b;
         there exists a path (a, c) from a to c; and
         the inequality B<C is defined in the partial order of concepts,
         there exists a path (b, c) from b to c.

2. The lattice database management system of claim 1, wherein the plurality of paths define a relationship between data elements in the lattice data set such that:
   (iv) for data elements a, b, c and concepts A, B, C, where:
      C<A,
      C<B,
      a is associated with concept A,
      b is associated with concept B, and
      c is associated with concept C,
      and where there exists paths from:
         c to a, and
         c to b,
      then for each concept X such that X<A and X<B and such that there does not exist a concept Y such that X<Y and Y<A and Y<B, there exists an element ab associated with concept X such that there exists paths from
         c to ab,
         ab to a, and
         ab to b.

3. The lattice database management system of claim 2, wherein
   A. the partial order of concepts is a meet semi-lattice of concepts wherein for any two concepts A, B there exists another concept C in the partial order such that C is a unique greatest lower bound for A and B in the partial order, and
   B. wherein the lattice data set is referred to hereinafter as a lattice data set with meet semi-lattice of concepts (LDSWMSOC).

4. The lattice database management system of claim 3, wherein the plurality of paths define a relationship between data elements in the lattice data set such that:
   (v) for any two concepts A and B in the LDSWMSOC, the minimal upper bound (A V B) of those two concepts always exists and is unique, and
   (vi) a maximal concept, obtained by taking the join of all concepts, has at least one data element (ALL) to which each data element in the LDSWMSOC maps.

5. The lattice database management system claim 4, wherein
   A. the partial order of concepts satisfies conditions for a lattice, and
   B. wherein the lattice data set is referred to hereinafter as a lattice data set with lattice of concepts (LDSWLOC).

6. The lattice database management system of claim 5, further comprising any of a creation/update module and a query engine including operator functionality that associates at least one of a meet operator and a join operator with the lattice data set to identify subsets having a semi-lattice or lattice structure.

7. The lattice database management system of claim 6, wherein the meet and join operators, when restricted to a subset of data elements associated with a single concept, are set intersection and set union operators.

8. The lattice database management system of claim 7, wherein the operator functionality effects said meet and join operators according to one or more selected rules.

9. The lattice database management system of claim 8, wherein the selected rules include, for any LDSWLOC in which A1 is a subset of data elements of concept A, and B1 is a subset of data elements of concept B:
   (i) the concept associated with A1∧B1 is A∧B,
   (ii) the subset associated with A∧B that corresponds to A1∧B1 is the largest subset, such that for all elements ab in that subset, there is a path from data element ab to a data element a1 in subset A1, and there is also a path from the data element ab to data element b1 in subset B1,
   (iii) the concept associated with A V B is the minimal concept in the lattice of concepts of the LDSWLOC that satisfies A V B≧A V B and for all elements a1 in A1 there exists an element xa in the concept A V B such that there is a path from a1 to xa, and for all elements b1 in B1 there exists an element xb in A V B such that there is a path from b1 to xb, and
   (iv) the subset A1 V B1 of A V B is the smallest subset that satisfies the conditions of (iii).

10. A method for creating a lattice data set using a computer, comprising:
    A. associating each of a plurality of data elements with one or more concepts from a set of concepts having a partial order structure, wherein that set is hereinafter referred to as a partial order of concepts (POC),
    B. defining a plurality of paths between one or more data elements associated with a concept and one or more other data elements associated with another concept, the plurality of paths defining a relationship between data elements in accord with the partial order of the concepts with which the data elements are associated, such that:
  (i) when data element a is associated with concept A, data element b is associated with concept B, and there is a path (a, b) between a and b, A<B in the partial order of concepts, and
  (ii) when there exists a path from a first data element associated with a first concept to a second data element associated with a second concept, all paths from the first data element to the second concept terminate on the second data element,
C. wherein the lattice data set is referred to hereinafter as a lattice data set with a partial order of concepts (LDSW-POC); and
D. wherein the plurality of paths define a relationship between data elements in the lattice data set such that:
  (iii) for data elements a, b, c, when:
    a is associated with concept A,
    b is associated with concept B,
    c is associated with concept C,
    there exists a path (a, b) from a to b,
    there exists a path (a, c) from a to c, and
    the inequality B<C is defined in the partial order of concepts,
    there exists a path (b, c) from b to c.

11. The method of claim 10, including creating the POC.

12. The method of claim 10, wherein the POC is created from a relational context (RC).

13. The method of claim 12, wherein the RC comprises any of:
  i. a set of relations,
  ii. a set of cardinality constraints on those relations,
  iii. a set of column identifications associated with the relations,
  iv. a set of primary keys identified on those relations,
  v. a set of many-to-one constraints on pairs of sets of columns in a relation,
  vi. a set of independent relational paths that are considered as equivalent, and
  vii. a set of declarations that specify that certain columns should be or should not be considered discrete-valued.

14. The method of claim 13, comprising:
A. creating, from the RC, the POC and a data set where each data element is associated with one of the concepts in the POC,
B. defining zero or more links between said data elements,
C. wherein a collection of said data elements, concepts, and links is referred to hereinafter as a linked concept data set (LCDS).

15. The method of claim 14, wherein the creating step includes generating any of an error log, link errors, events and/or alerts in response to data identified as being absent from or as being inconsistent in the LCDS.

16. The method of claim 14, comprising creating a set of constructed concepts (SCC) from a LCDS.

17. The method of claim 16, comprising creating the SCC using relation, copy, assert, and function-to-concept operators.

18. The method of claim 17, comprising creating a lattice of concepts (LOC) from a POC, an optional SCC, an optional set of LOCs, and an optional set of lattice identifications and inequalities (SLIIs).

19. The method of claim 18, wherein the LOC is created by extending the partial order of concepts with meet and join operators.

20. The method of claim 18, wherein multiple lattices are combined by specifying a set of identifications of concepts from one lattice to concepts in another lattice.

21. The method of claim 18, comprising creating a lattice data set with a lattice of concepts (LDSWLOC) from a LOC, an optional set of lattice constraints (SLC), and a LDSWPOC.

22. The method of claim 21, comprising generating any of logs of data, link errors, events and/or alerts about missing or inconsistent data in the LDSWPOC.

23. The method of claim 18, comprising creating a lattice data set with a lattice of concepts (LDSWLOC) wherein the partial order of concepts is also a meet semi-lattice of concepts (LDSWMSOC), wherein for any two concepts A, B there exists another concept C in the partial order such that C is a unique greatest lower bound for A and B in the partial order.

24. The method of claim 23, wherein the plurality of paths define a relationship between data elements in accord with the partial order of the concepts with which the data elements are associated, such that:
  (iv) for any two concepts A and B in the LDSWMSOC, the minimal upper bound (A ∨ B) of those two concepts always exists and is unique, and
  (v) a maximal concept, obtained by taking the join of all concepts, has at least one data element (ALL) to which each data element in the LDSWMSOC maps.

25. The method of claim 24, wherein a lattice data set having a partial order of concepts that satisfies the conditions for a lattice comprises a lattice data set with a lattice of concepts (LDSWLOC).

26. The method of claim 25, comprising creating a set of functions on a LDSWLOC (SFOLDSWLOC) from an optional set of expressions, an optional set of aggregation rules, an optional set of lambda expressions, a LDSWLOC, an optional SFOLDSWLOC, and an optional LCDS.

27. The method of claim 25, comprising creating a LDSWLOC from a LDSWLOC, an optional set of injection assertions (SIA), an optional SLC, an optional set of functions on a LDSWLOC (SFOLDSWLOC), and an optional SCC.

28. The method of claim 27, comprising any of generating logs of data, link errors, events and/or alerts about missing or inconsistent data in the LDSWPOC.

29. The method of claim 25, comprising meet and join operators that endow with a lattice structure a set constructed by, first, taking the powerset of data elements for each concept and, then, constructing the union of those powersets for all concepts in the lattice data set.

30. The method of claim 29, wherein the meet and join operators are set intersection and set union operators when both arguments of the operator are subsets of data elements from the same concept.

31. The method of claim 30, comprising generating a LCDS from an optional LDSWLOC, an optional SFOLDSWLOC, an optional SCC, and an optional LCDS.

32. The method of claim 30, wherein the meet and join operators are implemented according to one or more selected rules.

33. The method of claim 32, wherein the selected rules include for any LDSWLOC in which A1 is a subset of data elements of concept A, and B1 is a subset of data elements of concept B:
  (i) the concept associated with A1∧B1 is A∧B,
  (ii) the subset associated with A∧B that corresponds to A1∧B1 is the largest subset, such that for all elements ab in that subset, there is a path from data element ab to data element a1 in subset A1, and there is a path from ab to data element b1 in subset B1 for some k, (iii) the concept associated with A1 V B1 is the minimal concept, X, in the LOC that satisfies X≧A V B and for all elements a1 in A1 there exists an element x in X such that there is a path from a1 to x, and for all elements b1 in B1 there exists an element x in X such that there is a path from b1 to x, (iv) the subset of X assigned to A1 V B1 is the smallest such subset that for all elements a1 in A1 there exists a path to some element x in A1 V B1 and for all elements b1 in B1 there exists a path to some element x in A1 V B1.

34. The method of claim 33, comprising retrieving information from any of a lattice data set with a partial order of concepts (LDSWPOC), an optional associated set of functions on a LDSWPOC (SFOLDSWPOC), and an optional cache of previous results.

35. A method of querying a lattice data set using a computer, comprising:
  I. defining a query comprising a lattice element identifier and a set of one or more functions, the lattice element identifier specifying any of (1) a lattice element and (2) a plurality of lattice elements and one or more operators that act thereon,
  II. retrieving information from the lattice data set based upon the query and an inferred relationship between concepts represented by the lattice element identifier, where that relationship is not explicit in the lattice data set itself, and
  III. any of storing, transmitting, and displaying the retrieved information,
wherein the lattice data set comprises:
  A. a plurality of data elements, each of which is associated with a concept from a set of concepts having a partial order structure, wherein that set is hereinafter referred to as a partial order of concepts (POC),
  B. a plurality of paths between one or more data elements associated with a concept and one or more other data elements associated with another concept, the plurality of paths defining a relationship between data elements in accord with the partial order of the concepts with which the data elements are associated, such that:
    (i) when data element a is associated with concept A, data element b is associated with concept B, and there is a path (a, b) between a and b, A<B in the partial order of concepts, and
    (ii) when there exists a path from a first data element associated with a first concept to a second data element associated with a second concept, all paths from the first data element to the second concept terminate on the second data element,
  C. wherein the lattice data set is referred to hereinafter as a lattice data set with a partial order of concepts (LDSWPOC); and
  D. wherein the plurality of paths define a relationship between data elements in the lattice data set such that:
    (iii) for data elements a, b, c, when:
      a is associated with concept A,
      b is associated with concept B,
      c is associated with concept C,
      there exists a path (a, b) from a to b;
      there exists a path (a, c) from a to c; and
      the inequality B<C is defined in the partial order of concepts,
there exists a path (b, c) from b to c.

36. The method of claim 35, comprising a mechanism whereby all components of a system specification including relational contexts (RCs), sets of constructed concepts (SCCs), linked concept data sets (LCDS), sets of lattice identifications and inequalities (SLII), lattices of concepts (LOC), sets of lattice constraints (SLCs), lattice data sets with partial orders of concepts (LDSWPOC), lattice data sets with lattices of concepts (LDSWLOC), functions, queries, and sources of underlying data sets themselves may be independently or collectively managed by a versioning system so that queries can reference any combination of valid versions of system specification and data set versions.

37. The method of claim 35, comprising a step of creating a set of functions on a lattice data set with a partial order of concepts (SFOLDSWPOC) from any of expressions, aggregations, lambda expressions, LDSWPOC, SFOLDSWPOC, and a linked concept data set (LCDS).

38. The method of claim 35, comprising a step of creating a set of functions on a lattice data set with a lattice of concepts (SFOLDSWLOC) from any of expressions, aggregations, and lambda expressions, on a lattice data set with a lattice of concepts (LDSWLOC), SFOLDSWLOC, and a linked concept data set (LCDS).

39. The method of claim 35, wherein step (II) comprises retrieving information from any of a lattice data set with a partial order of concepts (LDSWPOC), an optional associated set of functions on a lattice data set with a lattice of concepts (SFOLDSWLOC), and an optional cache of previous results.

40. The method of claim 39, comprising updating the cache of previous results with either results of the current query or with any intermediate calculations performed therein.

41. The method of claim 39, wherein any of the query, functions, and lattice elements are evaluated lazily.

* * * * *